(12) United States Patent
Ziemkiewicz et al.

(10) Patent No.: US 10,954,582 B2
(45) Date of Patent: Mar. 23, 2021

(54) SYSTEMS AND PROCESSES FOR RECOVERY OF HIGH-GRADE RARE EARTH CONCENTRATE FROM ACID MINE DRAINAGE

(71) Applicant: West Virginia University, Morgantown, WV (US)

(72) Inventors: Paul Ziemkiewicz, Morgantown, WV (US); Aaron Noble, Blacksburg, WV (US); Chris Vass, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 16/795,471

(22) Filed: Feb. 19, 2020

(65) Prior Publication Data
US 2021/0017625 A1    Jan. 21, 2021

Related U.S. Application Data

(60) Provisional application No. 62/875,502, filed on Jul. 17, 2019.

(51) Int. Cl.
C22B 3/06 (2006.01)
C22B 59/00 (2006.01)
C22B 3/20 (2006.01)

(52) U.S. Cl.
CPC .............. *C22B 3/065* (2013.01); *C22B 3/20* (2013.01); *C22B 59/00* (2013.01)

(58) Field of Classification Search
CPC .................................................. C22B 59/00
See application file for complete search history.

(56) References Cited

U.S. PATENT DOCUMENTS

2019/0136344 A1    5/2019  Zhang et al.
2020/0048737 A1    2/2020  Werner et al.

OTHER PUBLICATIONS

Vass, A Critical Assessment on the Resources and Extraction of Rare Earth Elements from Acid Mine Drainage, Dissertation submitted to the Benjamin M. Statler College of Engineering and Mineral Resources at West Virginia, 2019 University.

Gupta et al., Oxide reduction processes in the preparation of rare-earth metals, Minerals & Metallurgical Processing, vol. 30, No. 1, pp. 38-44, 2013.

(Continued)

*Primary Examiner* — Melissa S Swain
(74) *Attorney, Agent, or Firm* — Innovators Legal

(57) ABSTRACT

In one aspect, the disclosure relates to a continuous process for treating acid mine drainage while simultaneously recovering a high-grade rare earth preconcentrate suitable for extraction of commercially valuable rare earth oxides. In a further aspect, the preconcentrate is from about 0.1% to 5% rare earth elements on a dry weight basis. In another aspect, the disclosure relates to a method for processing the preconcentrate to generate a pregnant leach solution that does not form gels or emulsions and is suitable for processing via solvent extraction. In another aspect, the disclosure relates to a system and plant for carrying out the disclosed process. In still another aspect, the disclosure relates to a composition containing rare earth elements produced by the process disclosed herein. This abstract is intended as a scanning tool for purposes of searching in the particular art and is not intended to be limiting of the present disclosure.

19 Claims, 26 Drawing Sheets

(56) References Cited

OTHER PUBLICATIONS

Hedin et al., The evaluation of critical rare earth element (REE) enriched treatment solids from coal mine drainage passive treatment systems, International Journal of Coal Geology 208, 54-64, 2019.

Vass et al., The Occurrence and Concentration of Rare Earth Elements in Acid Mine Drainage and Treatment By-products: Part 1—Initial Survey of the Northern Appalachian Coal Basin, Mining, Metallurgy & Exploration, 2019.

Vass et al., The Occurrence and Concentration of Rare Earth Elements in Acid Mine Drainage and Treatment Byproducts. Part 2: Regional Survey of Northern and Central Appalachian Coal Basins, Mining, Metallurgy & Exploration, 2019.

Zhang et al., Rare earth elements recovery using staged precipitation from a leachate generated from coarse coal refuse, International Journal of Coal Geology 195, 189-199, 2018.

Zhao et al., The geochemistry of rare earth elements (REE) in acid mine drainage from the Sitai coal mine, Shanxi Province, North China, International Journal of Coal Geology 70, 184-192, 2007.

SYSTEMS AND PROCESSES FOR RECOVERY OF HIGH-GRADE RARE EARTH CONCENTRATE FROM ACID MINE DRAINAGE

CROSS-REFERENCE TO RELATED APPLICATIONS

This Application claims the benefit of U.S. Provisional Application No. 62/875,502, filed on Jul. 17, 2019, which is incorporated herein by reference in its entirety.

STATEMENT REGARDING FEDERALLY SPONSORED RESEARCH OR DEVELOPMENT

This invention was made with U.S. Government support under grant number DE-FE0031524 awarded by the U.S. Department of Energy. The U.S. government has certain rights in the invention.

BACKGROUND

Rare earth elements (REEs) are useful and necessary for the manufacture of batteries that power hybrid and electric vehicles, catalytic converters, computer memory, fluorescent lighting and lasers, smartphones and tablet computers, cameras including electronic components and lenses, e-readers, magnets, night-vision goggles, GPS and communications equipment, military applications including precision-guided weapons and vehicle armor, aircraft engines, personal protective equipment, and in other applications including defense applications. Some REEs can be used in air pollution control mechanisms, oil refineries, in medical diagnostic equipment such as, for example, X-ray and MRI machines, as phosphors, as catalysts, as components of ceramics and paints, and/or as polishing compounds. Although REEs and critical minerals (CM) can be extracted from many waste products and ores, few such resources are economically attractive. Due to current and possibly continuing export controls for REEs from China, it would be desirable to develop domestic sources of REEs.

Acid mine drainage (AMD) is a pollutant generated by coal and other mines and must be treated in compliance with federal and state clean water regulations to adjust pH and remove metal ions including iron, aluminum, and manganese. There are vast instances of acid mine drainage (AMD) in the northern, central, and southern Appalachian basins, as well as the Illinois coal basin and elsewhere in the U.S. Across the northern and central Appalachian Coal Basins, water pollution caused by AMD is the single greatest cause of stream impairment. Processes for treating AMD for regulatory compliance have been the subject of massive research and infrastructure investments since the early 1970s. It is estimated that, in the Appalachian states alone, more than 50 new, large AMD treatment plants will be installed in the next 10 years, in an effort to address increasing stream pollution. Although trace amounts of REEs are known to exist in AMD, a reliable method of concentrating and extracting them has not yet been developed.

Despite advances in the treatment of acid mine drainage, there is still a scarcity of methods that are able to recover REEs from AMD and that are environmentally sound, inexpensive, scalable, and able to be retrofitted to existing plants. Ideally, the method would produce insignificant amounts of naturally-occurring radioactive material and/or other noxious wastes as well as reducing stream pollution.

Additionally, it would be desirable if the method could be adapted to extract REEs from other sources. It would also be advantageous for the process to operate continuously and without forming insoluble material such as, for example, aluminosilicate gels. It would further be desirable to have a domestic source of REEs. These needs and other needs are satisfied by the present disclosure.

SUMMARY

In accordance with the purpose(s) of the present disclosure, as embodied and broadly described herein, the disclosure, in one aspect, relates to a continuous process for treating acid mine drainage to comply with Clean Water Act requirements while simultaneously recovering a high-grade rare earth concentrate suitable for extraction of commercially valuable rare earth oxides. In a further aspect, the high-grade rare earth preconcentrate is from about 0.1% to about 5% total REE on a dry weight basis. Also disclosed herein is a method for processing the rare earth preconcentrate to generate a pregnant leach solution that does not form gels or emulsions and that is suitable for processing via solvent extraction. In another aspect, disclosed herein is a system that includes a plant capable of carrying out the method disclosed herein. In yet another aspect, disclosed herein is a composition containing the REEs prepared by the disclosed process.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1A: trailer containing extraction unit. FIG. 1B: interior of trailer showing plate and frame filters (foreground) and mixing tanks (background).

FIG. 2A: example composition of AMD preconcentrate and oxide composition after processing through an acid leaching/solvent extraction (ALSX) process as disclosed herein. Not shown are elements making up less than 0.01% of the sample (i.e., Co, Mg, Mn, Ni). FIG. 2B: elemental distribution within the mixed rare earth oxide (MREO) fraction. Red labels indicate critical minerals. Gray shades indicate light rare earth elements (LREE, 35.3%) while colored segments represent heavy rare earth elements (HREE, 64.7%). Sample was not acid washed prior to analysis.

FIG. 7A shows representative sensitivity analysis of maximum acid dose as a function of sludge feed grade. FIG. 7B shows representative sensitivity analysis of breakeven shipping distance as a function of feed grade and moisture.

FIG. 13A shows a 150 mm lab scale filter press; and FIG. 13B shows a 420 mm filter press.

FIG. 14A shows a representative PLS solution after filtration in plate and frame filters; and FIG. 14B shows a representative filter cake from cleaning a 2 ft³ filter press used to process the PLS.

Figure 1B:
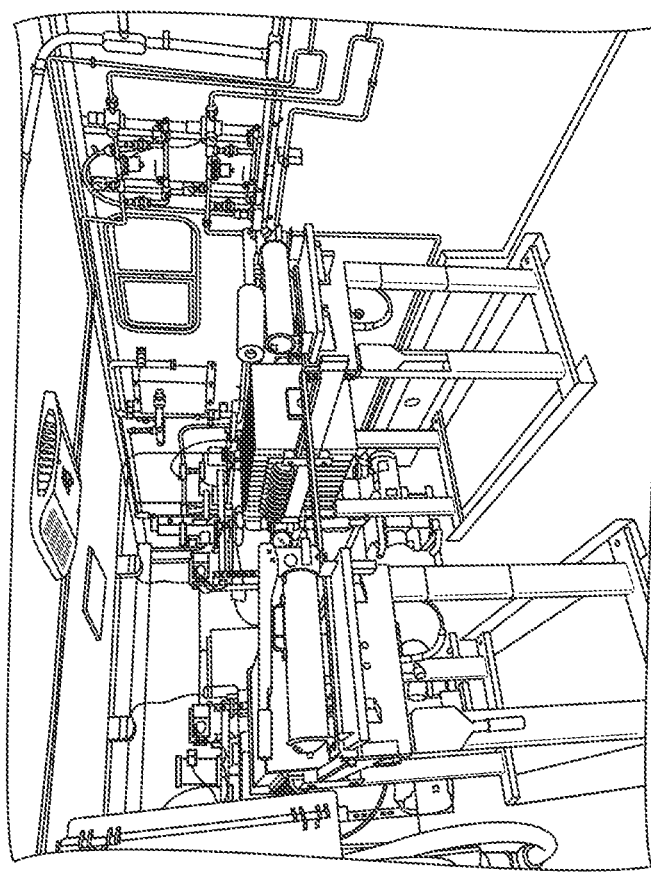
FIGS. 1A-1B show a representative mobile Rare Earth Element/Critical Mineral (REE/CM) extraction unit at an acid mine drainage (AMD) treatment plant useful in one aspect of the disclosure herein.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a rare earth element" includes, but is not limited to, mixtures of two or more such rare earth elements, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value.

For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a buffer refers to an amount that is sufficient to achieve the desired improvement in the property modulated by the formulation component, e.g. achieving and maintaining a desired solution pH. The specific level in terms of wt % in a composition required as an effective amount will depend upon a variety of factors including the amount and type of buffer, size of processing plant (i.e., bench top, mobile, or commercial scale), amount and type of feedstock being treated, and end use of the REEs recovered during the process.

As used herein, the terms "optional" or "optionally" means that the subsequently described event or circumstance can or cannot occur, and that the description includes instances where said event or circumstance occurs and instances where it does not.

Unless otherwise specified, temperatures referred to herein are based on atmospheric pressure (i.e. one atmosphere).

A "rare earth element" (REE) is typically a lanthanide chemical element (i.e., cerium, dysprosium, erbium, europium, gadolinium, holmium, lanthanum, lutetium, neodymium, praseodymium, promethium, samarium, terbium, thulium, ytterbium) and sometimes also includes the elements scandium and yttrium, which often occur in the same ore deposits as lanthanides and also have some similar chemical properties. Rare earth elements are useful in a variety of applications in the electronics, defense, and medical industries, as well as in other applications. An oxide of a rare earth element is a "rare earth oxide" and can be used for analytical purposes or may be useful as a component of ceramics, catalysts, and/or coatings, among other uses.

"Heavy rare earth elements" (HREE) include yttrium, gadolinium, terbium, dysprosium, holmium, erbium, thulium, ytterbium, and lutetium and "light rare earth elements" (LREE) include scandium, lanthanum, cerium, praseodymium, neodymium, promethium, samarium, and europium. In some aspects, these designations may differ slightly but are generally based on weight. In some aspects, yttrium is classified as a heavy rare earth element due to chemical properties and co-location with other HREEs in ores, but in other aspects, yttrium is classified as a light rare earth element due to its lower atomic weight.

"Critical minerals" (CM) as used herein include minerals important to national security and the economy. REEs are considered critical minerals due to their numerous industrial uses. Other critical minerals may also be purified and concentrated using the disclosed process including, but not limited to, cobalt, gallium, germanium, hafnium, indium, niobium, rhenium, rubidium, tantalum, and tellurium.

As used herein, "gangue" metals and other materials are undesired materials that surround or are co-located with the REEs being isolated and concentrated by the disclosed process. In one aspect, in the present process, gangue material can include, but is not limited to, aluminum, calcium, magnesium, manganese, silicon, chloride, and the like. In some aspects, gangue materials may have little or no economic value. In aspects, gangue materials may have industrial uses but their presence alongside more valuable REEs can complicate the recovery of the REEs.

"Acid mine drainage" (AMD) as used herein refers to acidic water that outflows from mines such as, for example, metal mines or coal mines. In one aspect, AMD intensifies in scale and scope when construction, mining, and other activities that disturb the earth occur in and around rocks containing sulfide minerals. AMD can have high concentrations of metal ions that can cause detrimental effects to aquatic environments, especially in combination with low pH. AMD from coal mines and other sources often contains trace amounts of REEs, as well.

"AMD precipitate" (AMDp) as used herein refers to a byproduct of AMD treatment. In one aspect, AMDp contains REEs but may also contain gangue metals such as, for example, iron and aluminum. In one aspect, AMDp contains from about 0.06% to about 0.1% REE. As used herein, "enriched AMD precipitate" (eAMDp) refers to an AMD product having from about 0.1% to about 5% REE on a dry weight basis. In another aspect, eAMDp has a lower gangue metal content then AMDp.

A "feedstock" as used herein is a raw material processed to recover REEs and other valuable components (e.g., CMs). A feedstock may be too toxic to release into the natural environment and, in one aspect, the disclosed process can remove commercially valuable components from the feedstock while simultaneously rendering the feedstock suitable for environmental release.

As used herein, "pregnant leach solution" (PLS) is water with an acidic pH and a high metal content. In one aspect, PLS can be processed using several purification technologies including, but not limited to, solvent extraction, ion exchange resins, selective precipitation, and fractional crystallization to remove and/or concentrate the metals. In some aspects, PLS may have a high solids content and may require filtration prior to further processing.

"Raffinate," meanwhile, refers to a product of chemical separation, wherein one or more components have been removed. In one aspect, following solvent extraction as disclosed herein, raffinate is the aqueous component depleted in REE content. In another aspect, raffinate can include undesired gangue material.

As used herein, "GEOTUBE®" refers to a dewatering device made from a polypropylene fabric that can be produced according to the needs of a particular project or industry. In one aspect, sludge or other material to be separated is pumped into a GEOTUBE® container and a fabric liner keeps solids trapped inside while filtrate water escapes and can be directed to a treatment facility.

Figure 3:
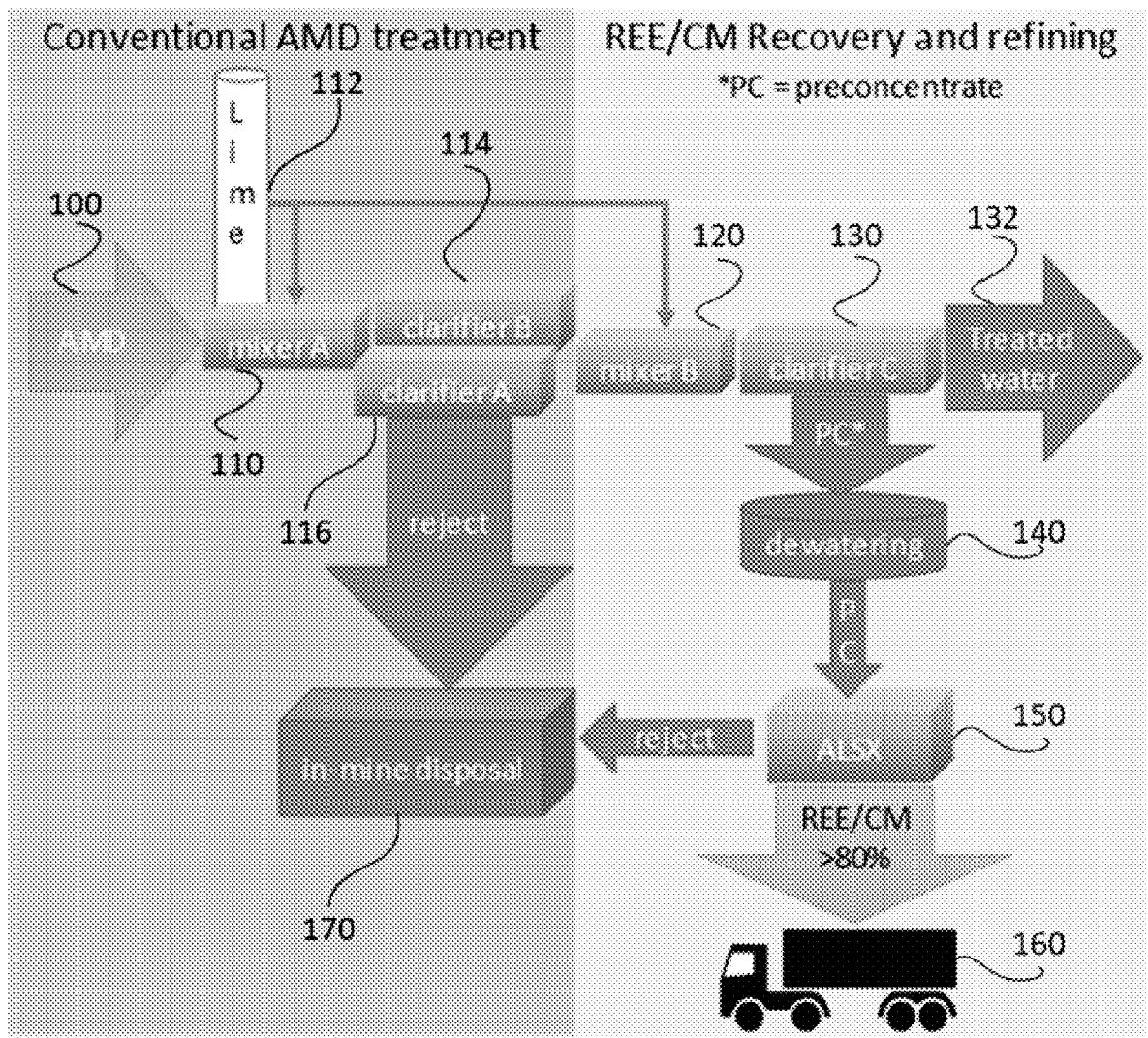
FIG. 3 shows a schematic flow diagram of a process disclosed herein. Conventional AMD treatment appears on the left (blue background) with REE/CM recovery and concentration on the right (green background).

In one aspect, disclosed herein are processes and systems for efficiently treating acid mine drainage (AMD) while producing an enriched rare earth element/critical mineral (REE/CM) concentrate. In another aspect, disclosed herein is a full-scale upstream concentration unit that can be designed, constructed, and operated at an active AMD discharge site. In still another aspect, disclosed herein is a pilot-scale acid leaching-solvent extraction (ALSX) unit that can be designed, constructed, co-located, and operated at the same AMD discharge site. An overview of the process disclosed herein is shown in FIG. 3. In one aspect, in this process, acid mine drainage 100 is transferred to a first mixer ("mixer A") 110 along with lime 112 or another base. The lime/AMD mixture from the first mixer is optionally passed through clarifiers 114 and 116 ("clarifier B" and "clarifier A", respectively) with rejected material being shunted to an in-mine disposal means 170. Alternatively, materials can proceed directly from the first mixer 110 to a second mixer 120 ("mixer B") along with additional lime 112. The materials from the second mixer are passed to an additional clarifier 130 ("clarifier C") with some material discharged as treated water 132 and a preconcentrate containing REEs transferred to a dewatering means 140. Following dewatering, the preconcentrate is suitable for the ALSX process 150 disclosed herein. Following ALSX, rejected or waste material is shunted to in-mine disposal means 170 while material enriched in REEs and CMs is transported via transport means 160 such as, for example, a truck, off-site for additional processing and/or use.

In one aspect, the AMD REEcovery (net acidic) process disclosed herein is a modular process that can be easily installed and/or retrofitted at an acid mine drainage (AMD) treatment facility without substantial interruption to operations. In another aspect, the AMD REEcovery method processes extracts from otherwise worthless net acidic AMD treated at coal mines or from a pregnant leach solution (PLS) containing high concentrations of rare earth elements (REEs), wherein the PLS has substantial economic value because it is uniquely suited for extraction of commercial grade rare earth oxides. In one aspect, the overall process disclosed herein can produce preconcentrates from the upstream unit disclosed herein, the preconcentrates having grades exceeding 0.1% REE/CM. In another aspect, final concentrates from the ALSX unit can exceed 35% to 95% grade.

Figure 6:
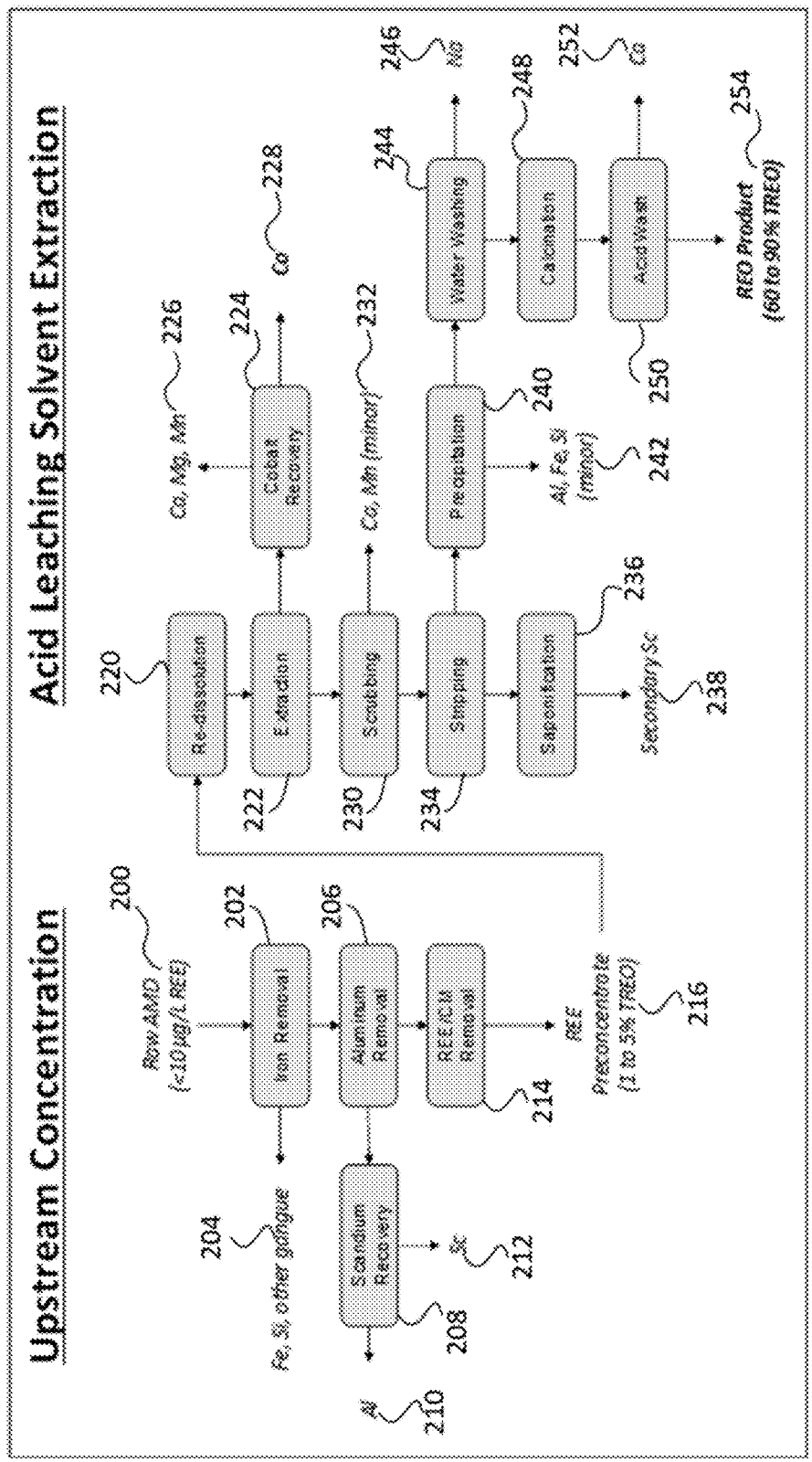
FIG. 6 is a flow diagram showing individual stages according to one aspect of the integrated upstream concentration and acid leaching/solvent extraction process as disclosed herein.

In one aspect, AMD enriched in REE/CM in the northern and central Appalachian coal basins, having an average total REE concentration of about 287 µg/L (0.287 ppm), ranging from negligible to 2,000 µg/L. In a further aspect, five of the elements classified as REE/CM are: Y, Nd, Eu, Tb and Dy. In a further aspect, the critical mineral Co alone is present at about 75% of the REE concentration in a given sample. An overview of the process disclosed herein as it relates to removal of gangue metals during the upstream concentration and ALSX processes is shown in FIG. 6. Raw AMD 200 that is less than 10 µg/L REE is subjected to iron removal 202 in which base is added to the raw AMD to precipitate out iron, silicon, and certain other gangue elements 204. Aluminum removal 206 proceeds via addition of further base and/or optional flocculating and coagulating agents as required. An optional scandium recovery step 208 can be performed with the addition of base as disclosed herein wherein following scandium recovery, aluminum gangue material 210 and scandium 212 can be collected separately. Whether optional scandium recovery step 208 is performed or not, following aluminum removal 206, the treated AMD is passed further in an REE/CM removal step 214 to form an REE preconcentrate 216 containing from about 1 to about 5% total rare earth oxides. Further in this aspect, the REE preconcentrate is subjected to re-dissolution 220 and extraction 222 and can proceed to cobalt recovery 224, resulting in the recovery of cobalt 228 and separation of additional gangue materials including calcium, magnesium, and manganese 226. Following extraction 222, scrubbing 230 is performed, which results in removal of additional minor amounts of calcium and manganese 232. Following scrubbing 230, a stripping 234 process is performed, which can be followed by optional saponification 236 and recovery of secondary scandium 238 or, alternatively, following stripping 234, a precipitation step 240 can be performed to remove additional minor amounts of the gangue materials aluminum, iron, and silicon 242. The REE-enriched material following removal of these materials can be subjected to water washing 244 which serves to remove sodium 246. A calcination step 248 is followed by an acid wash 250 which serves to remove further calcium 252 and results in an REO product 254 containing from about 60 to about 90% TREOs.

In a still further aspect, the disclosed process allows an AMD facility to extract a solid preconcentrate of roughly 0.1% to 5% REE grade from AMD, prior to the facility's final separation of clean water (for discharge) from sludge (for impoundment). In another aspect, a full-size, integrated plant as disclosed herein can simultaneously treat up to 1000 gpm of AMD while recovering and concentrating a commercially-attractive REE/CM product.

In any of these aspects, the extracted concentrate has substantial economic value because its characteristics uniquely suit it for processing at a centrally located plant that uses a solvent extraction-based process to create a commercially valuable mixed rare earth oxide composition. In one aspect, the plant as disclosed herein can generate about 1000 tons per year of REE/CM oxides with an estimated contained value of $237/kg using REE market prices at the time of filing. In a further aspect, REE market prices can fluctuate over time. In another aspect, this production of REE/CM oxides can recuperate a large portion of continued operating costs of AMD plants.

In a further aspect, the present disclosure provides a method for using AMD as a feedstock for REE production. In one aspect, the overall process disclosed herein can achieve the disclosed purity goals at commercially-attractive efficiencies and processing costs. In still another aspect, the process and system can be operated in a manner that is environmentally benign and/or has a net environmental benefit.

In one aspect, a pilot plant as disclosed herein can generate a preconcentrate of 0.1% to 5% MREO grade at a rate of 800 kg/year. In another aspect, this can be refined to a 35% to 95% grade MREO product at a rate of 135 kg/year. In still another aspect, the process disclosed herein focuses on raw AMD rather than AMD sludge and thus provides several benefits. In one aspect, the process creates an enriched, homogenized REE feedstock. In another aspect, the process reduces transportation costs to a REE refinery. In still another aspect, the process reduces acid consumption during acid leaching, in part by reducing the amount of lime used in other steps of the process. In yet another aspect, the process reduces the volume of waste produced during REE refining. In any of these aspects, the process represents significantly lower capital and operating costs for REE/CM extraction. Further, in one aspect, the disclosed process incentivizes AMD treatment while producing insignificant amounts of noxious wastes such as, for example, uranium and thorium. In one aspect, U+Th is less than 0.02% of the final rare earth oxide (REO) product.

Figure 10:
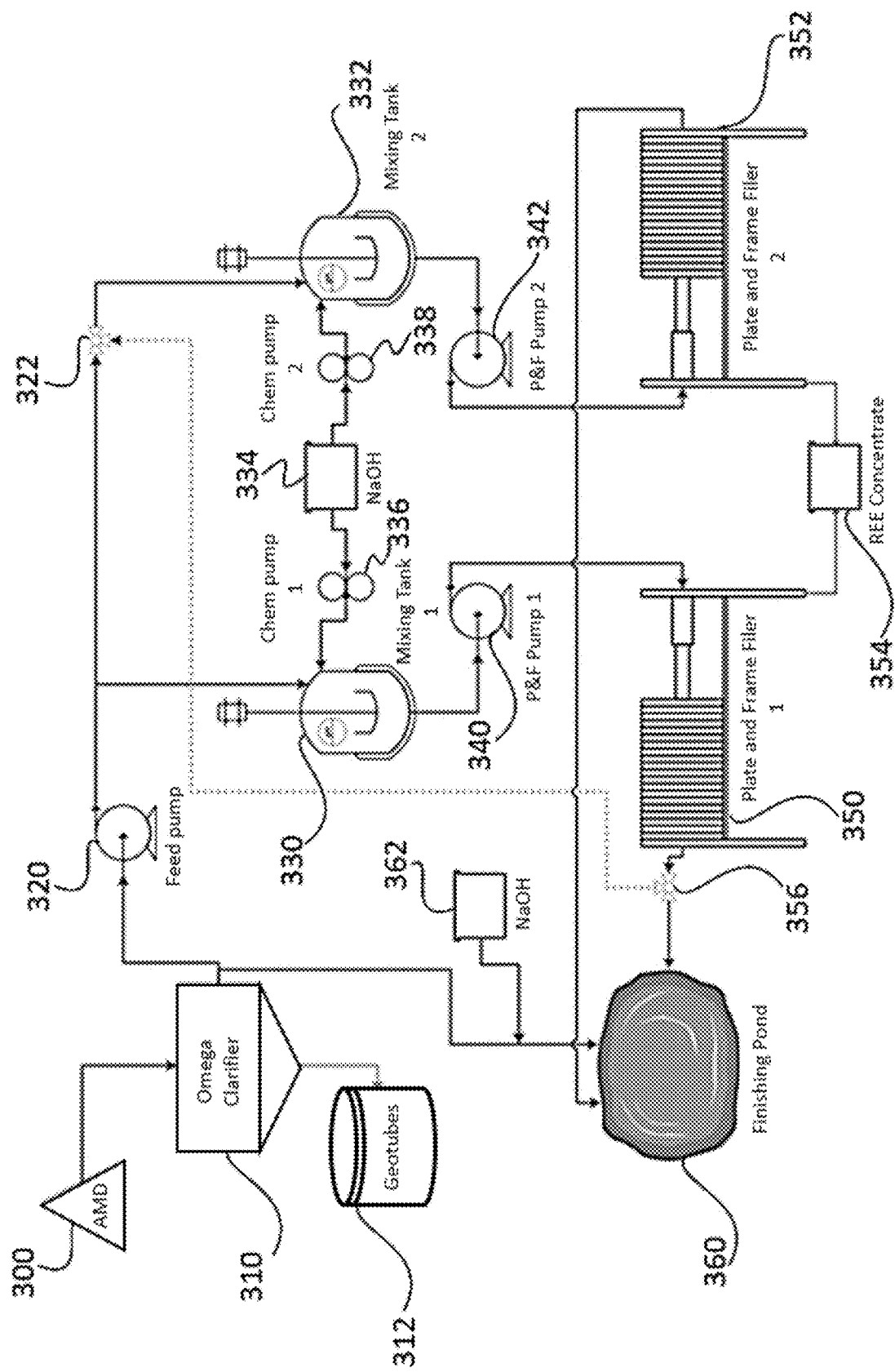
FIG. 10 is a flow diagram of an operating principle of a representative mobile plant as disclosed herein for implementing the disclosed methods and processes. The Omega Clarifier as labeled in the figure is an element of a specific conventional AMD treatment plant in West Virginia.

FIG. 10 shows one layout for a plant as disclosed herein. AMD source 300 is fed into clarifier 310 (here, Omega Clarifier, used on site at one of the AMD sources as described in the Examples). Waste material is filtered through Geotubes® 312 and stored or disposed of. Clarifier 310 feeds material to feed pump 320 which can be fed directly into a first mixing tank 330 or split using valve 322 and fed into both the first mixing tank 330 and a second mixing tank 332. NaOH or other base reservoir 334 is connected to first and second chemical pumps 336 and 338 which feed into mixing tanks 330 and 332, respectively, adding base as needed to complete the process as disclosed herein. Mixing tank 330 and mixing tank 332 (if used) feed into plate and frame pumps 340 and 342, respectively, and, in turn, into plate and frame filters 350 and 352. The REE concentrate 354 is collected from the filters and waste material is discharged directly from the filters 350 and 352 or through valve 356 into finishing pond 360 or another waste collection site. In some cases, material from clarifier 310 is also discharged directly to finishing pond 360 and if it is too acidic, base from reservoir 362 can be mixed with this material prior to discharge.

In one aspect, upstream concentration creates an enriched solid feedstock by removing gangue metals through sequential pH adjustment and precipitation. In another aspect, acid leaching uses the enriched feedstock to create a superior pregnant leach solution. In still another aspect, solvent extraction refines PLS to high grade MREO. In one aspect, the process disclosed herein has resulted in production of high-grade feedstock (0.1 to 5%) and refined MREO with grades between 35% and 95%. In another aspect, the current process rejects gangue metal early, thus increasing feedstock grade and controlling third-phase (crud) formation during solvent extraction. A simplified diagram of a plant performing upstream concentration can be found in FIG. 15. AMD or AMDp 400 is fed into mixing vessel 410 along with water 402 and acid 404 (here, 60% HNO₃). Following acidification and mixing, the material is passed through a plate and frame filter 420 into a second mixing vessel 430 along with base (here, NaOH) from reservoir 432 as required to raise the material to the desired pH level. This base-treated, mixed material is passed through a second plate and frame filter 440 and stored 450 in a vessel such as, for example, a drum, as a PLS.

In a further aspect, disclosed herein is a full-scale AMD treatment plant that would be modified to produce an REE/CM preconcentrate. In a further aspect, this plant is integrated with a pilot scale REE/CM extraction and processing facility to produce a high grade (35% to 95%) REE/CM oxide product. In another aspect, this stepwise approach to addressing scaleup and continuous operational challenge has resulted in a technology package with a high probability of success. Since the REE concentration in raw AMD is very dilute (often <1 mg/L), a significant volume of water must be processed to generate the feedstock needed for downstream processing. In an alternative aspect, several distributed upstream concentration units as disclosed herein can feed a single centralized ALSX facility.

In a further aspect, the technology needed to upgrade AMD feedstock to commercially attractive REE purity levels relies on two distinct operations: (1) an integrated water treatment/pre-concentration unit that will purify AMD to environmentally-compliant discharge standards while simultaneously producing REE/CM preconcentrates and (2) a secondary acid leaching/solvent extraction (ALSX) process that will generate high purity rare earth oxide (REO) products. In one aspect, the integrated water treatment/preconcentration process disclosed herein has been designed to process 500 gallons per minute of AMD, while producing approximately 8 kg/hr of preconcentrate assaying approximately 0.1 to 5% REE/CM (82 g MREO/hr). In a further aspect, these preconcentrates can then be further processed by a pilot-scale ALSX plant that will produce approximately 16 g/h of high purity REE/CM oxide concentrates approaching or exceeding 35% to 95% purity. In all phases of the work disclosed herein, in a further aspect, the pilot-scale test work has been augmented by laboratory investigations, technical and economic system modeling, and environmental analyses.

Figure 18:
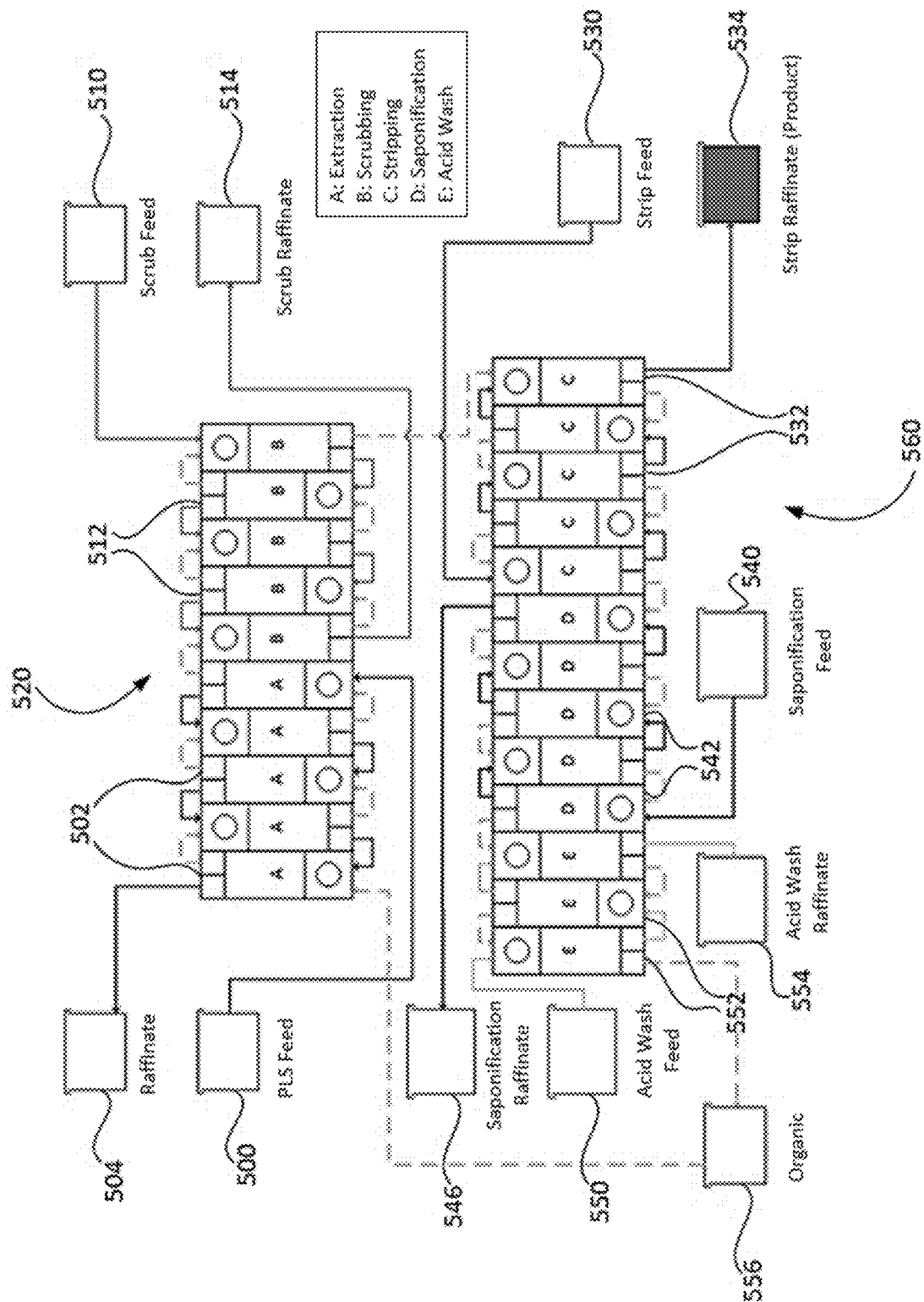
FIG. 18 is a representative flow diagram for a solvent extraction module disclosed herein.

A system for performing extraction, scrubbing, stripping, saponification, and acid washing as disclosed herein is shown in FIG. 18. PLS feed 500 is fed into a plurality of extraction units 502 and raffinate 504 is produced following extraction. Meanwhile, scrub feed 510 is fed into a plurality of scrubbing units 512 and scrub raffinate 514 is produced following scrubbing. In some aspects, the plurality of extraction units 502 and the plurality of scrubbing units 512 are integrated into one extraction and scrubbing device 520. Non-raffinate material from scrubbing can be fed into a plurality of stripping units 532; alternatively, strip feed 530 can be fed into stripping units 532 from an external source. Following stripping, a strip raffinate 534 is produced. Saponification feed 540 is fed into a plurality of saponification units 542 and saponification raffinate 546 is removed following saponification. In a final step, acid wash feed 550 is fed into a plurality of acid wash units 552, producing acid wash raffinate 554 and an organic phase 556 that can be fed back into extraction units 502 or discarded. In some aspects, stripping units 532, saponification units 542, and acid wash units 552 can be integrated into one stripping, saponification, and acid wash unit 560. In some aspects, the feed for each process is fed continuously through the steps (i.e., PLS feed 500 is extracted in extraction units 502 and becomes scrub feed 510, which is scrubbed in scrubbing units 512. This material in turn becomes strip feed 530, which is processed in stripping units 532. In some aspects, the strip raffinate 534 is the desired product in this step of the disclosed process and further treatment serves to prepare the remaining material for environmentally-sound waste disposal.

Figure 20:
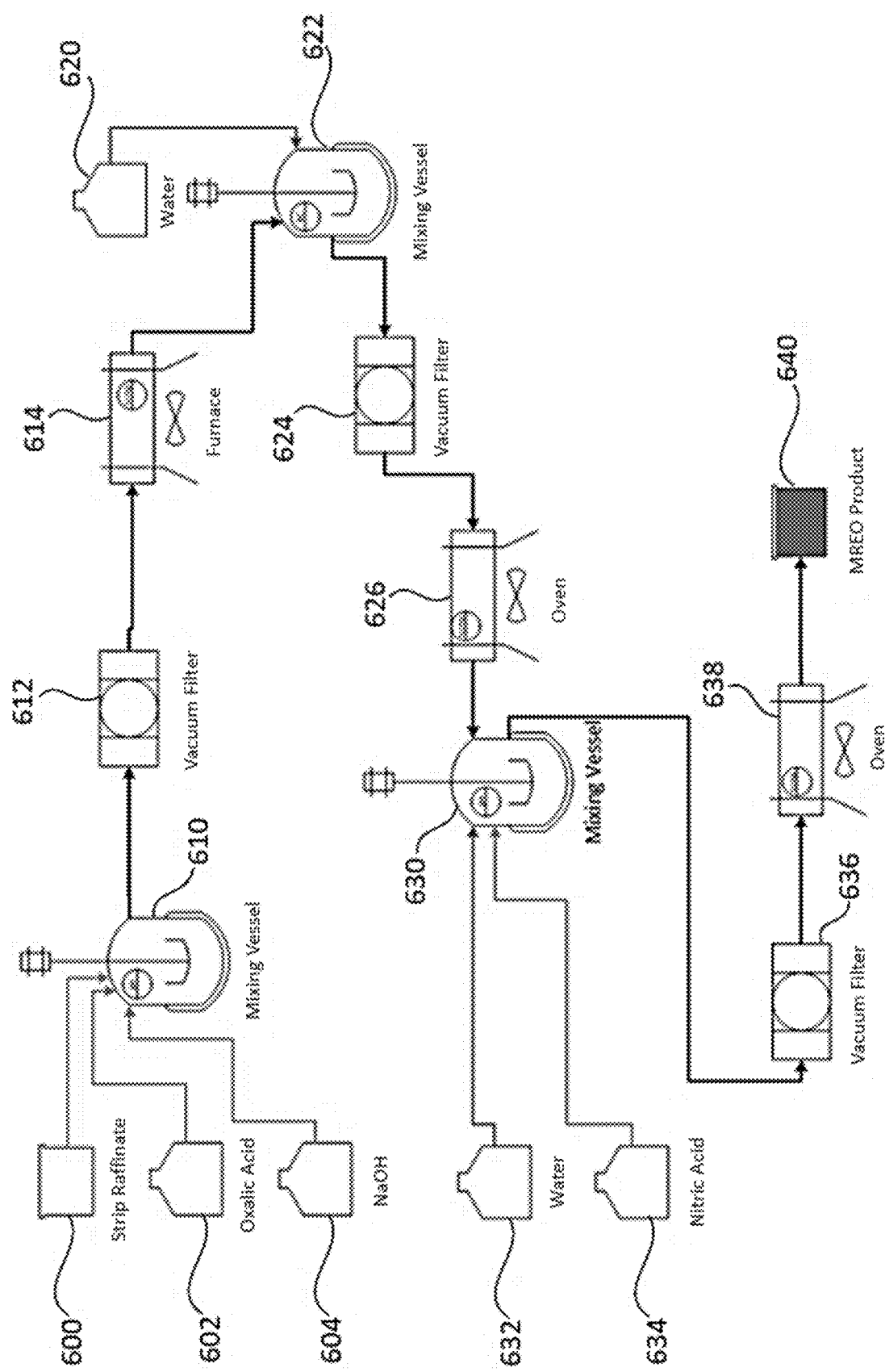
FIG. 20 shows is a diagram of a representative precipitation process useful in the methods and processes disclosed herein.

FIG. 20 shows a plant design for further processing of the strip raffinate 600. Strip raffinate 600 along with oxalic acid from reservoir 602 and a base such as, for example, NaOH from vessel 604 are fed into mixing vessel 610, vacuum filtered in vacuum filter 612, heated or calcined in furnace 614, and passed to mixing vessel 622. If needed, water from reservoir 620 can be added to mixing vessel 622 to facilitate mixing. Mixed product leaving vessel 622 is passed through vacuum filter 624 and into oven 626. Material leaving oven 626 is passed into mixing vessel 630 along with water from reservoir 632 and acid such as, for example, nitric acid, from reservoir 634. Mixed, acidified material leaving mixing vessel 630 is passed through vacuum filter 636, into oven 638 for heating, and collected as the desired MREO product 640.

In one aspect, this disclosure includes, but is not limited to, the development, design, construction, testing, and evaluation of a pilot-scale continuous process for the integrated treatment of AMD and production of REE/CM concentrates. In a further aspect, the process minimizes costs by leveraging existing equipment and processes used at many current AMD treatment sites.

In one aspect, the AMD/REE plant disclosed herein will include a continuous acid leaching/solvent extraction train at its downstream end that will produce a MREO grade exceeding 35% to 95%.

Process Overview

Figure 23:
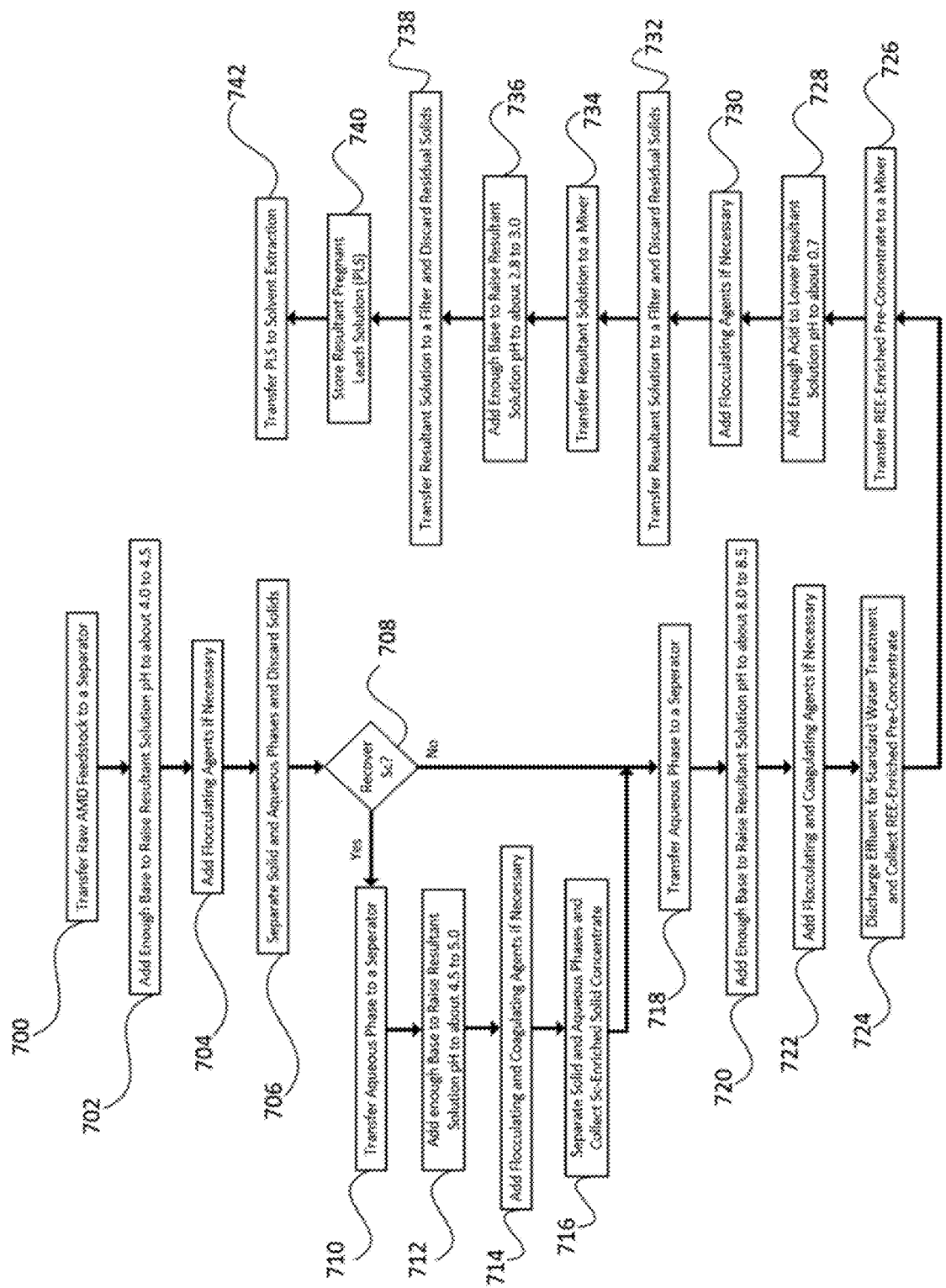
FIG. 23 shows a flow diagram of a portion of a disclosed process, starting with transfer of raw AMD feedstock to a separator and ending with transfer of a pregnant leach solution (PLS) to the disclosed solvent extraction process. An optional series of steps for recovering scandium are included.

In one aspect, the process disclosed herein includes at least the following steps:
1. Transfer raw AMD feedstock to a separator
2. Aerate and add enough base to the separator to raise the resultant mixture pH
3. Add flocculating and coagulating agents if necessary
4. Separate solid and aqueous phases and discard solids
5. Optionally, if recovering scandium, transfer aqueous phase to a separator and add enough base to raise resultant solution pH
   a. Optionally, add coagulating and flocculating agents
   b. Separate solid and aqueous phases and collect Sc-enriched solid concentrate
6. Transfer aqueous phase to a separator
7. Add enough base to raise resultant mixture pH
8. Optionally, add flocculating and coagulating agents
9. Discharge effluent and collect REE-enriched pre-concentrate
10. Dewater pre-concentrate
11. Transfer REE-enriched pre-concentrate to a mixer
12. Add enough acid to lower resultant solution pH
    a. Optionally add an oxidizing agent
13. Optionally add flocculating and coagulating agents
14. Transfer resultant solution to a filter and discard residual solids
15. Transfer resultant solution to a mixer
16. Add enough base to raise resultant solution pH
17. Transfer resultant solution to a filter and discard residual solids
18. Store resultant pregnant leach solution (PLS)
19. Transfer PLS to solvent extraction or other suitable purification technology as disclosed herein
20. Perform extraction or purification of PLS FIG. 23 shows a flow diagram of an exemplary process to produce a PLS as disclosed herein. The plant includes means 700 for transferring raw AMD feedstock to a separator and a means 702 for adding base to raise the resultant solution pH to from about 4 to about 4.5 as well as a means 704 for adding flocculating agents if necessary and a means 706 for separating solid and aqueous phases and for discarding solids. If scandium recovery is performed, an optional scandium recovery device 708 is incorporated at this stage. The scandium recovery device 708 includes a means 710 for transferring the aqueous phase to a separator, a means 712 for adding enough base to raise the resultant solution pH to from about 4.5 to about 5, a means 714 to add optional flocculating and/or coagulating agents, and a means 716 for separating solid and aqueous phases and collecting a scandium-enriched solid concentrated. The resultant material from this step or from separation means 706 if scandium recovery is not performed is transferred to separator 718. Means 720 for adding base to the separator 718 dispesnses base until solution pH is from about 8.0 to about 8.5, while means 722 adds optional flocculating and/or coagulating agents and a device 724 discharged effluent for standard water treatment while collecting an REE-enriched preconcentrate for further processing. REE-enriched preconcentrate is transferred to a mixer by a mechanism 726 and means 728 for adding acid dispenses acid to lower solution pH to about 0.7, while means 730 adds optional flocculating agents. Acidified solution is transferred by device 732 to a filter and residual solids are discarded. Means 734 transfers the resultant solution to a mixer where a base dispensing means 736 dispenses base until the solution pH is from about 2.8 to about 3.0. A device 738 then transfers the resultant solution to a filter, wherein residual solids are discarded. Following this, a PLS is stored in storage means 740 until transferred to solvent extraction by a transfer means 742.

Figure 24:
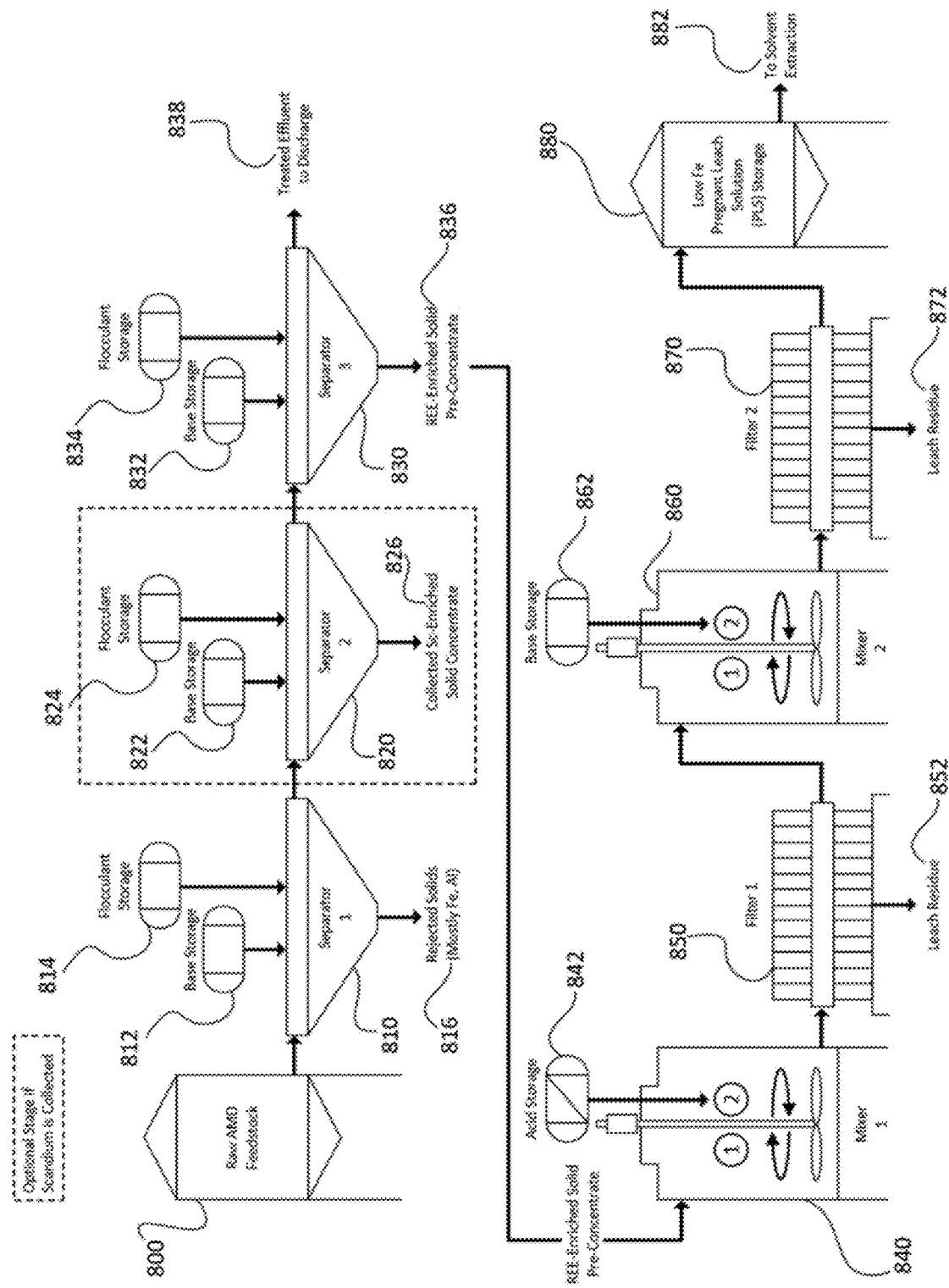
FIG. 24 shows a flow chart of a disclosed process. In some aspects, a second separation and concentration step is applied if it is desired to collect a scandium-enriched solid concentrate.

FIG. 24 shows a diagram of a plant that can produce a PLS according to the process in FIG. 23 or another exemplary process as disclosed herein. Raw AMD feedstock 800 is transferred to a first separator 810, wherein the separator is connected to a base storage unit 812 and a flocculant storage unit 814 that can dispense base and flocculant as needed into the separator 810; solids 816 that precipitate at this point include mostly iron and aluminum and are transferred for waste disposal or further processing as desired. If scandium recovery is performed, the liquids from the first separator 810 are transferred to a second separator 820, which is also connected to a base storage unit 822 and a flocculant storage unit 824 that can dispense base and flocculant as needed according to the process disclosed herein. Scandium precipitates from the second separator 820 as a scandium-enriched solid concentrate 826 and the remainder of the material still containing significant REEs is passed to a third separator 830. If scandium is not collected, REE-containing material is passed from the first separator 810 directly to the third separator 830. The third separator 830 is connected to base storage unit 832 and flocculant storage unit 834 that can dispense base and flocculant as needed into the third separator 830; effluent from this process 838 is discharged from the system and the REE-enriched solid pre-concentrate 836 produced by this process is transferred to a first mixer 840, wherein the mixer is connected to an acid storage unit 842 that can dispense acid into the mixer 840 as needed to control the pH of the solution as disclosed herein. Material passes from the mixer 840 to a first filter 850 wherein leach residue 852 is separated from liquid material that is then transferred to a second mixer 860 that is connected to a base storage unit 862 that can dispense base into the mixer 860 as needed. From mixer 860 liquids are passed to a second filter 870 and leach residue 872 is discarded while filtrate is transferred as PLS to storage unit 880 for later use in solvent extraction procedures 882.

In one aspect, feedstock useful in step 1 can include raw AMD. In a further aspect, distribution of REE and major elements in 155 AMD sources in the Northern and Central Appalachian coal basins are provided in Table 1 below.

TABLE 1

Distribution of REE and Major Elements in Appalachian AMD Sources.

| CAPP AMD | | | | |
|---|---|---|---|---|
| REE (µg/L) | Mean | Confidence Interval | Number of Samples | CI:Mean Ratio |
| Sc | 3.12 | 1.12 | 49 | 0.36 |
| Y | 50.48 | 20.53 | 51 | 0.41 |
| La | 27.27 | 15.21 | 51 | 0.56 |
| Ce | 54.55 | 27.65 | 51 | 0.51 |
| Pr | 8.16 | 3.95 | 50 | 0.48 |
| Nd | 37.82 | 17.19 | 51 | 0.45 |
| Sm | 9.88 | 4.04 | 50 | 0.41 |
| Eu | 2.68 | 0.98 | 50 | 0.37 |
| Gd | 12.59 | 4.95 | 51 | 0.39 |
| Tb | 1.98 | 0.71 | 50 | 0.36 |
| Dy | 10.76 | 4.31 | 50 | 0.40 |
| Ho | 1.98 | 0.73 | 50 | 0.37 |
| Er | 5.08 | 2.09 | 50 | 0.41 |
| Tm | 0.82 | 0.25 | 49 | 0.30 |
| Yb | 3.95 | 1.58 | 50 | 0.40 |
| Lu | 0.72 | 0.21 | 49 | 0.29 |
| TREE | 231.85 | 103.12 | 50 | 0.44 |
| HREE | 91.48 | | | |
| LREE | 140.36 | | | |
| Median | 6.62 | 3.02 | 50 | 0.40 |
| Major Metal (mg/L) | | | | |
| Influent pH | 4.95 | 0.43 | 51 | 0.09 |
| Al | 13.23 | 5.21 | 51 | 0.39 |
| Ca | 169.84 | 27.19 | 51 | 0.16 |
| Fe | 19.06 | 13.09 | 51 | 0.69 |
| Mg | 126.06 | 26.86 | 51 | 0.21 |
| Mn | 10.93 | 3.37 | 51 | 0.31 |
| Na | 37.37 | 18.89 | 51 | 0.51 |
| Si | 11.06 | 2.27 | 51 | 0.21 |
| Cl | 5.40 | 2.94 | 50 | 0.54 |
| $SO_4$ | 1111.84 | 193.95 | 50 | 0.17 |
| TMM | 1504.77 | 293.78 | 51 | 3.19 |
| Median | 19.06 | 13.09 | 51 | 0.31 |

| NAPP AMD | | | | |
|---|---|---|---|---|
| REE (µg/L) | Mean | Confidence Interval | Number of Samples | CI:Mean Ratio |
| Sc | 6.34 | 1.55 | 131 | 0.24 |
| Y | 80.54 | 23.92 | 134 | 0.30 |
| La | 21.09 | 6.69 | 134 | 0.32 |
| Ce | 63.15 | 19.09 | 134 | 0.30 |
| Pr | 9.79 | 2.81 | 133 | 0.29 |
| Nd | 45.84 | 13.15 | 134 | 0.29 |
| Sm | 13.25 | 3.57 | 133 | 0.27 |
| Eu | 3.78 | 1.02 | 131 | 0.27 |
| Gd | 18.54 | 5.17 | 134 | 0.28 |
| Tb | 3.13 | 0.83 | 132 | 0.26 |
| Dy | 16.94 | 4.79 | 133 | 0.28 |
| Ho | 3.28 | 0.89 | 132 | 0.27 |
| Er | 8.28 | 2.40 | 133 | 0.29 |
| Tm | 1.28 | 0.30 | 130 | 0.23 |
| Yb | 6.36 | 1.79 | 134 | 0.28 |
| Lu | 1.08 | 0.25 | 130 | 0.23 |
| TREE | 302.69 | 85.99 | 133 | 0.28 |
| HREE | 145.79 | | | |
| LREE | 156.90 | | | |
| Median | 9.03 | 2.60 | 133 | 0.28 |

TABLE 1-continued

Distribution of REE and Major Elements in Appalachian AMD Sources.

Major Metal (mg/L)

| Influent pH | 4.21 | 0.34 | 132 | 0.08 |
|---|---|---|---|---|
| Al | 22.98 | 4.82 | 134 | 0.21 |
| Ca | 176.68 | 22.57 | 134 | 0.13 |
| Fe | 61.05 | 22.15 | 134 | 0.36 |
| Mg | 75.34 | 10.71 | 134 | 0.14 |
| Mn | 9.43 | 2.42 | 134 | 0.26 |
| Na | 519.65 | 185.99 | 134 | 0.36 |
| Si | 14.23 | 1.64 | 134 | 0.12 |
| Cl | 304.07 | 239.70 | 130 | 0.79 |
| $SO_4$ | 1704.43 | 337.54 | 130 | 0.20 |
| TMM | 2887.85 | 827.54 | 133 | 2.56 |
| Median | 75.34 | 22.15 | 134 | 0.21 |

In a further aspect, feedstocks with the compositional ranges in Table 1 are useful in the process disclosed herein. In one aspect, AMD can be the feedstock for the disclosed process; however, other feedstocks are also contemplated. In one aspect, the feedstocks useful herein do not include high levels of uranium, thorium, or other hazardous components.

Figure 22:
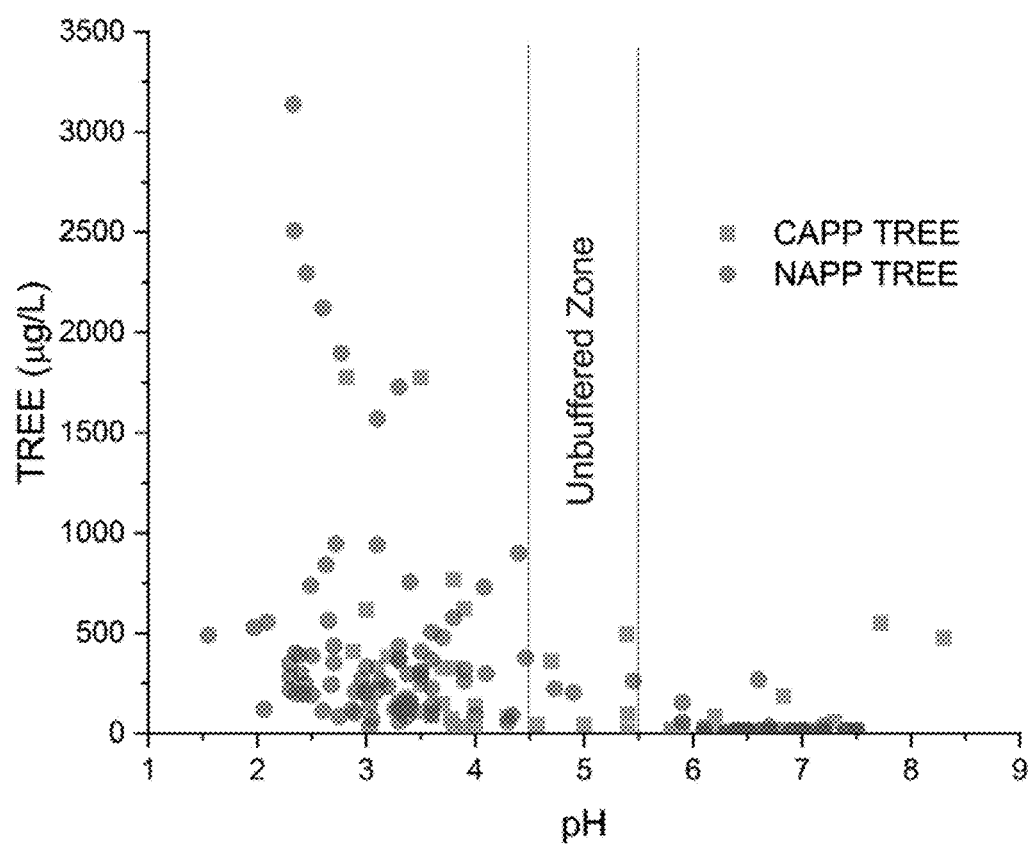
FIG. 22 shows representative data for distribution of AMD REE concentrations as a function of pH, where CAPP and NAPP represent, respectively, Central Appalachian and Northern Appalachian AMD sources enriched in REEs.

In one aspect, the process disclosed herein is capable of handling an AMD feedstock with a pH of from less than 2 to less than about 5.5, or of about less than 2, 2.5, 3, 3.5, 4, 4.5, 5, or 5.5. In one aspect, the feedstock pH is less than 3. In another aspect, the feedstock pH is less than 2. A typical distribution of AMD REE concentrations as a function of pH can be seen in FIG. 22.

In one aspect, in step 2 as disclosed above, base can be added to raise the resultant mixture pH to from about 4 to about 4.5, or about 4, 4.1, 4.2, 4.3, 4.4, or about 4.5, or a combination of any of the foregoing values, or a range encompassing any of the foregoing values. In a further aspect, the base can be NaOH, KOH, ammonia or ammonium hydroxide, calcium pellets, quicklime, lime slurry, or a combination thereof. In one aspect, the base is lime slurry.

In a further aspect, in step 4 as disclosed above, the discarded solids can be iron or aluminum and/or other gangue metals with similar chemical and physical properties.

In one aspect, if scandium is being recovered and step 5 in the disclosed process is being performed, when base is added, the desired resultant pH can be from about 4.9 to about 5.1, or about 4.9, 5.0, or about 5.1, or a combination of any of the foregoing values, or a range encompassing any of the foregoing values. In a further aspect, the base can be NaOH, KOH, ammonia or an ammonium compound, calcium pellets, quicklime, lime slurry, or a combination thereof. In one aspect, the base is lime slurry.

In one aspect, in step 7 as disclosed above, the desired resultant pH can be from about 8 to about 8.5, or about 7.8, 7.9, 8, 8.1, 8.2, 8.3, 8.4, 8.5, 8.6, or about 8.7, or a combination of any of the foregoing values, or a range encompassing any of the foregoing values. In a further aspect, the base can be NaOH, KOH, ammonia or ammonium hydroxide, calcium pellets, quicklime, lime slurry, or a combination thereof. In one aspect, the base is lime slurry. In one aspect, a higher pH from within the disclosed range may aid in recovering additional cobalt.

In one aspect, in step 11 as disclosed above, the desired resultant pH is from about 0.5 to about 3.2, or is about 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, or about 3.2, or a combination of any of the foregoing values, or a range encompassing any of the foregoing values. In some aspects, pH in this step can be chosen based on economic considerations such as, for example, sales value of product versus cost of acid added in this step. In another aspect, various acids are contemplated in this step including, but not limited to, sulfuric acid, nitric acid, hydrochloric acid, or a combination thereof. In one aspect, the acid is nitric acid. In another aspect, the acid is hydrochloric acid.

In some aspects, acid contact with the feedstock, raw material, or AMDp/eAMDp preconcentrate occurs in a reactor that is open to the atmosphere. In another aspect, this step can be conducted at room temperature. In another aspect, prior to acid addition, the feedstock, raw material, or AMDp/eAMDp preconcentrate can be contacted with water while mixing to create a slurry. In a still further aspect, the slurry is mixed with acid in step 11 as described above with continuous mixing to dissolve the REEs out of the solid feedstock. Optionally during step 11, an oxidizing agent can be used to enhance the efficiency of gangue metal separation from REE in the aqueous phase. In one aspect, the oxidizing agent can be hydrogen peroxide. Without wishing to be bound by theory, the reducing agent may precipitate iron and manganese hydroxides from the PLS. In a further aspect, and without wishing to be bound by theory, filtration at an acidic pH in this step prevents the formation of aluminosilicate gels and/or emulsions. In a still further aspect, gels and emulsions can prevent downstream steps of the process from proceeding to completion and can interfere with pumping and mixing.

In any of the above aspects, mixers in any step that requires a mixer can be connected in sequence to aid in product transfer from one mixer to the next. In some aspects, any of the above processes can be conducted partially (i.e., not to completion) if it is desired to reduce cost.

In one aspect, in step 13 as disclosed above, residual solids discarded in this step can include a large portion of silicon. In a further aspect, step 13 removes essentially all silicon from the feedstock. In a further aspect, a filter or other separation mechanism such as, for example, a plate and frame filter press, can be used to separate solids from liquid. In a further aspect, solids are retained in the filter or filter press, which is then cleaned and can be re-used. In some aspects, the filtering component can be made from or lined with polypropylene cloth.

In another aspect, in step 15 as disclosed above, the desired resultant solution pH can be from about 2.8 to about 3, or can be about 2.8, 2.85, 2.9, 2.95, or about 3, or a combination of any of the foregoing values, or a range encompassing any of the foregoing values. In some aspects, when HCl is used as the acid in step 13, MgO may be a suitable base for use in step 15. In other aspects, other bases can be used including, but not limited to, NaOH, KOH, ammonia or ammonium hydroxide, calcium pellets, quicklime, lime slurry, or a combination thereof. In one aspect, the base is NaOH.

In one aspect, in step 16 as disclosed herein, residual solids discarded typically include iron. In a further aspect, step 13 removes essentially all iron from the feedstock. In a further aspect, a filter or other separation mechanism such as, for example, a filter press or a plate and frame filter press, can be used to separate solids from liquid. In a further aspect, solids are retained in the filter or filter press, which is then cleaned and can be re-used. In some aspects, the filtering component can be made from or lined with polypropylene cloth. In some aspects, an oxidizing agent can optionally be used in step 13 to convert ferrous iron to ferric iron, which, without wishing to be bound by theory, may help with precipitation of iron compounds. In a further aspect, the oxidizing compound can be hydrogen peroxide or another chemical oxidizer. In an alternative aspect, mechanical or electrochemical oxidation can be used.

In one aspect, the pregnant leach solution can have variable composition depending on the composition of the feedstock used. Average values are given for PLS compositions in Table 2 below.

TABLE 2

Distribution of Elemental Concentrations from Typical PLS Samples.

| Element | Number of Samples | Mean* | Median* | Min.* | Max.* | Standard Deviation* | Confidence Interval* |
|---|---|---|---|---|---|---|---|
| Al | 33 | 4701.78 | 2736.24 | 2130.78 | 21,446.32 | 4637.25 | 1644.30 |
| Ca | 33 | 1008.67 | 745.22 | 590.10 | 2605.74 | 537.24 | 190.50 |
| Co | 33 | 43.56 | 24.04 | 18.43 | 195.29 | 46.09 | 16.34 |
| Fe | 33 | 363.78 | 4.96 | 2.20 | 3823.39 | 961.16 | 340.81 |
| Mg | 33 | 3068.26 | 2353.81 | 164.19 | 13,134.87 | 3109.94 | 1102.74 |
| Mn | 33 | 987.22 | 707.77 | 74.44 | 3689.29 | 963.37 | 341.60 |
| Na | 33 | 9225.59 | 9619.27 | 47.55 | 28,475.75 | 6479.95 | 2297.69 |
| Ni | 17 | 56.25 | 49.94 | 38.63 | 91.94 | 16.24 | 8.35 |
| Si | 33 | 346.34 | 73.96 | 32.54 | 3559.26 | 783.14 | 277.69 |
| Zn | 17 | 242.70 | 110.26 | 85.24 | 686.61 | 222.97 | 114.64 |
| $SO_4$ | 33 | 1059.86 | 1011.56 | 25.39 | 3141.38 | 518.79 | 183.96 |
| Cl | 33 | 9.38 | 5.06 | 2.04 | 77.87 | 12.86 | 4.56 |
| Sc | 31 | 552.50 | 133.92 | 74.75 | 2822.18 | 785.28 | 288.04 |
| Y | 33 | 23,970.81 | 13,527.36 | 7151.53 | 111,224.38 | 24,997.97 | 8863.89 |
| La | 33 | 6221.13 | 2697.71 | 1477.79 | 32,650.27 | 7826.85 | 2775.28 |
| Ce | 33 | 16,906.87 | 7749.36 | 4906.65 | 86,414.33 | 20,395.50 | 7231.93 |
| Pr | 33 | 2405.26 | 1281.05 | 782.96 | 10,803.77 | 2498.28 | 885.85 |
| Nd | 33 | 11,344.41 | 6492.20 | 3688.07 | 48,145.36 | 10,774.42 | 3820.44 |
| Sm | 33 | 3178.51 | 2087.37 | 1133.53 | 12,001.32 | 2548.86 | 903.78 |
| Eu | 33 | 838.37 | 530.82 | 302.10 | 3,223.56 | 688.45 | 244.12 |
| Gd | 33 | 4850.06 | 3046.42 | 1820.15 | 18,229.43 | 3932.68 | 1394.47 |
| Tb | 33 | 789.93 | 484.26 | 339.07 | 3,021.65 | 660.37 | 234.16 |
| Dy | 33 | 4491.55 | 2574.64 | 1995.76 | 18,229.21 | 4100.69 | 1454.04 |
| Ho | 33 | 885.34 | 487.86 | 354.92 | 3639.79 | 830.31 | 294.41 |
| Er | 33 | 2317.29 | 1227.86 | 908.26 | 10,032.59 | 2302.52 | 816.44 |
| Tm | 33 | 296.40 | 151.07 | 112.90 | 1291.24 | 298.81 | 105.95 |
| Yb | 33 | 1645.19 | 827.17 | 638.35 | 7380.85 | 1707.64 | 605.50 |
| Lu | 33 | 242.53 | 123.16 | 91.79 | 1100.99 | 251.70 | 89.25 |
| Th | 25 | 37.28 | 6.14 | 0.06 | 322.19 | 75.65 | 31.23 |
| U | 33 | 359.75 | 267.88 | 198.47 | 1205.17 | 219.05 | 77.67 |

*Units for aluminum through chloride are mg/L. Units for scandium through uranium are µg/L.

A flow diagram of the disclosed process can be seen in FIG. 23. A graphical representation of the disclosed process including optional scandium collection (step 5) can be seen in FIG. 24. In a further aspect, the process described herein can be implemented in a mobile- or commercial-scale plant as follows:

Upstream Concentrator: Full-Scale Unit Construction

In one aspect, disclosed herein is a full-scale AMD treatment plant with an integrated REE/CM recovery operation. In a further aspect, potential alterations to the treatment plant can include, but are not limited to: (1) staged precipitation using multiple clarifiers/thickeners in series; (2) independent pH control in each clarifier; and (3) additional materials handling and filtration units to recover and dewater the REE-enriched concentrates.

In a further aspect, to augment the traditional AMD treatment system, a state-of-the-art automation and control system to remotely monitor key operating parameters is disclosed herein. In another aspect, this package can provide real-time measurements of pump and mixer motor conditions, pH measurements, select ion concentrations, and other variables. In still another aspect, these values can be logged in an archival data format and used for feedback loop control.

In one aspect, all parts of the process disclosed herein can be conducted while following all pertinent local, state and federal regulations. In another aspect, upon completion of the construction activities a safety analysis/review can be performed prior to equipment startup and shakedown.

Upstream Concentrator: Full-Scale Unit Operation

In one aspect, disclosed herein are the following parameters for full-scale operation of an upstream concentrator as disclosed herein: (1) the specific locations of sampling points within the system and expected consistency of those samples (liquid, solid, or slurry); (2) the specific procedures for obtaining, handling, transporting, and storing various sample types; (3) the expected frequency and extent of sample collection for both routine and intensive analysis; (4) the specific protocols for analyzing samples and interpreting the resultant data; and (5) the protocols for retaining and archiving samples.

In one aspect, disclosed herein is a test matrix to gather performance data under different operating conditions while ensuring that the final water discharge meets National Pollutant Discharge Elimination System (NPDES) permit requirements. In a further aspect, the test matrix is based on results from the small-scale unit evaluation and includes expected variations in AMD flow and REE concentration that follow seasonal variations throughout the calendar year. In a further aspect, these natural variations can be tracked over time and used to evaluate the robustness and resiliency of the REE/CM enrichment process.

In a further aspect, after identifying and validating the optimal process operational parameters, the upstream concentrator will be operated continuously at those settings. In one aspect, REE/CM preconcentrates generated during this time will be collected into 55-gallon drums or geotextile super sacks and stored for future testing in the disclosed downstream processing units.

Acid Leaching/Solvent Extraction: System Design

In one aspect, disclosed herein is a system that processes the preconcentrates generated from the large-scale upstream concentration unit. Further in this aspect, the system includes, but is not limited to: (1) a mass-balanced process flowsheet, (2) piping and instrumentation diagrams, (3) a proposed facility layout, (4) a construction cost estimate based on vendor quotes, (5) a daily operational cost estimate, and (6) final engineering drawings of the pilot-scale plant.

In one aspect, the pilot-scale facility is co-located with the upstream concentrator at the host site. Further in this aspect, this location has adequate access to water, power, and other utilities that will be required for the pilot-scale system. In still another aspect, only minimal changes to the facility will be required prior to system commissioning.

Acid Leaching/Solvent Extraction: System Procurement, Construction and Installation In one aspect, site preparation may include clearing unnecessary equipment, reinforcing foundations or structures, and/or adding mechanical and electrical utilities. In a further aspect, these initial preparations ensure that equipment installation and assembly can be completed in a timely manner. In a still further aspect, fabricated components and final equipment can be shipped directly to the host site.

Acid Leaching/Solvent Extraction: System Shakedown, Training, and Troubleshooting In one aspect, the primary safety hazard expected herein is the use of strong acids in the leaching and solvent extraction units. At a minimum, acid resistant gloves and gowns and adequate ventilation in the testing area can be used to minimize risk to personnel, as will laboratory safety and chemical hygiene training.

In one aspect, a series of shakedown tests will be conducted to identify and resolve operational issues that may arise during the detailed system testing. In a further aspect, shakedown testing can provide an opportunity to mitigate these issues while providing key operational data that can support a detailed test campaign. In a still further aspect, specific goals of this testing program include, but are not limited to: (1) verify vendor specifications on capacity and power; (2) ensure the sufficiency of various ancillary equipment and utilities; (3) identify the operational limits to be used in detailed system testing. In a still further aspect, shakedown testing can be conducted by operating all unit operations under "water-only" conditions to first ensure the structural integrity of the process units. Further in this aspect, after water-only testing, solids can be slowly incorporated into the test regimen to ensure the adequacy of valves, pumps, and other fittings. In another aspect, strong acids and other chemicals can be added only after the system has been proven in these more benign conditions.

In one aspect, disclosed herein is a state-of-art real time monitoring and control system that can provide real-time measurements of pump and mixer motor conditions, pH measurements, select ion concentrations, and other variables. In a further aspect, these values can be logged in an archival data format and used for feedback loop control. In still another aspect, this task also includes all troubleshooting needed to ensure consistent and safe operation of the pilot-scale system.

Acid Leaching/Solvent Extraction: System Parametric Testing

In one aspect, using feedstocks produced from previous stages of the process disclosed herein, acid leaching and solvent extraction tests can be conducted over an extended operating period. In another aspect, each experimental condition may require at least 64 hours of continuous testing, and the solvent extraction (SX) operation is anticipated to run continuously for 24 hours per day. In still another aspect, the specific items to be analyzed during this test campaign may include but are not limited to: (1) the influence of SX extractant type and concentration; (2) the influence of SX solvent type and ratio; (3) the influence of extracting and stripping acid type and pH; (4) the number of extracting and stripping stages needed to reach the target purity level. In another aspect, provided herein are pathways to remove non-target impurities and optimize the process with regards to separation efficiency, solvent recycling, and waste minimization. In one aspect, a test matrix can be generated using a statistical design of experiments, and specific conditions can be blocked and repeated to assess experimental error while mitigating the influence of covariates, such as ambient environmental conditions. In yet another aspect, results from this experimental design can be analyzed using a response surface methodology to identify the optimal conditions leading to the highest recovery and selectivity.

Alternative Feedstock Testing

In one aspect, after meeting objectives using the preferred AMD feedstock, other feedstocks can be evaluated in the ALSX pilot plant. In a further aspect, specific examples include, but are not limited to, AMD treatment sludges, coal refuse and under clays, fly ash and gasification char, other REE-enriched coal byproducts, and combinations thereof.

Laboratory Support and Testing

In one aspect, both aqueous and solid samples can be routinely analyzed for REE/CM, major gangue metals, trace gangue metals, and CMs. In a further aspect, REE aqueous concentrations can be determined using inductively coupled plasma-mass spectrometry (ICP-MS). In a still further aspect, solid samples can be digested by sodium peroxide ($Na_2O_2$) fusion and re-dissolution in hydrochloric acid and resulting aqueous analysis can then be undertaken using ICP-MS. In one aspect, major ions such as iron (Fe) and aluminum (Al) will be determined by a suitable technique such as, for example, inductively coupled plasma optical emission spectrometry (ICP-OES).

In yet another aspect, a broad scan of feedstocks can be used to identify other CMs and, if economically attractive, ensure that the disclosed ALSX process is modified for their recovery.

Economic Systems Analysis

In one aspect, experimental results from the various testing campaigns as well as model results from the system design optimization can be compiled into a techno-economic analysis (TEA). Further in this aspect, the analysis can report costs and performance at the existing scale and project those costs to the next design scale and/or a commercial implementation using standard scaling factors and itemized costs as appropriate. In one aspect, all analyses will use guidelines and assumptions provided by the National Energy Technology Laboratory (NETL), and results will be presented in accordance with NI 43-101 reporting standards for disclosing mineral projects. In any of these aspects, at a minimum, this analysis will include: a clear statement of the assumptions; cash forecasts on an annual basis; a discussion of potential net present value (NPV) and internal rate of return (IRR); a summary of the tax structure imposed; and a sensitivity analysis with respect to grade, price, and other significant input factors.

Environmental Systems Analysis

In one aspect, an environmental systems analysis can be conducted concurrently with the other project activities and may focus on two specific objectives: materials handling considerations and environmental compliance. In one aspect, the materials handling design will address the dewatering, filtration, and the short- and long-term material storage requirements for the upstream concentration process. In one aspect, specific research tasks to be addressed for the material handling system design include, but are not limited to:

1. In one aspect, the following elements for the woven geotextile GEOTUBE® bags proposed for the first and second splits have been explored at field scale: engineering strength and permittivity design, GEOTUBE® proportion sizing (length and diameter ratios), GEOTUBE® stacking configurations and techniques to ensure safe and environmentally benign dewatering operations.
2. In another aspect process treatment requirements for the GEOTUBE® water filtrate, primary liquid containment, liquid transport design and layout, and geotechnical material characterization consisting of material testing for physical, strength and permeability properties will be determined.
3. In another aspect, a series of numerical modeling activities can be performed for mathematical characterization of drainage in the system and the potential improvements. The outcome of the modeling is to compare and contrast with the laboratory testing and field results.
4. In still another aspect, increasing process efficiency can be studied to identify and reduce barriers to future technology entry into the REE/CM commercialization. Further in this aspect, one specific area for efficiency improvement is sediment dewatering of the feedstock from splits 2 and 3, and the iron-rich sediment from split 1.

Figure 9:
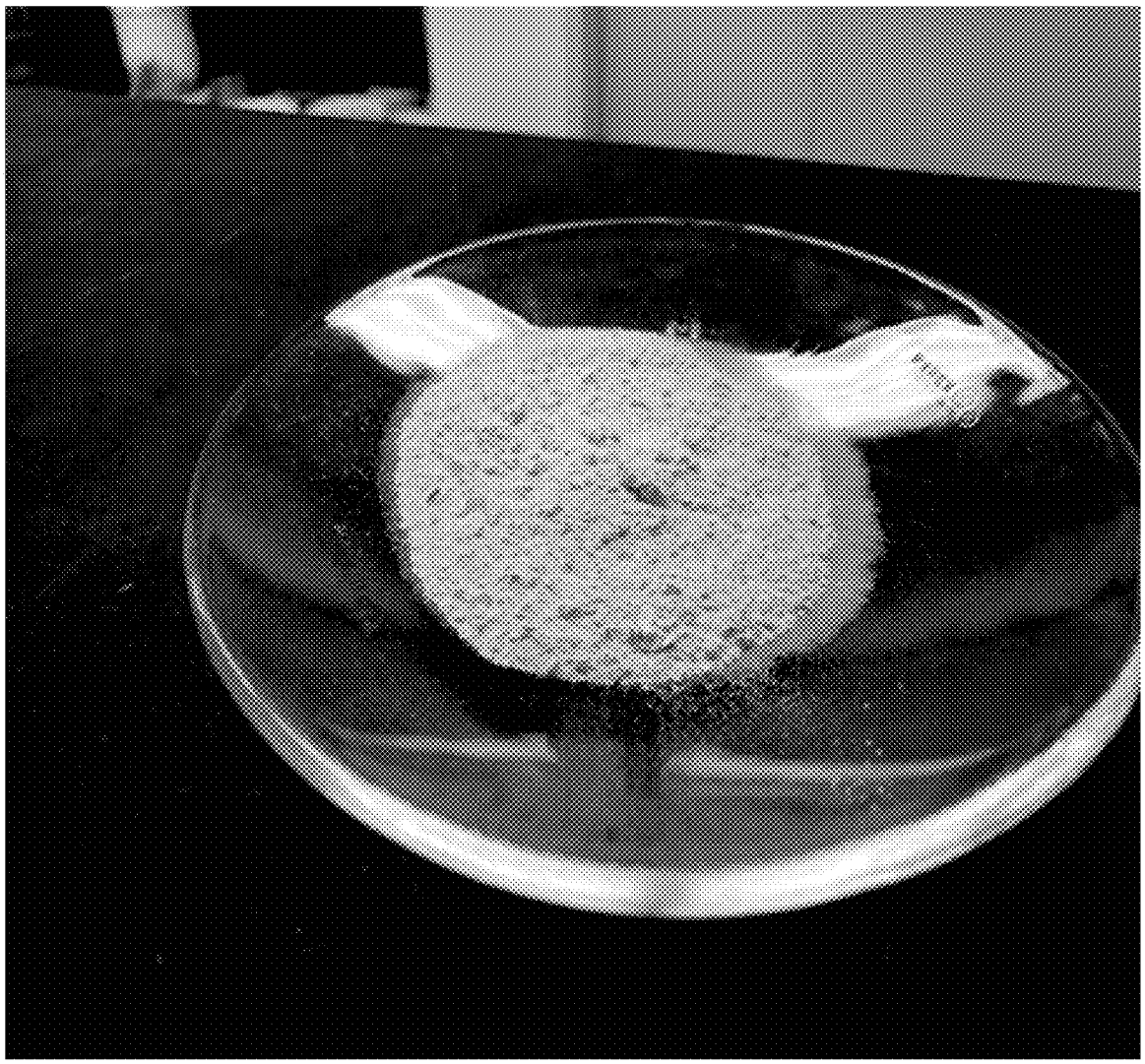
FIG. 9 shows a photographic image of representative high grade (80%) rare earth concentrate produced by a process disclosed herein.

In one aspect, using hydrometallurgical methods in the disclosed process at the bench scale, we produced a concentrate with 80% rare earth oxides from AMD treatment sludge (FIG. 9).

In one aspect, we have evaluated extraction of REE/CM from AMD treatment precipitates and from untreated AMD. In one aspect, unprocessed AMD treatment solids can be transported to a central acid leaching/solvent extraction (ALSX) facility for final processing into a high grade mixed rare earth oxide (MREO). In an alternative aspect, a field concentrate can be extracted and dewatered upstream of a conventional AMD treatment plant and transported to the ALSX facility. In a further aspect, the process disclosed herein can accept and produce an REE/CM concentrate from either source.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

REFERENCES

1. Stumm, W., and Morgan, J. J. 1995. *Aquatic Chemistry, Chemical Equilibria and Rates in Natural Waters*, 3rd ed. Hoboken, N.J.: John Wley & Sons, Inc.: 1022 pp.
2. Kim, E and Osseo-Asare, K. 2012. "Aqueous stability of thorium and rare earth metals in monazite hydrometallurgy: Eh-pH diagrams for the systems Th-, Ce-, La-, Nd—$(PO_4)$—$(SO_4)$—$H_2O$ at 25° C.," *Hydrometallurgy*, 113-114:67-78.
3. Pourbaix, M., 1966. *Atlas of electrochemical equilibrium in aqueous solution*. New York, NY:Pergamon.
4. Bourricaudy, Ernesto et al. 2016. "Commissioning of a Mini SX Pilot Plant at SGS Minerals—Lakefield Site". In: *IMPC* 2016: *XXVIII International Mineral Processing Congress Proceedings*. Quebec, Canada: pp. 1-16.
5. Chiarizia, Renato and Alexandra Briand, 2007. "Third phase formation in the extraction of inorganic acids by TBP in n-Octane," *Solvent Extraction and Ion Exchange*, 25:351-371.
6. Kedari, C S et al., 2006. "Third Phase Formation in the Solvent Extraction System Ir (IV)-Cyanex 923," *Solvent Extraction and Ion Exchange*, 23:545-559.
7. Koermer, Scott and Aaron Noble (2018). "Unpublished Solvent Extraction Research". PhD thesis. Virginia Polytechnic University.
8. Ren, Panpan, 2019. "Recovery of Rare Earth Elements (REEs) from Coal Mine Drainage Sludge Leachate," PhD thesis. West Virginia University.
9. Ritcey, G. M., 1980. "Crud in solvent extraction processing—a review of causes and treatment," *Hydrometallurgy*, 5:97-107.
10. Ritcey, G. M. and A. W. Ashbrook, 1979. *Solvent Extraction Principles and Applications to Process Metallurgy Part II. Volume* 1. Amsterdam: Elsevier Scientific Publishing.
11. Ritcey, G. M. and A. W. Ashbrook, 1984. *Solvent extraction Principles and Applications to Process Metallurgy Part I. Volume* 1. Amsterdam: Elsevier Scientific Publishing.
12. Takeno, Naoto, 2005. "Atlas of Eh-pH diagrams—Intercomparison of thermodynamic databases" Geological Survey of Japan, Tech. Rep. 419:1-287.
13. Wang, Weiwei, Yoko Pranolo, and Chu Yong Cheng, 2013. "Recovery of scandium from synthetic red mud leach solutions by solvent extraction with D2EHPA," *Separation and Purification Technology*, 108: 96-102.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Analytical Methods

ICP-MS was conducted using a Nexlon 2000-P instrument from Perkin Elmer equipped with an external Autodiluter S400V from Elemental Scientific. Syngistic 2.4 software was used to collect and analyze data according to the EPA 200.8 Rev. 5.4 method (1994).

ICP-OES was conducted on an ICP-OES 720 instrument from Agilent Technologies using Expert II software according to method EPA 200.7 Rev. 4.4 (1994).

A Gallery Discrete Analyzer System (CPQ-00096605 from Thermo Fisher Scientific) was used for some measurements including pH. Data was collected and analyzed using Gallery software 6.0.1 according to method SM 4500-E 2011.

Thermogravimetric was conducted using a TGA 801 instrument from LECO with software package cornerstone version 2.8.8. The method used to determine moisture levels was developed inhouse with sample being brought from room temperature to 105° C. and held to constant weight.

Acid digestion was a manual technique using a 1:1 ratio of nitric acid to sample. Additional data analysis for all techniques was conducted using Microsoft Excel.

Example 2: Laboratory-Scale Experiments and Process Considerations

Laboratory experiments were performed prior to scaling up the disclosed process. Preliminary results produced solid feedstock with REE/CM averaging 2.88% in the laboratory (see Table 3) to 0.2% in an initial, continuous field extraction trial. Of that amount, 0.14% were mixed REE oxides (MREO), including the five REEs that are also CM (0.07%) and the critical mineral cobalt (0.06%).

TABLE 3

Enrichment of Raw AMD Samples.

| Site | REEs in Raw AMD (µg/L) | MREO Grade (%) | Enrichment Factor |
| --- | --- | --- | --- |
| AQ 51 | 738 | 1.30 | 17,615 |
| AQ 2 | 352 | 2.08 | 59,091 |
| AQ 50 | 2119 | 2.20 | 10,382 |
| AQ 8 | 2353 | 3.16 | 13,430 |
| AQ 65 | 1300 | 5.65 | 43,439 |
| Average | 1372 | 2.88 | 28,791 |

Figure 1A:
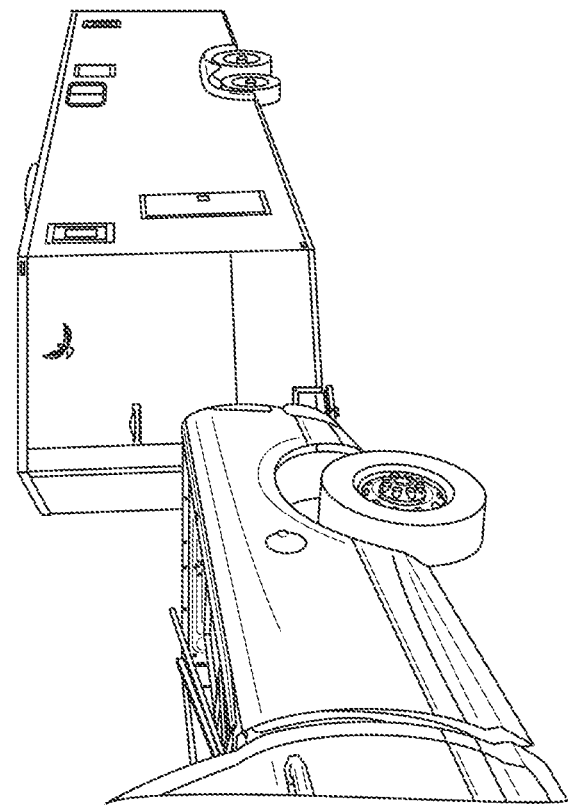
Figure 2A:
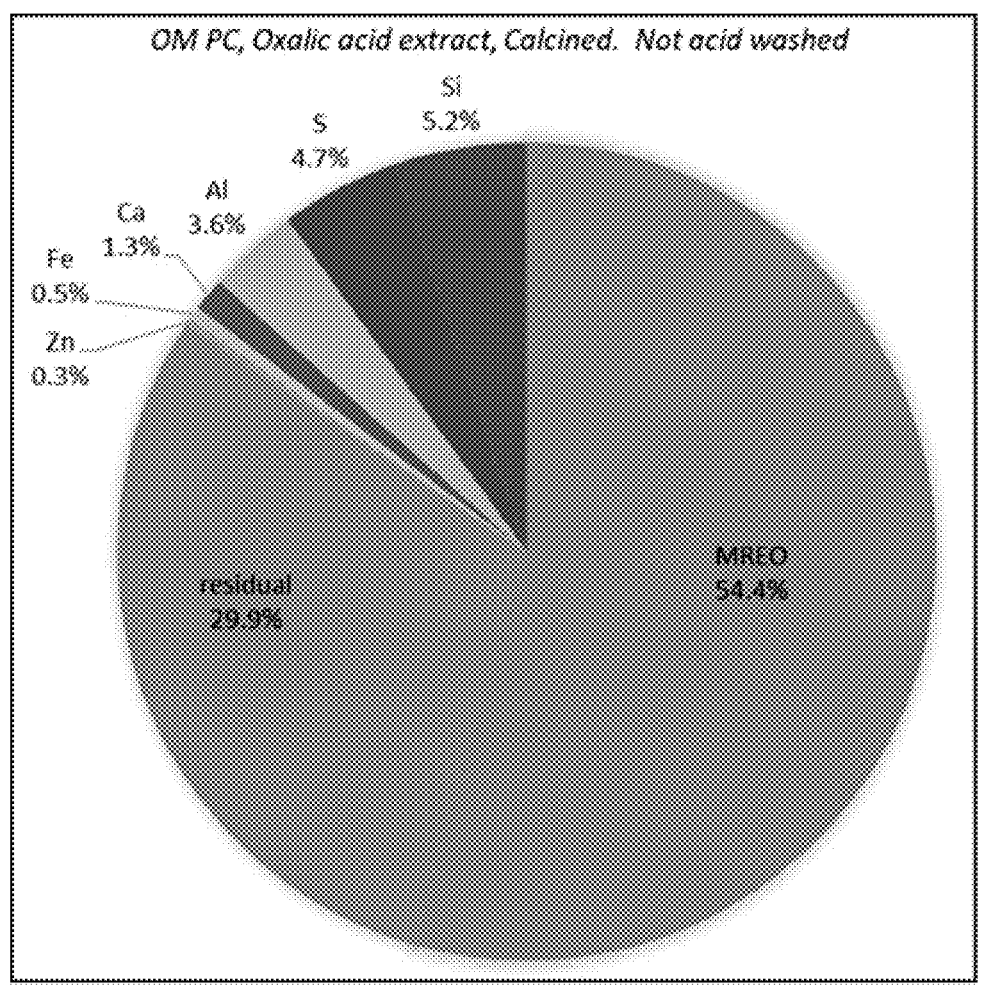
FIGS. 2A-2B show representative analysis of samples treated by the disclosed process.
Figure 2B:
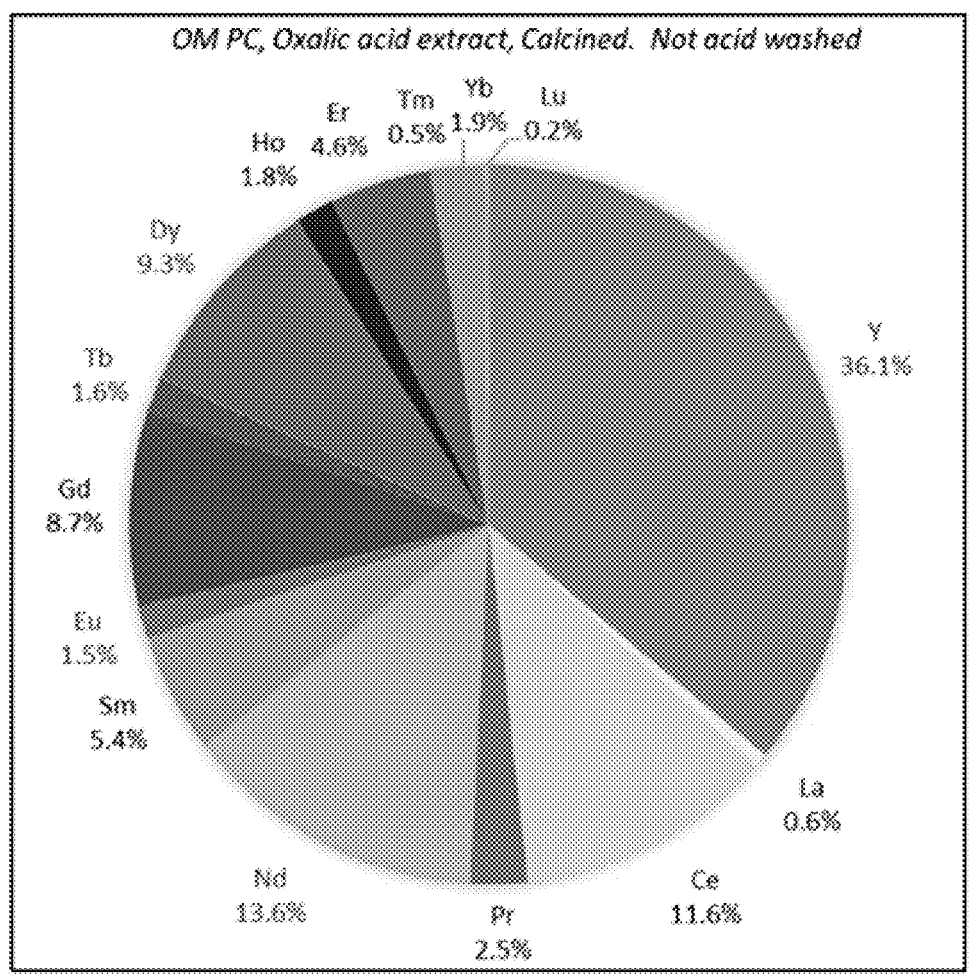

A field trial of a mobile version of the plant disclosed herein (see FIG. 1) was deployed at a conventional AMD treatment plant referred to herein as the Omega Site. Preconcentrate from that plant (MREO=0.2%), when processed via ALSX, yielded a final MREO grade of 54.4% without acid washing (FIG. 2). In some experiments, acid washing increased MREO from 40% to either 62 or 80% by reducing the residual fraction by roughly one half. It is significant that the LREO and HREO were 35.3 and 64.7% respectively while adding CM to the HREO yields 64.7%.

The disclosed plant and process feature a staged precipitation/AMD treatment unit that concentrates REEs away from major gangue elements while simultaneously producing clean water for discharge. Significant gains in efficiency and cost can be made by integrating AMD treatment with REE/CM recovery. Standard compliance-based AMD treatment raises the pH of the AMD from the inflow value (typically 2.5 to 3.5) to the final value needed for discharge (7 to 8) in a single stage. This single-step precipitation can significantly concentrate REEs; however, it also captures several problematic gangue metals into the sludge byproduct. Previous work focusing on REE extraction from sludge showed that these gangue metals contribute to high transportation costs, high acid consumption, and challenging separation.

The current process focuses on raw AMD in the early stages of standard treatment and use staged precipitation to isolate the REEs from the other gangue elements. A simplified process schematic for performing this staged precipitation is shown in FIG. 3. In this depiction, staged precipitation is achieved by using two reagent mixing units and three clarifiers. Two parallel clarifiers (A and B) receive AMD adjusted to the first pH setpoint provided by mixer A. This provides the bulk of AMD treatment capacity. The underflow from clarifiers A and B largely consists of iron and aluminum oxy-hydroxides and can be disposed similarly to conventional AMD treatment byproducts, i.e. dewatering cells or GEOTUBE®. Mixer B increases the pH of the clarifier A and B overflow to precipitate the REE/CM for removal in clarifier C. At this point in the circuit, the solid product is largely devoid of deleterious gangue metals and contains few acid consuming constituents. The underflow solids from clarifier C is a REE/CM preconcentrate which would be dewatered and delivered to the ALSX plant for final concentration. Since the pH is raised to circumneutral values in the final stage, the third clarifier overflow can be safely discharged to the environment while meeting NPDES limits.

Testing shows that the disclosed process can effectively concentrate REE/CMs from raw AMD, with overall enrichment factors ranging from 13,000x to 15,000x. More importantly, the process has proven to be extremely robust, as testing on different water feedstocks representing a variety of geochemical settings has consistently produced similar results with respect to final REE purity. Other testing has evaluated in the influence of raw water characteristics, alkaline material, pH endpoint, redox potential, and the use of flocculant, and the number of process stages. When properly optimized, these procedures have consistently achieved REE/CM recovery >96% and generated products with REE/CM grade consistently between 0.1% to 5% wt %.

Specific testing of the host site will focus on a single AMD source in continuous run mode, as described in the Examples that follow. The upstream concentrator will be evaluated on its ability to manage variations in flow and AMD concentration while satisfying three parameters: NPDES permit compliance, operating costs and ability to supply the ALSX plant with feedstock of adequate grade (~0.1% to 5% MREO). The ALSX plant will be evaluated based on operating cost and product grade approaching or exceeding 35% to 95%. The added infrastructure includes an additional clarifier in series with the two clarifiers normally required of an AMD plant of this capacity. Also, independent lime dosing and additional materials handling will be needed to isolate the REE preconcentrate. Since the beginning and ending pH points for this process are similar to those of conventional AMD treatment, the process is expected to add only modestly to base consumption. This outcome is particularly favorable given the high consumable costs for many REE concentration strategies.

Table 4 illustrates the data analysis based on laboratory testing to identify pH set points for the AMD/REE preconcentrator, based on laboratory batch testing. Recovery to precipitate indicates the extent to which the major gangue elements are rejected at the early stages of the process while REEs are recovered to the final precipitate to a very high degree (97%). With a grade of 48,015 mg REE/kg or 4.8%.

TABLE 4

Laboratory Extraction Testing at 3 pH Set Points.

| Element | Precipitate Concentration | | | | Recovery of Precipitate (%) | | |
|---|---|---|---|---|---|---|---|
| | pH 4.0 | pH 5.0 | pH 8.0 | Total | pH 4.0 | pH 5.0 | pH 8.0 |
| Fe | 373,600 | 2,436 | 7,253 | 383,289 | 97 | 1 | 2 |
| Al | 37,677 | 235,055 | 35,704 | 308,435 | 12 | 76 | 12 |
| S | 52,100 | 72,459 | 7,107 | 131,666 | 4 | 55 | 5 |
| Si | 4,623 | 13,504 | 98,068 | 116,195 | 4 | 12 | 84 |
| Zn | 50 | 478 | 110,268 | 110,796 | 0 | 0 | 100 |
| Mn | 9,788 | 4,181 | 63,521 | 77,491 | 13 | 5 | 82 |
| Mg | 397 | 616 | 32,540 | 33,552 | 1 | 2 | 97 |
| Ca | 1,296 | 2,387 | 9,930 | 13,613 | 10 | 18 | 73 |
| Co | 48 | 35 | 8,025 | 8,108 | 1 | 0 | 99 |
| Ni | 108 | 109 | 5,710 | 5,927 | 2 | 2 | 96 |
| Cd | 20 | 0 | 138 | 158 | 12 | 0 | 87 |
| Cl | 0 | 11 | 95 | 106 | 0 | 11 | 89 |
| Total | 479,706 | 331,271 | 378,358 | 1,189,336 | 40 | 28 | 32 |
| Sc | 18 | 59 | 18 | 95 | 19 | 62 | 19 |
| Y | 27 | 325 | 13,307 | 13,659 | 0 | 2 | 97 |
| La | 7 | 15 | 3,597 | 3,618 | 0 | 0 | 99 |
| Ce | 136 | 127 | 8,950 | 9,212 | 1 | 1 | 97 |
| Pr | 8 | 17 | 1,786 | 1,811 | 0 | 1 | 99 |
| Nd | 52 | 97 | 9,019 | 9,168 | 1 | 1 | 98 |
| Sm | 15 | 45 | 2,386 | 2,446 | 1 | 2 | 98 |
| Eu | 3 | 13 | 586 | 602 | 1 | 2 | 97 |
| Gd | 14 | 67 | 3,473 | 3,554 | 0 | 2 | 98 |
| Tb | 2 | 13 | 450 | 465 | 0 | 3 | 97 |
| Dy | 10 | 86 | 2,286 | 2,382 | 0 | 4 | 96 |
| Ho | 2 | 16 | 415 | 422 | 0 | 4 | 96 |
| Er | 5 | 48 | 1,008 | 1,061 | 0 | 5 | 95 |
| Tm | 1 | 8 | 116 | 124 | 1 | 6 | 93 |
| Yb | 5 | 49 | 541 | 594 | 1 | 8 | 91 |
| Lu | 1 | 7 | 80 | 88 | 1 | 8 | 91 |
| TREE | 305 | 991 | 48,015 | 49,311 | 1 | 2 | 97 |
| Th | 158.7 | 6.2 | 0.9 | 165.9 | 95.7 | 3.8 | 0.6 |
| U | 1.8 | 22.3 | 96.1 | 120.2 | 1.5 | 18.6 | 80.0 |
| TAc* | 160.5 | 28.6 | 97.1 | 286.1 | 97.2 | 22.3 | 80.5 |

*Total actinides.

The incremental lime dosage rates and costs for the Upstream Concentrator and resulting resource, grade and recovery are estimated at each pH set point (Table 5). Based on two samples from an initial testing site, this type of analysis can be used to quickly identify the most efficient pH set points based on operating cost, grade and recovery. This type of testing protocol and knowledge gained while processing upstream concentrate samples through our ALSX plant will minimize scaling risk as the AMD/REE is designed, installed and operated.

Figure 4B:
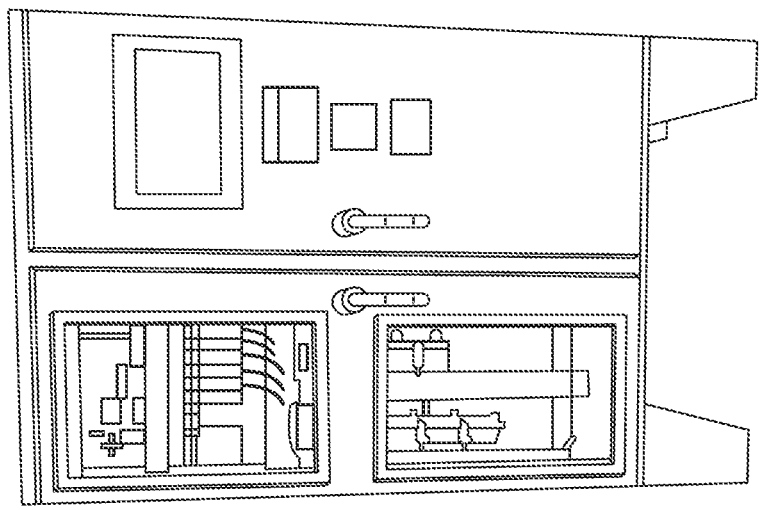
FIGS. 4A-4B each show exemplary aspects of a rare earth extraction facility (REEF).
Figure 4A:
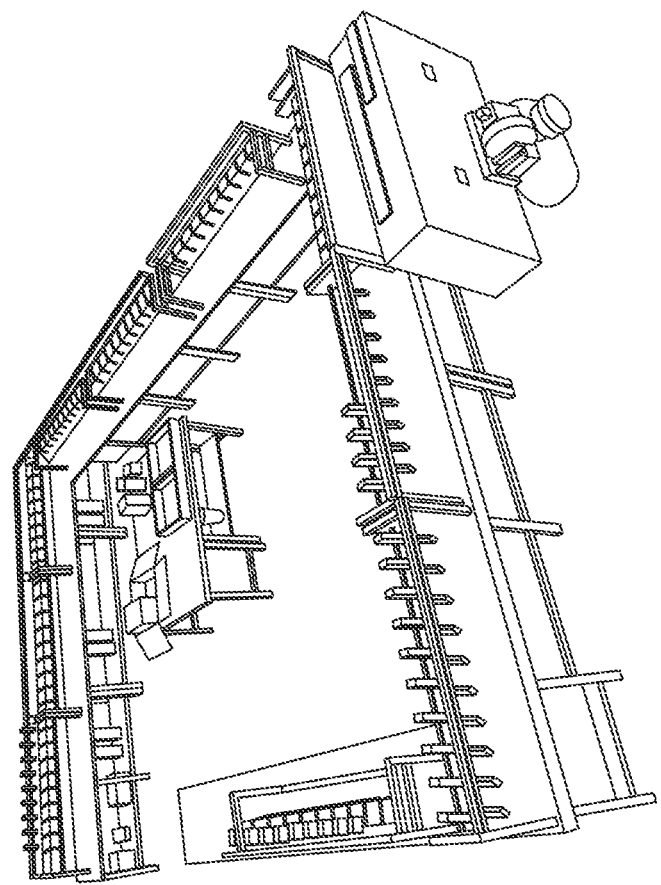

The disclosed processes involves an acid leaching/solvent extraction process that can further enrich the REE preconcentrates to commercially attractive purity levels. A bench-scale solvent extraction system to extract REEs from AMD precipitates and concentrate them into a final REO product has been designed. The Rare Earth Extraction Facility (REEF) on the West Virginia University (WVU) campus contains an acid leaching circuit, 100 mixer-settler units, and downstream precipitation vessels. The system has also integrated state-of-the-art sensors and controls provided by Rockwell Automation (FIG. 4).

TABLE 5

Process Analysis: Two Runs at the Omega AMD Plant using Two pH Set Points.

| Parameter | Run 1 Raw AMD | pH Set Point 4.0 | pH Set Point 8.0 | Run 2 Raw AMD | pH Set Point 4.0 | pH Set Point 8.0 |
|---|---|---|---|---|---|---|
| Acidity | 302 | 116 | 30 | 461 | 53 | 46 |
| Q (gpm) | 500 | 500 | 500 | 500 | 500 | 500 |
| Acid Load (lb/day) | 1813 | 698 | 178 | 2765 | 316 | 275 |
| TM M (mg/L) | 74 | 45 | 16 | 115 | 42 | 39 |
| TREE (pg/L) | 841 | 824 | 23 | 1319 | 1006 | 64 |
| Acid Load (tpd) | 1813 | 698 | 178 | 2764 | 316 | 275 |
| Lime Dosing Rate (lb/day) | 1495 | 576 | 147 | 2279 | 261 | 227 |
| Lime Cost ($/day) | $149.48 | $57.58 | $14.67 | $227.5 | $26.06 | $22.68 |
| % Total Lime Cost | 67% | 26% | 7% | 82% | 9% | 8% |
| TREE Grade (mg/kg) | | 102.8 | 5681.8 | | 991 | 48,015 |
| TREE Recovery | | 5.21% | 91.63% | | 30.92% | 65.41% |

Figure 5:
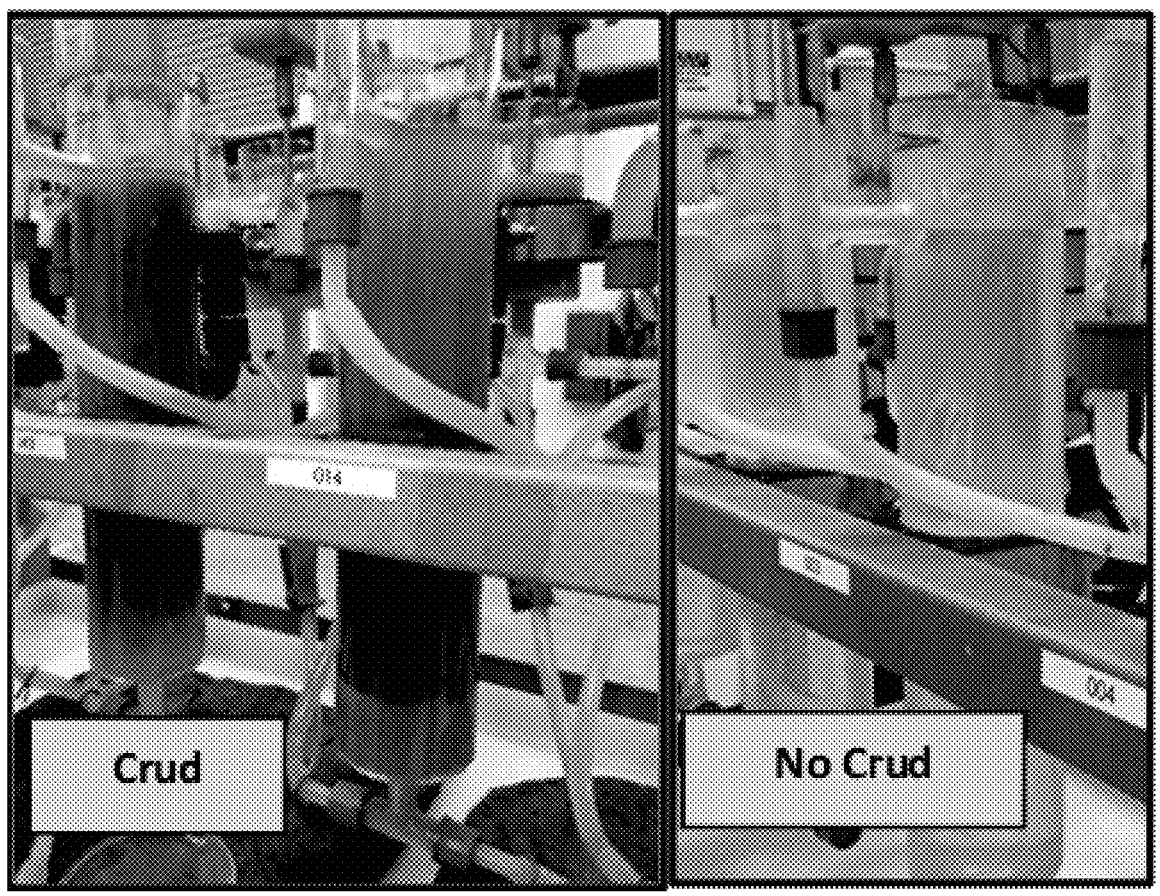
FIG. 5 shows ALSX units before (left) and after (right) development and implementation of measures developed to control crud formation.

Bench-scale testing has allowed problems to be addressed prior to full site scale-up. Given the distribution and concentration of metals in typical AMD-based leachates, crud formation has proven to be a major nuisance in SX operation. Gangue element concentration was carefully monitored during testing and leaching conditions were adjusted as necessary. FIG. 5 shows SX operation with and without crud formation.

Data collected from this test facility has proven the technical feasibility of concentrating REEs from AMD-based feedstocks. Prior testing campaigns have investigated the influence of several operational variables, including leaching pH, extractant concentration, organic to aqueous ratios, stripping acid type and concentration, precipitation conditions, and system feed flow rates. From this testing, optimal operating conditions have been identified and the process has been validated using three sources of run-of-mine AMD treatment solids. Sources include the Omega, DLM and Royal Scott AMD treatment plants operated by West Virginia Department of Environmental Protection (WVDEP). Resulting MREO concentrations ranged from 62 to 80%.

The preconcentrate from the upstream concentrator can be transported to an adjacent pilot-scale ALSX plant for final concentration to the high-grade MREO product. This approach includes several key changes from existing ALSX facilities. First, these efforts represent an increase in project scale. The existing plant has a maximum production rate of 3 g/hr and the pilot-scale plant is expected to yield about 15.5 g MREO/hr. Second, the solid feedstock to the ALSX system will be modified with the pilot scale ALSX being fed by a preconcentrated feedstock from which most of the gangue metals have been removed. This modification has improved overall ALSX performance; prior laboratory-scale testing on preconcentrates from the staged precipitation process have shown that a 54% MREO product can be generated from a single stage of solvent extraction (FIG. 2). The existing bench-scale REEF on the WVU campus has been used to run off-line trials to optimize settings for the A34 (one site selected as a source) feedstock. In addition, the REEF facility has been used for additional elemental-based separations such as those optimized to recover cobalt and scandium.

The disclosed AMD/REE process facility can be based on two critical process technologies: 1) upstream concentration and 2) acid leaching/solvent extraction. A block flow diagram showing the individual steps associated with each process is shown in FIG. 6. None of the components of the disclosed process have ever been integrated to extract REEs from AMD-based feedstocks in a commercial setting.

The upstream concentration unit has been matured to a technology readiness level (TRL) of 7 (full-scale system demonstration), while the ALSX has been matured to a TRL of 6 (pilot-scale demonstration). The upstream concentration development has been designed and operated as a scaled-down version of the AMD treatment facility to be deployed at the host site. This scaled unit has further been used to evaluate and optimize operating parameters. The pilot-scale ALSX unit has been designed to be approximately $1/20^{th}$ the size of a full-scale unit.

The technical criteria defining project success are shown in Table 6. These values represent targets necessary for a commercial installation. To be competitive with other commercial REE resources (not including scandium or other CMs), overall production costs must be on the order of $50 to $75/kg of REE produced. The target performance requirements defined in this table represent a combination that is expected to achieve this cost target.

TABLE 6

Performance Targets.

| Performance Attribute | Commercial Target Performance Requirement |
|---|---|
| REE recovery in leaching stage | >80% |
| REE recovery in SX extraction stage | >90% |
| REE loss in scrubbing stage | <10% |
| REE recovery in SX stripping stage | >85% |
| REE preconcentrate trade | >0.5% |
| Grade of final MREO product | >90% |
| Actinide component of intermediate rare earth products | <1% of TREE content |
| Reagent consumption in acid leaching | <100 kg/t of feed |
| Solvent loss in solvent extraction | <200 ppm |
| Raffinate recycle | >25% |

Example 3: Upstream Mobile Concentration Unit

A flow diagram of the constructed upstream mobile concentration plant is shown in FIG. 10. Two circuits can be run in series or in parallel according to the disclosed design. In some experiments, a three-stage precipitation scheme was employed by using an on-site treatment clarifier as well as two circuits in the mobile plant; this configuration is shown using a dotted line in the flow diagram. In other experiments, the two mobile circuits were run in parallel to maximize production of precipitate using a two-stage precipitation procedure. After installation, shakedown testing was conducted to train the pH controllers to maintain a constant level in the two tanks.

A mobile plant as shown in FIG. 10 was plumbed into the system at the Omega AMD treatment plant, allowing for a split of clarified water to be pulled from the system's clarifier before discharge to settling or finishing ponds. Supplemental chemical treatment was also installed so that the Omega clarifier could operate at lower pH levels while still maintaining compliance with the National Pollutant Discharge Elimination System outlet at the end of the finishing pond. Elemental analysis of the products of the upstream concentration unit are shown in Table 7.

TABLE 7

Results from Operating Upstream Concentration Unit.

| Analyte | Omega Mobile Plant Aqueous Feed 4.35 pH µg/L | Mobile Plant Precipitated Product 8 mg/kg |
|---|---|---|
| Major Ions | | |
| Al | 27.95 | 190,382.11 |
| Ca | 354.09 | 21,825.29 |
| Co | 0.15 | 515.65 |
| Fe | 2.51 | 16,990.35 |
| Mg | 28.19 | 3107.08 |
| Mn | 0.90 | 2630.15 |
| Si | 18.17 | 79,936.27 |
| $SO_4$ | 1135.21 | 1374.75 |
| TMM | 1567.15 | 316,761.63 |
| Rare Earth Elements | | |
| Sc | 9.48 | 66.37 |
| Y | 46.15 | 318.64 |

TABLE 7-continued

Results from Operating Upstream Concentration Unit.

| Analyte | Omega Mobile Plant Aqueous Feed 4.35 µg/L | Mobile Plant Precipitated Product pH 8 mg/kg |
|---|---|---|
| La | 8.26 | 61.04 |
| Ce | 27.41 | 206.32 |
| Pr | 4.33 | 31.84 |
| Nd | 21.66 | 154.70 |
| Sm | 6.27 | 45.87 |
| Eu | 1.62 | 12.21 |
| Gd | 9.65 | 71.68 |
| Tb | 1.72 | 12.83 |
| Dy | 10.54 | 77.10 |
| Ho | 2.04 | 14.89 |
| Er | 5.57 | 40.83 |
| Tm | 0.73 | 5.59 |
| Yb | 4.25 | 31.73 |
| Lu | 0.63 | 4.83 |
| TREE | 160.32 | 1156.45 |
| Grade | 0.000016% | 0.12% |
| Actinides | | |
| Th | 0.14 | 1.69 |
| U | 2.33 | 12.16 |

Example 4: ALSX Bench-Scale Plant Operation

Process Overview

An ALSX plant was constructed to recover REEs from AMD precipitates. The plant design was based on extensive acid leaching and solvent extraction laboratory-scale studies. An initial system closely resembled the proposed design and shakedown testing was performed on each module of the plant to identify any construction or design oversights ranging from minor leaks to improper component specification. Following testing, modifications to the overall process were instituted to overcome any observed obstacles.

After shakedown testing and plant modification, the ALSX plant was placed into operation by implementing a decoupled, semi-batch process. The bench-scale system includes three operating units: an acid leaching and filtration module, a solvent extraction module, and a precipitation module. Initially, small batches (~60 L) of AMD precipitate (AMDp) were converted to pregnant leach solution (PLS) using the acid leaching portion of the plant. As the acid leaching technique was refined, larger batches were produced that could supply feedstock to the solvent extraction (SX) module for week-long runs. The SX process was scheduled to operate in eight hour shifts for five days per week until the PLS was exhausted.

Upon completion of the SX plant run, the stripped aqueous product was processed using the precipitation module to convert the REE cations to oxalates. Next, the REE oxalate solids were calcined to transform the oxalates to oxides. After calcination, multiple washing stages were required to separate the REEs from gangue elements; therefore, increasing the grade of the final product. As a result of these procedures, a 62% mixed rare earth oxide material was acquired from the ALSX plant.

Feedstock Acquisition and Material Handling

AMDp was collected from the proposed feedstock sites for processing in the ALSX bench-scale plant. Ten 55-gallon drums of AMDp were collected from each of the three AMD sites evaluated for this research. A small excavator was used to remove the AMDp from on-site storage ponds. Plastic drum liners were used to isolate the AMDp from the inside of the steel drums. Upon delivery to the facility, the drums were stored in a controlled environment until the material was required for leaching tests. Drums were placed on pallets at the time of loading. Once at the ALSX facility, a pallet jack was employed to maneuver the drums into the storage area. When required for leaching, the drums were maneuvered using an overhead crane and tilting drum-lifting mechanism. This configuration was utilized to hoist the drums to the acid leaching module where the AMDp was removed from the lined drum and placed into five-gallon buckets. Each of the buckets was individually weighed to record the mass of AMDp before it was used in the acid leaching process.

Acid Leaching Module

Figure 11:
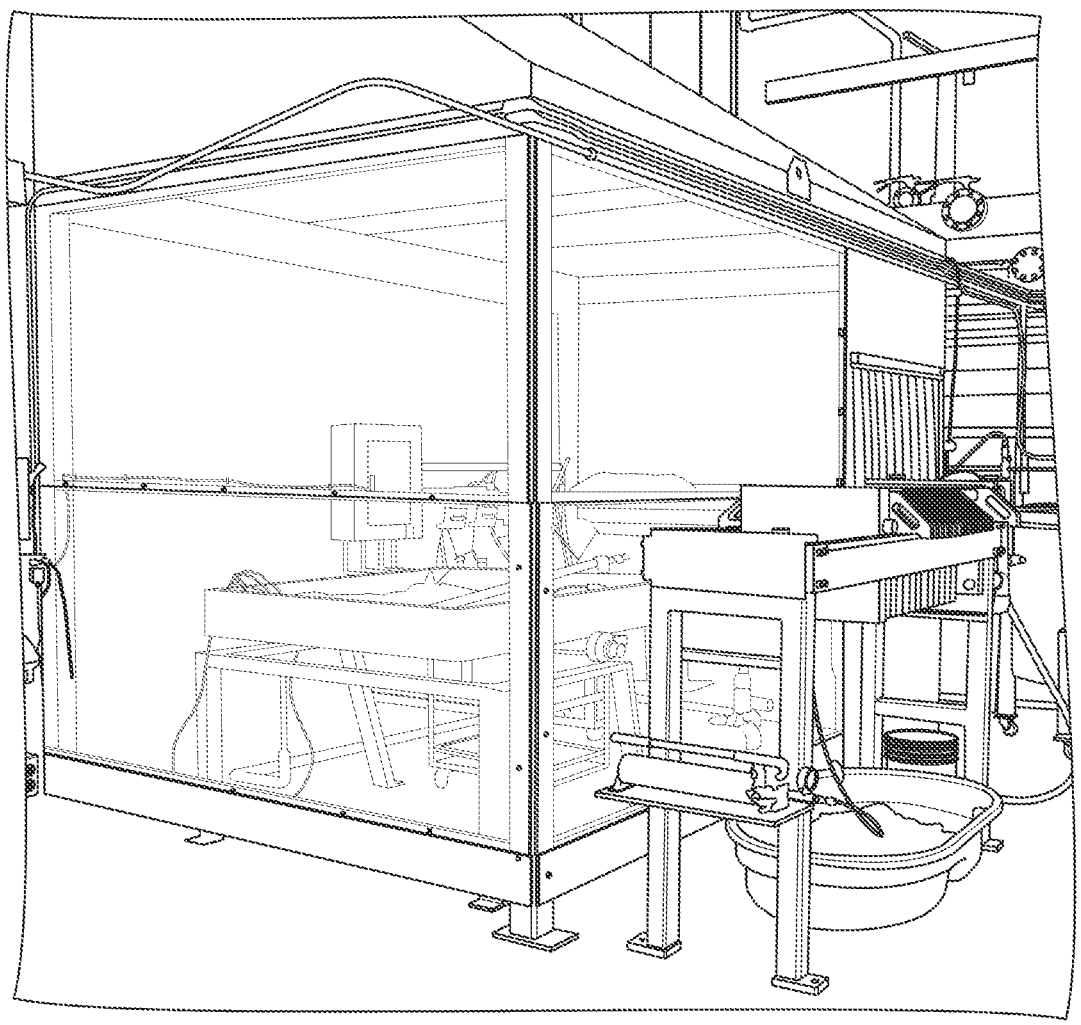
FIG. 11 shows an exemplary acid leaching module of a bench-scale plant as disclosed herein.

The acid leaching module is located adjacent to the solvent extraction system. FIG. 11 shows the as-built acid leaching operating area. The leaching vessels were operated under a full sized fume hood to prevent operator exposure to acidic fumes. The major components of the module include the fume hood, two 75-gallon agitated leaching mixing vessels, a 420 mm filter press with a 2.0 cubic-foot capacity, air diaphragm pumps, and an acid dosing system. Directly outside the fume hood, a scale holds a carboy of 68% nitric acid. The scale is used to monitor the amounts of chemicals and feedstock consumed in the leaching process.

Acid Leaching Shakedown Testing

During the shakedown testing of the ALSX system, several operational difficulties were encountered when using the ALSX system as it was initially designed. As a result, modifications to the acid leaching flow diagram were required to address these issues. The major operational challenges encountered and the flow diagram modifications implemented to overcome the unforeseen complications are presented below.

Gel Formation of PLS

Figure 12:
FIG. 12 shows representative pregnant leach solution (PLS) gel formation on a pan filter at pH 3.0. In one aspect, the method disclosed herein does not exhibit gel formation.

During initial shakedown testing, several batches of PLS would form into a gelatinous mixture when the pH was raised above the leaching pH set-point. This issue was observed in feedstock from all three AMD sites. FIG. 12 shows a representative sample of the gelatinous PLS after pH adjustment. The formation of this gel inhibited pumping of the PLS. Additionally, the gel prevented filtering of the PLS; and therefore, the separation of the solid and aqueous components of the leaching slurry was impractical.

In order to alleviate this issue, several lab-scale experiments were conducted to address the issue of gel formation. During testing, it was discovered that the PLS did not form a gel when an additional filtration step was added to the procedure.

This extra filtration step was introduced directly after the PLS was lowered to the leaching pH value of 0.7. When tested on the acid leaching module, the additional filtration step prevented the congealing of the PLS at pH values less than 4.0. As a result, this additional filtration step was implemented into the operating procedure.

Filtration

Even in the absence of PLS gel formation, the vacuum pan filter was unable to filter the PLS as it did not have a sufficient filtering area for the amount of solid material remaining after acid leaching. This condition was not addressed in the design phase because the small-scale testing apparatus used did not allow for a proper evaluation of the filtration. For example, leaching tests were conducted using vacuum filtration with a Buchner funnel and filter paper. This operating condition did not produce a significant amount of precipitate to evaluate the bed depth and therefore the necessary filtration area required to perform an efficient solid-liquid separation.

Figure 13B:
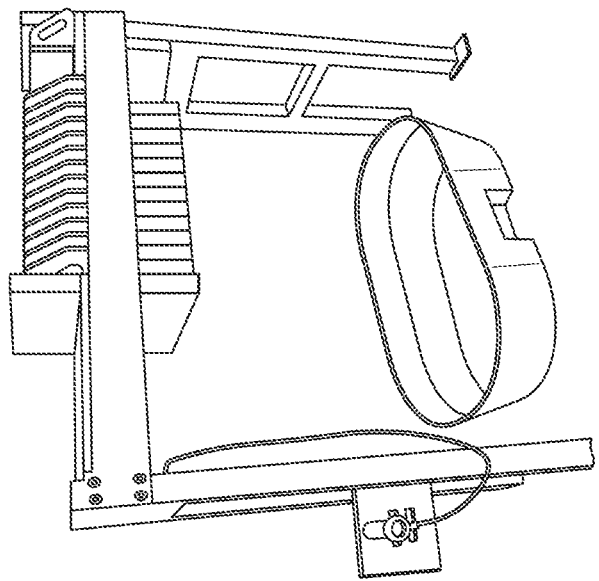
FIGS. 13A-13B show representative components useful in the processes disclosed herein.
Figure 13A:
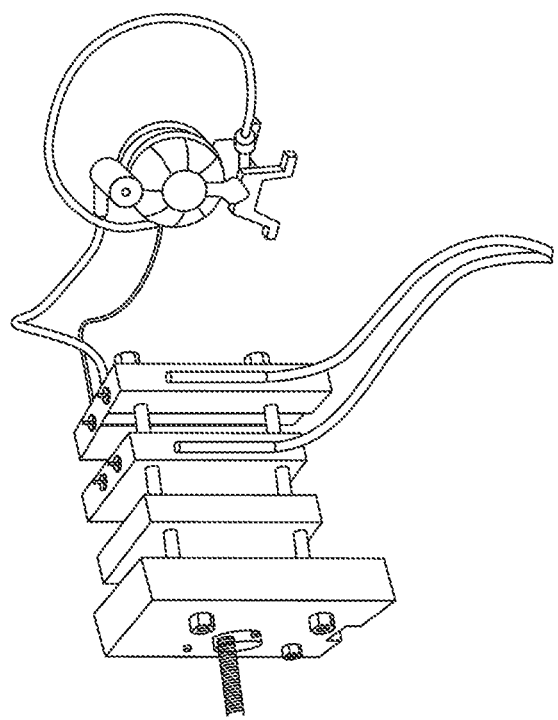

To mitigate this issue, a bench-scale plate and frame filter press were employed to efficiently filter the PLS. Multiple batches of PLS were created using the three different feedstocks. Testing indicated that the filter press was capable of filtering the PLS solutions from all of the feedstocks at multiple pH values. Results from this experiment indicated a 2 cubic-foot filter press was of sufficient capacity to properly filter PLS from a 75-gallon agitated leach tank and create a clarified PLS. FIG. 13 shows a 150 mm lab-scale press used during testing and a 420 mm filter press that later replaced the pan filter.

Full-scale testing with the 2 ft³ filter press was successful with all three feedstocks as a direct result of the increased filtration area. Originally, the pan filter had a usable filtration area of 25 ft². The new filtration unit increased the filtration area by a factor of almost 1.75 to 43 ft².

Figures 14A, 14B:
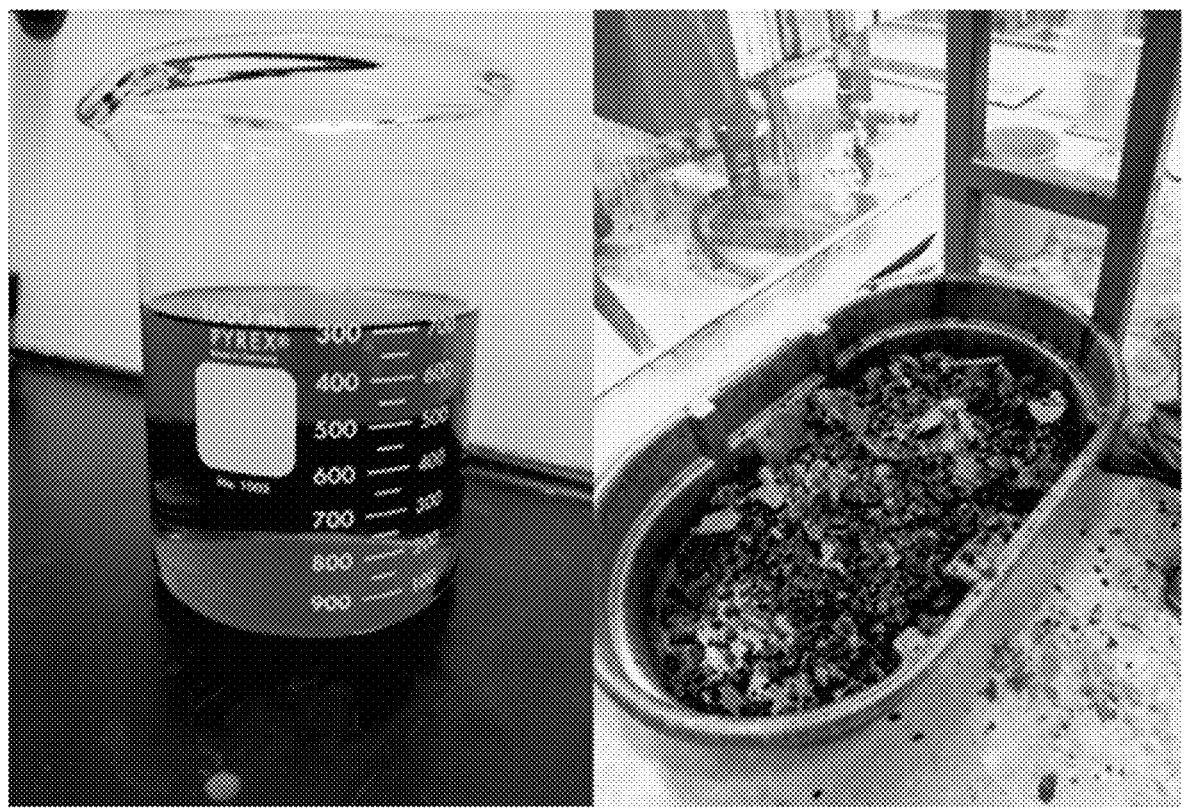
FIGS. 14A-14B show photographic images of aspects of filtration of PLS.

A Sandpiper S07 air diaphragm pump with a maximum capacity of 23 gpm was used to feed the filter press. The pump was supplied with polyvinylidene fluoride (PVDF) internal components to resist the corrosion when pumping acidic liquids. The filter cake obtained from the filter press achieved moisture values of approximately 60%, which was substantially better than previous filter cakes acquired using vacuum filtration. FIG. 14 shows the PLS filtrate and the residual solids that remained after operation of the filter press.

Acid Leaching Procedure and Results

Figure 15:
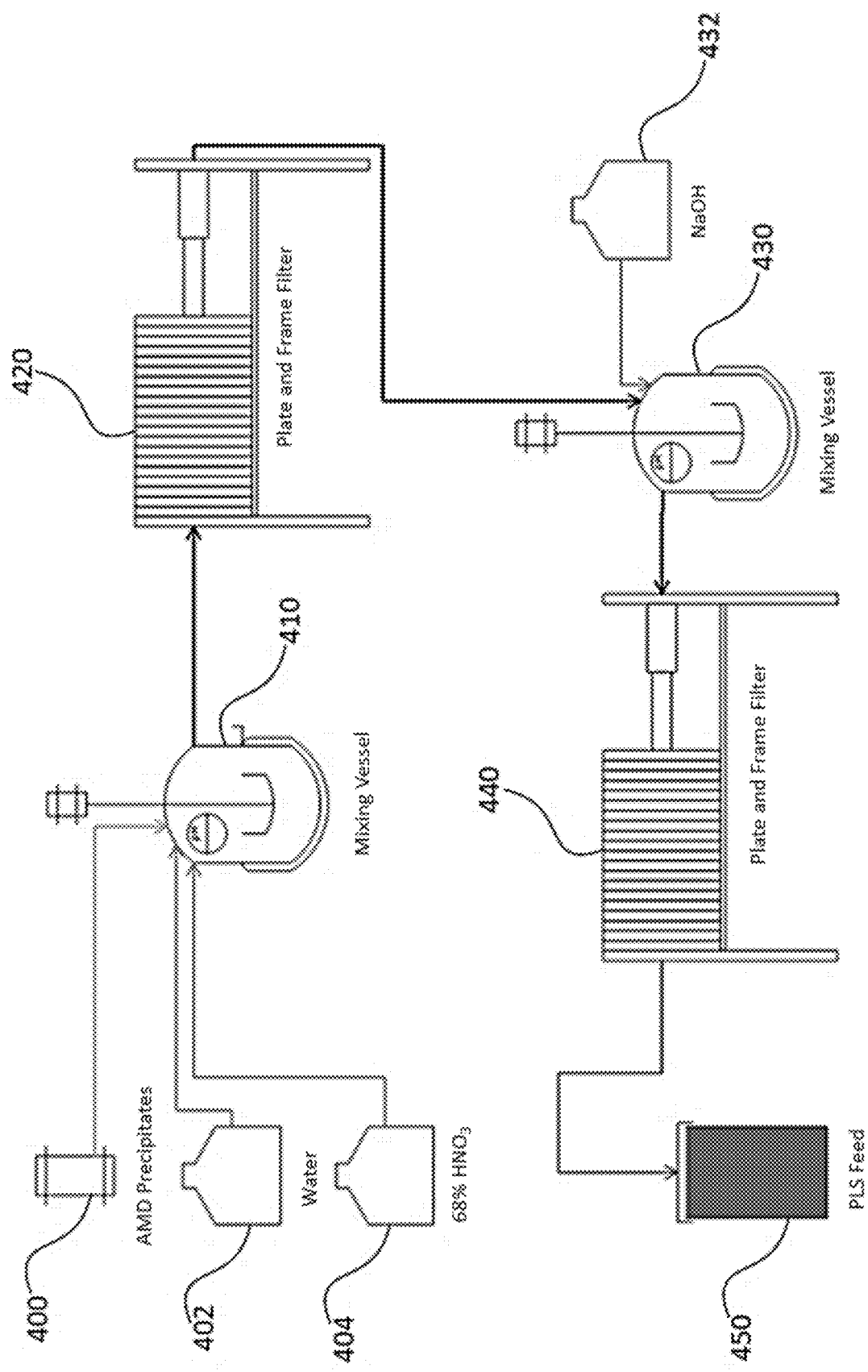
FIG. 15 is a flow diagram showing the acid leaching process used to generate the PLS as disclosed herein.

After modifying the acid leaching process and equipment, an updated process flow diagram was created as shown in FIG. 15. The PLS created for the baseline Royal Scot solvent extraction test was made in two batches. First, AMDp was added to the agitated leaching vessel, bucket-wise, so the mass of the AMDp could be recorded. Additionally, an AMDp sample was collected from each bucket and combined to form an overall representative AMDp sample. The sample was then analyzed using thermogravimetric analysis for moisture, ICP-MS for REEs, and inductively coupled plasma—optical emission spectrometry (ICP-OES) for major ion determinations. Second, water was added to the leaching vessel at 0.75 L per kg of as-received AMDp. This value was determined empirically during shakedown testing to facilitate mixing, pumping, and filtration of the PLS. Initial trials showed that using only AMDp and acid resulted in a thick slurry that was un-pumpable and therefore unable to undergo the filtering process. Third, under rapid agitation, 68% nitric acid was pumped into the leaching chamber until the desired leaching pH set-point of 0.7. The pH was monitored using a hand-held pH meter that was calibrated before the start of each batch. This process took several hours for the vessel to achieve pH equilibrium. Finally, the low pH PLS was filtered using the 420 mm filter press.

After filtration, the clean PLS was pumped into a leaching vessel. Next, the pH of the PLS was adjusted upward with 50% sodium hydroxide, to a pH value of 3.0, to remove gangue metals. Once again, this process was preformed step-wise over several hours until equilibrium was realized at the desired pH set-point. Finally, the PLS was again filtered to remove any solids that precipitated during the upward pH adjustment. The filtrate from this process was sampled then transferred to the SX module as feed for the liquid-liquid extraction.

Table 8 shows the reagents and conditions implemented to create the Royal Scot PLS. Combined, the two batches created a total of 282 liters of PLS for the subsequent SX process. The total acid consumption of the leaching procedure was 1.24 g acid/g feed. While the acid consumption of this batch process is high, other processes could be employed to reduce this metric. For example, countercurrent leaching could be employed to obtain a more efficient use of the leaching acid.

TABLE 8

Royal Scot Acid Leaching Parameters Used to Create PLS.

| Parameter | Batch 1 | Batch 2 | Total |
|---|---|---|---|
| AMDp Wet Mass (kg) | 103.51 | 103.96 | 207.47 |
| AMDp Dry Mass (kg) | 12.45 | 12.54 | 24.96 |
| Water Volume (L) | 75.60 | 75.60 | 151.20 |
| Initial pH | 8.57 | 8.37 | 16.94 |
| Acid Type | 68% $HNO_3$ | 68% $HNO_3$ | 68% $HNO_3$ |
| Acid Added (kg) | 24.07 | 21.32 | 45.39 |
| Leach pH | 0.59 | 0.75 | 0.67 |
| Caustic Type | 50% NaOH | 50% NaOH | 50% NaOH |
| Caustic Added (kg) | 8.71 | 8.44 | 17.15 |
| Final pH | 2.90 | 3.10 | 3.00 |
| Final PLS Volume (L) | 149.31 | 132.30 | 281.61 |
| Filter Cake Wet Mass (kg) | 33.75 | 36.02 | 69.76 |
| Filter Cake Dry Mass (kg) | 10.38 | 10.06 | 20.44 |
| Acid Consumption (g acid/g ore) | 1.31 | 1.16 | 1.24 |

Analytical testing was performed on the feed, concentrate, and tailings of the comprehensive leaching process. These samples were analyzed using ICP-MS and ICP-OES methods to determine the REE concentrations and major ion concentrations, respectively. Tables 9A and 9B show the results of the analytical tests as well as the mass balance for both leaching batches.

TABLE 9A

Royal Scot Acid Leaching Assay and Mass Balance (Batch 1).

| Analyte Major Ions | Sludge Assay mg/kg | Sludge Mass g | PLS Feed mg/L | PLS Mass g | Recovery % |
|---|---|---|---|---|---|
| Al | 83,066.8 | 1034.4 | 2785.7 | 415.9 | 40% |
| Ca | 13,986.9 | 174.2 | 734.7 | 109.7 | 63% |
| Co | 697.2 | 8.7 | 21.1 | 3.2 | 36% |
| Fe | 124,032.3 | 1544.5 | 4.0 | 0.6 | 0% |
| Mg | 57,207.9 | 712.4 | 2342.1 | 349.7 | 49% |
| Mn | 19,445.6 | 242.1 | 707.8 | 105.7 | 44% |
| Si | 29,654.3 | 369.3 | 62.1 | 9.3 | 3% |
| $SO_4$ | 8942.0 | 111.3 | 940.0 | 140.4 | 100% |
| Cl | 39.8 | 0.5 | 4.7 | 0.7 | 100% |
| TMM | 337,072.8 | 4197.3 | 7602.1 | 1135.1 | 27% |

| Analyte Rare Earth Elements | Sludge Assay mg/kg | Sludge Mass mg | PLS Feed µg/L | PLS Mass mg | Recovery % |
|---|---|---|---|---|---|
| Sc | 13.1 | 163.6 | 143.3 | 21.4 | 13% |
| Y | 343.1 | 4272.2 | 14,746.1 | 2201.7 | 52% |
| La | 67.9 | 845.8 | 3100.6 | 462.9 | 55% |
| Ce | 205.6 | 2560.0 | 8849.8 | 1321.4 | 52% |
| Pr | 34.7 | 432.3 | 1490.2 | 222.5 | 51% |
| Nd | 170.2 | 2119.5 | 7429.1 | 1109.2 | 52% |
| Sm | 58.2 | 725.0 | 2427.4 | 362.4 | 50% |
| Eu | 15.2 | 189.4 | 617.6 | 92.2 | 49% |
| Gd | 86.8 | 1081.0 | 3623.2 | 541.0 | 50% |
| Tb | 13.8 | 171.7 | 555.4 | 82.9 | 48% |
| Dy | 75.0 | 933.8 | 3019.1 | 450.8 | 48% |
| Ho | 13.4 | 167.0 | 535.0 | 79.9 | 48% |
| Er | 35.2 | 438.3 | 1388.7 | 207.3 | 47% |
| Tm | 4.4 | 54.5 | 175.0 | 26.1 | 48% |
| Yb | 23.7 | 294.8 | 949.6 | 141.8 | 48% |
| Lu | 3.5 | 43.6 | 140.0 | 20.9 | 48% |
| TREE | 1163.8 | 14,492.4 | 49,190.0 | 7344.6 | 51% |

TABLE 9A-continued

Royal Scot Acid Leaching Assay and Mass Balance (Batch 1).

| | | | | | |
|---|---|---|---|---|---|
| HREE | 612.0 | 7620.5 | 25,275.4 | 3773.9 | 50% |
| LREE | 551.9 | 6872.0 | 23914.6 | 3570.7 | 52% |

| Analyte Major Ions | Filter Cake Assay mg/kg | Filter Cake Mass g | Mass Balance g |
|---|---|---|---|
| Al | 21,406.7 | 222.1 | 396.3 |
| Ca | 2004.2 | 20.8 | 43.7 |
| Co | 87.3 | 0.9 | 4.6 |
| Fe | 152,369.3 | 1581.2 | — |
| Mg | 6645.2 | 69.0 | 293.7 |
| Mn | 5963.3 | 61.9 | 74.6 |
| Si | 25,952.8 | 269.3 | 90.7 |
| SO$_4$ | 1136.0 | 11.8 | — |
| Cl | 76.4 | 0.8 | — |
| TMM | 215,641.2 | 2237.8 | 903.6 |

| Analyte Rare Earth Elements | Filter Cake Assay mg/kg | Filter Cake Mass mg | Mass Balance mg |
|---|---|---|---|
| Sc | 11.5 | 119.4 | 22.8 |
| Y | 39.3 | 408.3 | 1662.2 |
| La | 8.2 | 85.4 | 297.4 |
| Ce | 26.5 | 274.6 | 964.0 |
| Pr | 4.4 | 45.9 | 163.9 |
| Nd | 21.4 | 221.6 | 788.7 |
| Sm | 7.1 | 74.1 | 288.5 |
| Eu | 1.9 | 19.3 | 77.9 |
| Gd | 10.2 | 105.9 | 434.1 |
| Tb | 1.7 | 17.5 | 71.3 |
| Dy | 8.8 | 91.2 | 391.8 |
| Ho | 1.6 | 17.0 | 70.1 |
| Er | 4.1 | 42.7 | 188.3 |
| Tm | 0.6 | 6.0 | 22.4 |
| Yb | 3.0 | 30.9 | 122.1 |
| Lu | 0.5 | 4.8 | 17.9 |
| TREE | 150.8 | 1564.5 | 5583.4 |
| HREE | 81.3 | 843.6 | 3003.0 |
| LREE | 69.5 | 720.8 | 2580.5 |

TABLE 9B

Royal Scot Acid Leaching Assay and Mass Balance (Batch 2).

| Analyte Major Ions | Sludge Assay mg/kg | Sludge Mass g | PLS Feed mg/L | PLS Mass g | Recovery % |
|---|---|---|---|---|---|
| Al | 83,066.8 | 1034.4 | 2848.4 | 425.3 | 41% |
| Ca | 13,986.9 | 174.2 | 777.6 | 116.1 | 67% |
| Co | 697.2 | 8.7 | 24.8 | 3.7 | 43% |
| Fe | 124,032.3 | 1544.5 | 2.6 | 0.4 | 0% |
| Mg | 57,207.9 | 712.4 | 2387.5 | 356.5 | 50% |
| Mn | 19,445.6 | 242.1 | 862.0 | 128.7 | 53% |
| Si | 29,654.3 | 369.3 | 48.2 | 7.2 | 2% |
| SO$_4$ | 8942.0 | 111.3 | 875.0 | 130.6 | 100% |
| Cl | 39.8 | 0.5 | 4.5 | 0.7 | 100% |
| TMM | 337,072.8 | 4197.3 | 7830.6 | 1169.2 | 28% |

| Analyte Rare Earth Elements | Sludge Assay mg/kg | Sludge Mass mg | PLS Feed pg/L | PLS Mass mg | Recovery % |
|---|---|---|---|---|---|
| Sc | 13.1 | 163.6 | 212.3 | 31.7 | 19% |
| Y | 343.1 | 4272.2 | 15,472.8 | 2310.2 | 54% |
| La | 67.9 | 845.8 | 3293.4 | 491.7 | 58% |
| Ce | 205.6 | 2560.0 | 9138.1 | 1364.4 | 53% |
| Pr | 34.7 | 432.3 | 1555.4 | 232.2 | 54% |
| Nd | 170.2 | 2119.5 | 7766.7 | 1159.7 | 55% |
| Sm | 58.2 | 725.0 | 2490.3 | 371.8 | 51% |
| Eu | 15.2 | 189.4 | 639.0 | 95.4 | 50% |
| Gd | 86.8 | 1081.0 | 3671.1 | 548.1 | 51% |
| Tb | 13.8 | 171.7 | 572.7 | 85.5 | 50% |
| Dy | 75.0 | 933.8 | 2964.6 | 442.6 | 47% |
| Ho | 13.4 | 167.0 | 540.8 | 80.8 | 48% |
| Er | 35.2 | 438.3 | 1384.5 | 206.7 | 47% |
| Tm | 4.4 | 54.5 | 173.2 | 25.9 | 47% |
| Yb | 23.7 | 294.8 | 948.2 | 141.6 | 48% |
| Lu | 3.5 | 43.6 | 134.8 | 20.1 | 46% |
| TREE | 1163.8 | 14,492.4 | 50,957.8 | 7608.5 | 52% |
| HREE | 612.0 | 7620.5 | 26,074.8 | 3893.2 | 51% |
| LREE | 551.9 | 6872.0 | 24,882.9 | 3715.3 | 54% |

| Analyte Major Ions | Filter Cake Assay mg/kg | Filter Cake Mass g | Mass Balance g |
|---|---|---|---|
| Al | 21,145.3 | 219.4 | 389.6 |
| Ca | 1833.8 | 19.0 | 39.0 |
| Co | 124.3 | 1.3 | 3.7 |
| Fe | 110,933.2 | 1151.2 | 392.9 |
| Mg | 5895.5 | 61.2 | 294.7 |
| Mn | 7201.1 | 74.7 | 38.7 |
| Si | 24,190.7 | 251.0 | 111.0 |
| SO$_4$ | 1369.6 | 14.2 | — |
| Cl | 91.9 | 1.0 | — |
| TM M | 172,785.3 | 1793.0 | 1269.7 |

| Analyte Rare Earth Elements | Filter Cake Assay mg/kg | Filter Cake Mass mg | Mass Balance mg |
|---|---|---|---|
| Sc | 11.6 | 120.8 | 11.1 |
| Y | 42.1 | 437.0 | 1525.0 |
| La | 8.6 | 89.5 | 264.5 |
| Ce | 28.0 | 290.5 | 905.1 |
| Pr | 4.7 | 48.7 | 151.4 |
| Nd | 23.9 | 248.0 | 711.8 |
| Sm | 7.9 | 82.1 | 271.1 |
| Eu | 2.0 | 20.7 | 73.3 |
| Gd | 11.0 | 114.1 | 418.8 |
| Tb | 1.8 | 19.1 | 67.2 |
| Dy | 9.8 | 101.4 | 389.7 |
| Ho | 1.8 | 18.6 | 67.7 |
| Er | 4.7 | 48.6 | 182.9 |
| Tm | 0.6 | 6.3 | 22.4 |
| Yb | 3.3 | 34.4 | 118.8 |
| Lu | 0.5 | 5.2 | 18.3 |
| TREE | 162.4 | 1684.9 | 5199.0 |
| HREE | 87.2 | 905.4 | 2821.9 |
| LREE | 75.1 | 779.6 | 2377.1 |

The analytical results revealed several significant outcomes resulting from the leaching process. Both leaching batches yielded PLS with generally similar concentrations of elements. Overall, approximately 51% of the REEs were recovered into the PLS solution, while only 27% of the other major ions were recovered, indicating a significant rejection of gangue material. More noteworthy, the pH adjustment procedure resulted in the rejection of almost all of the Fe from the PLS. This is significant as Fe can interfere with the subsequent SX process. Other gangue material was also rejected from the PLS including Al (40%), Ca (65%), Mg (50%), Mn (49%), and Si (3%).

Additionally, in regard to the REEs, the individual recoveries generally decrease as the atomic number of the REE increases. Once exception to this observation is Sc, which possesses a much lower average recovery of 16%. The low recovery is not readily explained by standard thermodynamic considerations (e.g. Eh-pH diagrams) which indicate that Sc should remain in solution at pH values less than 6. Additionally, Sc is also readily leached from other feedstocks using mineral acids. As a result, the current interpretation of these results is that other constituents within the PLS were causing interference with the Sc, resulting in either precipitation at the pH value of less than 3.0 or preventing the Sc from transferring to an aqueous phase with the acid digestion.

The overall mass balance of the acid leaching process indicated a large variation between the balance and initial elemental masses of approximately 27% for the major ions and 37% for the rare earths. This discrepancy is quite large and indicative of analytical errors resulting from the sampling process or deficiencies existed in the measurement and recording procedures. Furthermore, these types of mass balance errors have been consistent throughout his research when using a saturated AMDp feedstock. Previous research using thermogravimetric analysis to explore the residual moisture in AMDp material after desiccation has indicated that some residual moisture may be left in the solid after traditional dehydration methods. Given the high moisture contents of the feedstock, even a small change in moisture values could have a significant impact on the overall mass balance of the system.

Solvent Extraction Module

Figure 16:
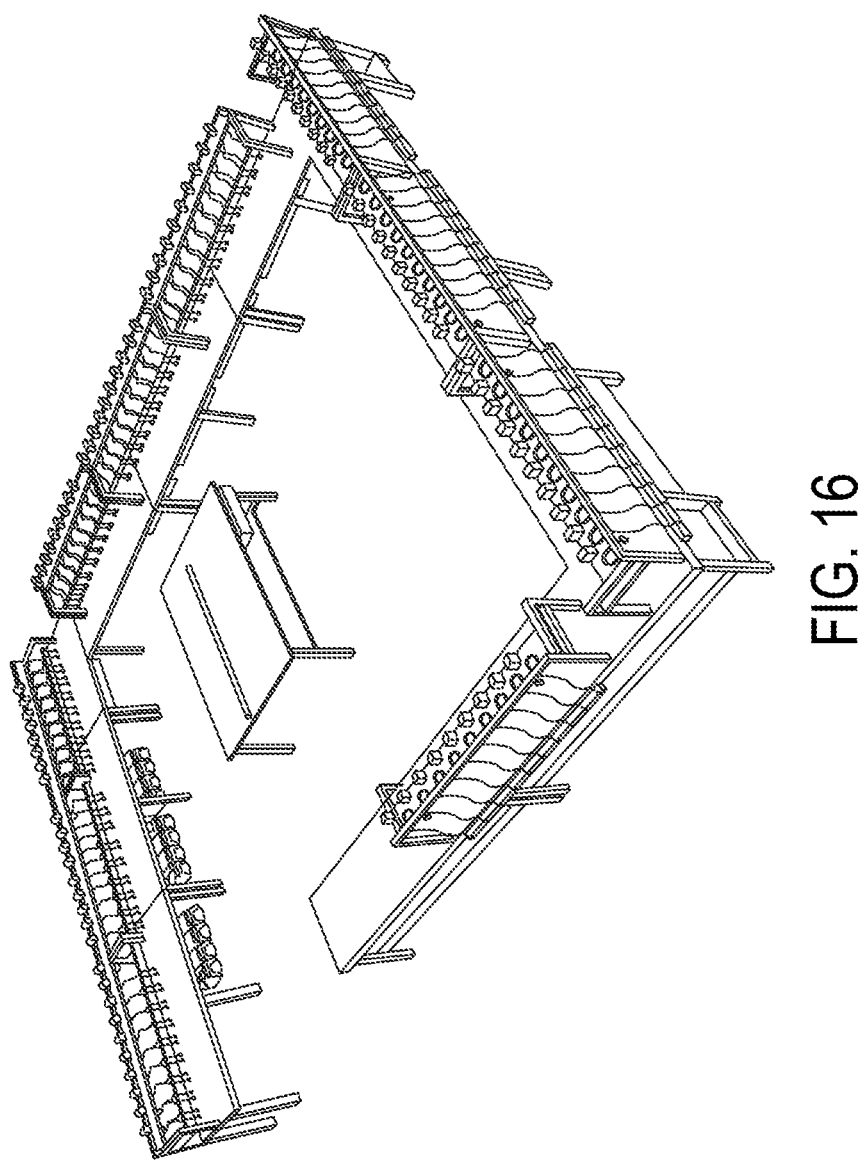
FIG. 16 shows an exemplary solvent extraction module useful in the processes disclosed herein.

A bench-scale solvent extraction system with 100 individual mixer-settlers was acquired for this research. FIG. 16 shows the layout of the bench-scale system. The constructed system was identical to the as-designed specifications developed in the planning phase of this research. The overall SX plant consisted of ten individual stainless steel frames, with ten mixer-settlers attached to each frame, along with the requisite pumps and chemical storage tanks needed for operation.

Multiple shakedown tests were performed on this system to empirically obtain a minimum set of operational parameters. Initially, a hydrostatic test was completed to identify any leaks in the system. Additionally, each unit's operation was evaluated during shakedown testing using multiple parameters to establish the key operating set-points required to perform the necessary process. This was accomplished by using PLS from each feedstock to test the extraction, scrubbing, stripping, and saponification circuits in a batch-wise fashion until analytical testing showed the circuit was preforming in a satisfactory manner. After the most promising parameters were identified, each feedstock was then processed using the SX bench-scale plant in a continuous fashion to develop a baseline result from which parametric testing could identify the effect of changing individual SX parameters on the overall performance of the plant.

Solvent Extraction Shakedown Testing

Throughout shakedown testing, several issues were noted that inhibited the operation of the bench-scale system. As each issue was discovered, changes were implemented to the as-designed system to alleviate the deficiencies. Each operational challenge that was observed during this testing regime is described below.

Third-Phase Crud Formation

Figure 17:
FIG. 17 shows crud formation in an extraction settler during DLM (a site used as a source of AMD treatment solids) shakedown testing.

During initial shakedown tests, two of the feedstocks (DLM and Omega) caused considerable third-phase formation as seen in FIG. 17. This third phase, also called crud, is a stable emulsion that causes significant problems in the SX circuit. The crud encountered during this testing began forming at the organic-aqueous interface and eventually occupied most of the volume in the mixer-settler.

Before a continuous SX process flow diagram is finalized, a thorough investigation of third phase formation is necessary. Issues encountered during the initial testing runs included difficulties in obtaining mass balances, organic loss to aqueous streams, and complete blockages of tubing connecting the mixer-settlers. Unfortunately, the generation of large amounts of crud renders parametric testing with these feedstocks difficult, if not impossible, to complete.

Multiple exploratory tests were conducted in an attempt to prevent the formation of crud in the mixing chamber. These tests included dilution of the PLS, use of the modifier tributyl phosphate, varying extractant concentrations, and changing the extractant organic: aqueous (O:A) ratio. It was found that crud was caused by the gradual oxidation of ferrous ion to the ferric form during solvent extraction. It was also found that addition of the oxidization agent hydrogen peroxide on a roughly 1:1 molar basis with ferrous ion concentration in PLS allowed precipitation of all iron as ferric hydroxide during PLS preparation. This eliminated crud formation during solvent extraction.

When the PLS of the three feedstocks was compared, as shown in Table 10, it was evident that the Fe and Ca content in the Royal Scot PLS was considerably lower than in the other two feedstocks. The current hypothesis is that Fe or Ca will reach a limiting organic concentration (LOC) where the metal ions will start to precipitate and create a nucleus that allows for crud formation. As a result, the Royal Scott PLS was used to demonstrate this technology while DLM and Omega feedstocks were subjected to further leaching tests to remove the excess gangue metals.

TABLE 10

Comparison of PLS from Three Feedstocks.

| Feedstock | DLM | Omega | Royal Scot |
|---|---|---|---|
| End pH | 3.05 | 2.04 | 3.01 |
| Major Ions (mg/L) | | | |
| Al | 9480.84 | 3133.43 | 2982.86 |
| Ca | 1401.59 | 1372.56 | 761.02 |
| Co | 102.98 | 18.60 | 22.43 |
| Fe | 1936.00 | 71.43 | 3.18 |
| Mg | 6845.59 | 455.24 | 2426.65 |
| Mn | 3595.23 | 105.58 | 777.82 |
| Na | 47.55 | 12,699.48 | 11,493.42 |
| Si | 1274.31 | 59.31 | 53.64 |
| $SO_4$ | 497.79 | 25.39 | 881.37 |
| Cl | 17.92 | 5.65 | 4.67 |
| TMM | 25,199.80 | 17,946.67 | 19,407.05 |
| Rare Earth Elements (µg/L) | | | |
| Sc | 2118.11 | 962.45 | <0.037 |
| Y | 83,061.09 | 7151.53 | 12,504.72 |
| La | 23,908.46 | 1477.79 | 2646.17 |
| Ce | 64,313.63 | 4906.65 | 7519.84 |
| Pr | 8198.92 | 782.96 | 1248.48 |
| Nd | 34,781.11 | 3688.07 | 6330.98 |
| Sm | 8890.67 | 1133.53 | 2087.38 |
| Eu | 2325.90 | 302.10 | 529.65 |
| Gd | 13,509.25 | 1820.15 | 3011.83 |
| Tb | 2239.51 | 339.07 | 450.90 |
| Dy | 13,712.70 | 2016.94 | 2493.89 |
| Ho | 2713.13 | 381.42 | 444.83 |
| Er | 7453.57 | 1063.41 | 1162.19 |
| Tm | 965.45 | 144.99 | 136.08 |
| Yb | 5506.71 | 824.88 | 801.98 |
| Lu | 793.23 | 125.05 | 104.29 |
| Th | 163.78 | 11.28 | <0.007 |
| U | 815.79 | 257.11 | 198.47 |
| TREE | 274,491.42 | 27,120.98 | 41,473.23 |
| HREE | 132,072.74 | 14,829.88 | 21,110.72 |
| LREE | 142,418.68 | 12,291.10 | 20,362.51 |
| CREE | 136,120.30 | 13,497.71 | 22,310.15 |

Maintaining Mixing Organic: Aqueous (O:A) Ratio

Another operational difficulty encountered in the operation of the SX plant involved maintaining a consistent O:A ratio in the mixing chamber. This issue was not observed in the SX unit operations that had an advance ratio of 1:1. Conversely, unit operations that required high or low O:A ratios often presented challenges in regard to maintaining a consistent mixing O:A ratio. Two potential causes were identified.

First, over time, the Tygon tubing used to recycle the aqueous phase in the settler backto the mixer can become hardened and prevent operation of the roller-clamp that restricts flow in the recycle line. The second issue is inherent to the roller clamp design. Often the roller-clamps could not provide the fine adjustment required to properly maintain the preferred mixing O:A range of 1.5:1 to 1:1.5 as recommended by the SX plant manufacturer. To alleviate this issue, in-line valves were installed into the recycle lines of the SX processes that require advance ratios greater than the recommended mixing range.

Organic Loss During Saponification

During initial shakedown testing, four unit operations were utilized (extraction, scrubbing, stripping, and saponification). During these tests, a large fraction of the organic phase was re-porting to the saponification raffinate and not recycling back to the organic tank. Further research indicated that an additional stage was needed to separate the organic and aqueous phases. As a result, the Megon Rare Earth Circuit was referenced and an additional circuit (acid wash) was implemented directly after the saponification stage. This additional stage greatly improved the recovery of organic to the organic recycle tank.

While the addition of the acid wash circuit improved the recovery of the organic to a level that was acceptable for the operation of the bench-scale plant, further modification may be necessary as the scale of the plant increases. Organic loss constitutes a significant cost for industrial-scale SX operations. As a result, the addition of a coalescence device or other chemical modifier should be evaluated as the technological readiness level (TRL) of this process increases.

SX Procedure and Results

In order to develop a baseline test prior to parametric testing, a batch of PLS was processed in the SX system with an initial set of operating parameters. Table 11 shows the parameters used in establishing this baseline test. The extractant, Elixore 205, is a highly-refined aliphatic diluent, similar to kerosene, with a high flash point, low viscosity, and ultra-low aromatic content. This diluent was chosen for three reasons. First, standard kerosene was used in some initial shakedown testing; however, a strong odor was emitted by the kerosene that permeated the enclosed area. Second, the use of a diluent specifically designed for use in solvent extraction was necessary to minimize further scale-up issues as the TRL of the project increased. Third, previous phase separation tests showed a slight advantage in phase separation times with Elixore 205 versus other total diluents.

TABLE 11

Solvent Extraction Circuit Parameters for Baseline Testing.

| Parameter | Value |
| --- | --- |
| Extraction | |
| Organic | Elixore 205 |
| Extractant | di-(2-ethylhexyl)phosphoric acid |
| Extractant concentration (M) | 0.5 |
| Modifier | tri-n-butyl phosphate |
| Modifier concentration (v/v) | 20% |
| Advance organic: aqueous | 1:1 |
| Mixer speed (rpm) | 856 |
| Organic pump (mL/min) | 75 |
| Aqueous pump (mL/min) | 75 |
| Scrubbing | |
| Reagent | $H_2O$ |
| Concentration (v/v) | 100% |
| Organic: aqueous ratio | 1:1 |
| Mixer speed (rpm) | 856 |
| Scrub pump (mL/min) | 75 |
| Stripping | |
| Reagent | HCl |
| Concentration (M) | 6 |
| Organic: aqueous ratio | 10:1 |
| Mixer speed (rpm) | 856 |
| Strip pump (mL/min) | 7.5 |
| Saponification | |
| Reagent | $NH_4OH$ |
| Concentration | 2 |
| Organic: aqueous ratio | 5:1 |
| Mixer speed (rpm) | 856 |
| Sap pump (mL/min) | 15 |
| Acid Wash | |
| Reagent | $HNO_3$ |
| Concentration (M) | 0.75 |
| Organic: aqueous ratio | 1:1 |
| Mixer speed (rpm) | 856 |
| Acid wash pump (mL/min) | 75 |

Next, di-(2-ethylhexyl)phosphoric acid (D2EHPA) was chosen as the primary extractant based on the wide industrial acceptance. Initial shakedown testing indicated third-phase crud formation occurred in the extraction, scrubbing, and stripping circuits. In order to address this issue, tributyl phosphate (TBP) was added as a modifier.

The extraction and scrubbing advance O:A ratios were both set at 1:1 to provide equal transfer of the REEs and gangue metals to the organic phase and scrubbing raffinate, respectively. For the stripping circuit, an O:A ratio of 10:1 was utilized to concentrate the REEs into the stripped raffinate, while minimizing the volume of the raffinate. This was advantageous for the next process, as smaller volumes required less material handling. Finally, the saponification and acid wash O:A ratios were of 5:1 and 1:1, respectively, based on previous shakedown testing results. Mixer speeds were 856 rpm for every mixer in the SX plant. Lastly, every SX process was conducted using five mixer-settlers, with the exception of the acid-wash stage where only three mixer-settlers were utilized. This quantity is in excess of the number of stages identified in exploratory testing; however, using additional stages reduces the effects of other system inefficiencies that may occur during testing. During parametric testing unit-by-unit sampling will later identify the critical number of stages required.

The plant was operated over a period of eight days with a total operating time of 58 hours. This equates to roughly 7.2 operating hours per day or 90% operational availability. During this time, 281 liters of the PLS feedstock was processed through the system and concentrated into 28.3 liters of stripped raffinate. Additionally, the organic phase was constantly recycled back to the extraction stage. This demonstrated the ability of the process to run continuously, while showing that no metal ions remained attached to the extractant; therefore, reducing the extraction rate in the first circuit. An aqueous sample was obtained at the end of each operating day to evaluate the performance of the system.

FIG. 18 shows the process flow diagram of the ALSX system at the time of testing. As previously discussed, the aqueous and organic phases were circulated in a countercurrent fashion. Additionally, the organic phase advanced through each phase and was recycled for reuse at the end of the processing stream, after the saponification and acid wash stages.

In the extraction stage, the PLS and organic phases mix and settle, transferring REEs into the organic phase. Next, scrubbing removes unwanted elements from the organic while leaving the REEs in the organic phase using water or a mild acid. In the stripping stage, 6M HCl was used to remove the REEs from the organic phase. In this stage a high advance ratio was used to concentrate the REEs into the aqueous strip raffinate. Furthermore, the strip raffinate contained the valuable product from this operation that was used in the next plant module to recover the REEs. The last two stages, saponification and acid wash were used to regenerate the extractant, cleaning the cation exchange sites on each D2EHPA molecule.

Tables 12A and 12B below show the results of the daily analytical testing preformed on the PLS raffinate. While there was not a major change in the concentrations of the gangue material over the length of the test, it did take several days for the system to achieve steady state in regard to consistent extraction of the REEs. During the first three days, several of the LREEs were not fully extracted. This could be a function of the pH within the mixing cell not reaching equilibrium. Conversely, the HREEs approached steady-state extraction at day 2.

Additionally, the daily analytical testing results for the scrubbing raffinate are shown in Tables 13A and 13B below. This data indicated that there was some variation in the removal of chloride and sodium ions from the extractant using water as a scrubbing medium. Additionally, the scrubbing stage did not reach a steady-state condition until after day 4.

TABLE 12A

Extraction Stage Raffinate, Major Metals.
(Site: Royal Scot, units mg/L)

| | Day | | | | |
|---|---|---|---|---|---|
| | 1 | 2 | 3 | 4 | 5 |
| Al | 2646.6 | 3377.2 | 3258.0 | 3264.2 | 3408.3 |
| Ca | 858.5 | 847.2 | 783.5 | 850.9 | 753.0 |
| Co | 25.6 | 25.8 | 25.2 | 25.8 | 25.9 |
| Fe | 8.7 | 4.5 | 2.6 | 3.6 | 1.2 |
| Mg | 2639.8 | 2748.0 | 2707.7 | 2767.7 | 2790.3 |
| Mn | 854.0 | 876.1 | 847.1 | 880.3 | 883.8 |
| Na | 12,474.2 | 11,879.7 | 11,011.9 | 11,321.0 | 13,388.0 |
| Si | 63.7 | 63.6 | 61.2 | 62.4 | 62.5 |
| Total Major Metals | 19,571.0 | 19,822.1 | 18,697.2 | 19,176.0 | 21,313.0 |

| | Day | | |
|---|---|---|---|
| | 6 | 7 | 8 |
| Al | 3381.4 | 3313.2 | 3272.0 |
| Ca | 737.6 | 674.1 | 657.1 |
| Co | 25.8 | 25.5 | 26.1 |
| Fe | 1.0 | 0.9 | 0.8 |
| Mg | 2773.8 | 2732.8 | 2792.9 |
| Mn | 877.0 | 855.0 | 859.0 |
| Na | 12,206.8 | 11,957.5 | 11,684.6 |
| Si | 62.2 | 61.6 | 63.2 |
| Total Major Metals | 20,065.5 | 19,620.6 | 19,355.6 |

TABLE 12B

Extraction Stage Raffinate, REEs.
(Site: royal Scot, units mg/L)

| | Day | | | | | | | |
|---|---|---|---|---|---|---|---|---|
| | 1 | 2 | 3 | 4 | 5 | 6 | 7 | 8 |
| Sc | <0.037 | <0.037 | <0.037 | <0.037 | 0.3 | 0.6 | 0.5 | <0.037 |
| Y | 1435.3 | 529.4 | 221.3 | 66.3 | 77.6 | 21.4 | 41.7 | 43.5 |
| La | 3950.7 | 1135.6 | 38.8 | 17.0 | 63.6 | 32.1 | 31.5 | 24.5 |
| Ce | 7594.7 | 836.6 | 61.2 | 33.8 | 87.0 | 26.5 | 57.2 | 42.1 |
| Pr | 939.8 | 82.6 | 9.0 | 4.4 | 11.9 | 3.1 | 7.4 | 4.7 |
| Nd | 3884.6 | 323.5 | 46.3 | 20.6 | 54.6 | 13.3 | 33.9 | 20.4 |
| Sm | 290.9 | 55.7 | 14.5 | 5.9 | 12.7 | 2.0 | 5.5 | 2.4 |
| Eu | 53.3 | 15.4 | 4.0 | 1.7 | 3.2 | 0.6 | 1.2 | 0.5 |
| Gd | 318.4 | 89.9 | 23.6 | 9.5 | 16.9 | 2.8 | 5.6 | 2.6 |
| Tb | 40.6 | 16.2 | 4.8 | 1.9 | 2.5 | 0.5 | 0.9 | 0.5 |
| Dy | 242.4 | 101.2 | 34.6 | 12.2 | 15.1 | 3.3 | 6.1 | 5.1 |
| Ho | 47.7 | 20.0 | 7.5 | 2.4 | 2.8 | 0.7 | 1.4 | 1.3 |
| Er | 136.4 | 51.9 | 24.0 | 7.1 | 8.1 | 2.2 | 4.3 | 5.1 |
| Tm | 16.7 | 5.0 | 3.0 | 1.0 | 1.0 | 0.4 | 0.6 | 0.9 |
| Yb | 89.1 | 19.6 | 14.1 | 5.3 | 3.3 | 1.2 | 2.2 | 5.6 |
| Day | 1 | 2 | 3 | 4 | 5 | 6 | 7 | 8 |
| Lu | 11.1 | 2.2 | 1.7 | 0.8 | 0.4 | 0.2 | 0.4 | 0.8 |
| Total REEs | 19,051.7 | 3284.7 | 508.6 | 189.8 | 360.6 | 110.4 | 199.9 | 160.0 |

TABLE 13A

Scrubbing Stage Raffinate, Major Metals.
(Site: Royal Scot, units mg/L)

| | Day | | | | | | |
|---|---|---|---|---|---|---|---|
| | 1 | 2 | 3 | 4 | 5 | 6 | 7 |
| Al | 9.4 | 1.1 | 17.2 | 4.0 | 29.1 | 0.8 | 0.6 |
| Ca | 19.2 | 0.4 | 43.3 | 14.0 | 53.7 | 5.8 | 4.6 |
| Co | 0.0 | 0.0 | 0.1 | 0.0 | 0.3 | 0.0 | 0.0 |
| Fe | 0.6 | 0.0 | 0.3 | 0.1 | 0.1 | 0.1 | <0.022 |
| Mg | 7.5 | 0.1 | 16.0 | 6.7 | 37.2 | 7.5 | 8.1 |
| Mn | 6.3 | 0.0 | 13.4 | 13.7 | 61.4 | 7.3 | 5.5 |
| Na | 19.8 | 0.4 | 58.9 | 17.3 | 137.9 | 25.7 | 27.2 |
| Si | 3.0 | 0.5 | 3.0 | 2.3 | 2.8 | 2.3 | 2.3 |
| Total Major Metals | 65.9 | 2.4 | 152.3 | 58.0 | 322.3 | 49.5 | 48.3 |

TABLE 13B

Scrubbing Stage Raffinate, REEs.
(Site: Royal Scot, units mg/L)

| | Day | | | | | | |
|---|---|---|---|---|---|---|---|
| | 1 | 2 | 3 | 4 | 5 | 6 | 7 |
| Sc | <0.037 | <0.037 | <0.037 | <0.037 | <0.037 | <0.037 | <0.037 |
| Y | 344.3 | 246.2 | 62.4 | 92.2 | 96.5 | 165.3 | 9.4 |
| La | 776.6 | 37.7 | 470.5 | 19.9 | 30.6 | 36.4 | 21.1 |
| Ce | 1098.4 | 104.1 | 429.7 | 47.9 | 50.9 | 107.0 | 62.2 |
| Pr | 125.7 | 17.5 | 49.1 | 7.7 | 7.5 | 17.9 | 10.2 |
| Nd | 501.5 | 91.2 | 203.1 | 39.0 | 37.1 | 91.3 | 51.9 |
| Sm | 42.8 | 30.3 | 23.6 | 13.0 | 11.4 | 30.4 | 15.0 |
| Eu | 9.6 | 8.0 | 4.7 | 3.4 | 3.4 | 7.9 | 3.5 |
| Gd | 58.0 | 47.3 | 24.6 | 19.7 | 19.8 | 44.6 | 18.2 |
| Tb | 10.6 | 8.4 | 2.5 | 3.1 | 3.5 | 6.8 | 1.8 |
| Dy | 66.2 | 50.1 | 13.0 | 18.1 | 21.5 | 37.3 | 6.1 |
| Ho | 12.5 | 9.2 | 2.3 | 3.3 | 3.9 | 6.6 | 0.7 |
| Er | 34.1 | 23.6 | 6.2 | 9.0 | 9.2 | 14.6 | 0.8 |
| Tm | 3.8 | 2.4 | 0.7 | 1.1 | 0.8 | 1.2 | 0.0 |
| Yb | 19.9 | 8.3 | 2.9 | 5.0 | 1.8 | 3.1 | 0.3 |
| Lu | 1.9 | 0.8 | 0.2 | 0.7 | 0.2 | 0.4 | 0.1 |
| Total REEs | 3105.9 | 685.0 | 1295.7 | 283.1 | 297.9 | 570.7 | 201.3 |

Precipitation Module

Figure 19:
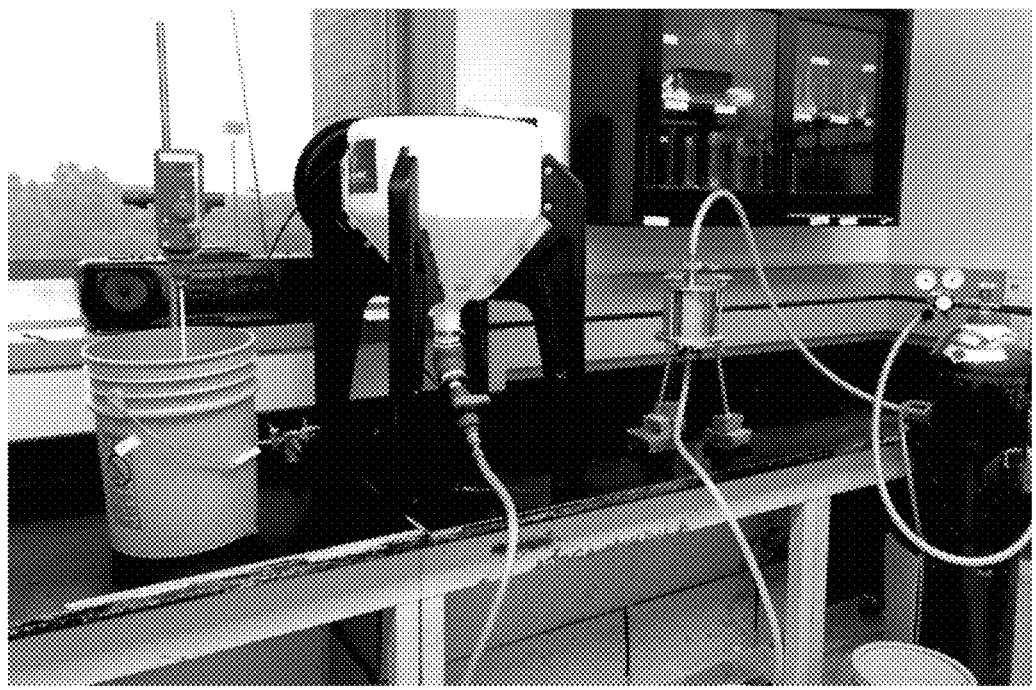
FIG. 19 shows an exemplary precipitation module useful in the processes disclosed herein that can be used to recover REEs from stripped raffinate.

The precipitation module used to recover the REEs from the stripped raffinate is shown in FIG. 19; it is of a much smaller scale than the other ALSX plant equipment. The precipitation module consisted of an overhead mixer used to agitate the stripped raffinate as reagents are added to the solution. After precipitation, the striped raffinate is placed in a ten gallon conical bottom tank allowing the solids to settle at the bottom overnight. The use of the conical bottom tank minimized the volume of liquid that needed to be filtered. The last component of the precipitation module was a small pressure filter that separated the solid and liquid components of the decanted stripped raffinate. Not shown are the drying oven and furnace used to dry and calcine thee rare earth oxalates that precipitated from solution. This equipment was also used for the acid and water washing procedures described below.

Precipitation Procedure

After all of the PLS was processed through the solvent extraction plant, the stripping raffinate was collected for processing in the precipitation module. FIG. 20 shows the process flow diagram that resulted in the separation of a 62% mixed rare earth oxide product. After acquiring a head split of the stripped raffinate, 2.5 g/L of oxalic acid was added to the stripped raffinate, representing approximately 5 times the stochiometric ratio of oxalic acid to REEs. Next, the pH of the stripped solution was raised with 50% NaOH to a value of 1.5. The pH adjustment was performed in multiple steps, ensuring the temperature of the solution did not exceed 80° Celsius.

Once the target pH was achieved, the solution was allowed to decant overnight until three quarters of the supernatant was left in the decanting vessel and the remaining quarter was separated using a pressure filter with Whatman Grade 40 ashless filter paper with a nominal particle retention of 8 µm. Next, the precipitate was dried in a Yamato DX602C oven at 105° Celsius. A sample was taken from the precipitate and assayed to determine the REE content, as shown in Table 14.

TABLE 14

Assay and Mass Balance of Initial Precipitation Steps

| Analyte | Stripped Raffinate Head-Split | Stripped Raffinate Mass | Precipitated Raffinate Filtrate | Precipitated Filtrate Mass | Precipitated Oxalate Product | Precipitated Oxalate Mass | Mass Balance |
|---|---|---|---|---|---|---|---|
| Volume (L) | 28.32 | | 42.28 | | | | |
| Mass (g) | 31.15 | | 47.35 | | 190.27 | | |
| Major Ions | mg/L | g | mg/L | g | mg/kg | g | g |
| Al | 2626.16 | 74.37 | 1654.35 | 69.94 | 1122.60 | 0.21 | 4.21 |
| Ca | 897.55 | 25.42 | 17.41 | 0.74 | 138,002.05 | 26.26 | (1.58) |
| Co | 0.04 | 0.00 | 0.01 | 0.00 | — | — | 0.00 |
| Fe | 80.54 | 2.28 | 68.98 | 2.92 | — | — | (0.64) |
| Mg | 5.61 | 0.16 | 5.44 | 0.23 | 31.26 | 0.01 | (0.08) |
| Mn | 87.25 | 2.47 | 57.63 | 2.44 | 1388.97 | 0.26 | (0.23) |
| Si | 7.75 | 0.22 | 5.89 | 0.25 | 211.41 | 0.04 | (0.07) |
| $SO_4$ | 8.76 | 0.25 | 0.33 | 0.01 | 450.09 | 0.09 | 0.15 |
| TMM | 3713.65 | 105.16 | 1810.04 | 76.52 | 141,206.38 | 26.87 | 1.77 |
| Rare Earth Elements | µg\L | g | µg\L | g | mg/kg | g | g |
| Sc | 0.02 | 0.00 | 0.44 | 0.00 | — | — | — |
| Y | 136,881.10 | 3.88 | 626.05 | 0.03 | 20,068.41 | 3.82 | 0.03 |
| La | 21,449.10 | 0.61 | 43.67 | 0.00 | 3121.71 | 0.59 | 0.01 |
| Ce | 67,127.02 | 1.90 | 94.28 | 0.00 | 9686.69 | 1.84 | 0.05 |
| Pr | 11,125.33 | 0.32 | 11.66 | 0.00 | 1620.39 | 0.31 | 0.01 |
| Nd | 55,454.65 | 1.57 | 45.22 | 0.00 | 8284.33 | 1.58 | (0.01) |
| Sm | 18,654.50 | 0.53 | 10.98 | 0.00 | 2658.68 | 0.51 | 0.02 |
| Eu | 4953.41 | 0.14 | 2.76 | 0.00 | 711.38 | 0.14 | 0.00 |
| Gd | 28,813.05 | 0.82 | 18.64 | 0.00 | 4013.41 | 0.76 | 0.05 |
| Tb | 4538.49 | 0.13 | 4.58 | 0.00 | 621.93 | 0.12 | 0.01 |
| Dy | 25,609.26 | 0.73 | 43.73 | 0.00 | 3533.09 | 0.67 | 0.05 |
| Ho | 4840.89 | 0.14 | 15.10 | 0.00 | 648.16 | 0.12 | 0.01 |
| Er | 12,794.07 | 0.36 | 71.47 | 0.00 | 1746.58 | 0.33 | 0.03 |
| Tm | 1677.06 | 0.05 | 14.55 | 0.00 | 219.42 | 0.04 | 0.01 |
| Yb | 9270.63 | 0.26 | 104.95 | 0.00 | 1249.35 | 0.24 | 0.02 |
| Lu | 1307.32 | 0.04 | 19.53 | 0.00 | 170.32 | 0.03 | 0.00 |
| TREE | 404,495.90 | 11.46 | 1127.60 | 0.05 | 58,353.83 | 11.10 | 0.30 |
| Actinides | µg\L | g | µg\L | g | mg/kg | g | g |
| Th | 9.52 | 0.00 | 5.52 | 0.00 | 0.72 | 0.00 | (0.00) |
| U | 170.48 | 0.00 | 143.54 | 0.01 | 0.75 | 0.00 | (0.00) |

The oxalic acid precipitation process resulted in 190 g of precipitate containing 11.1 g of REEs. The represents a TREE recovery of 97%. The majority of the measured major analytes were rejected during the precipitation with the exception of Ca, which entirely co-precipitated with the REEs.

The REE oxalate precipitate was then calcined in a Lindberg muffle furnace at a temperature of 750° Celsius for a duration of four hours. A sample of this material indicated the calcination procedure resulted in almost doubling of the concentration of the REO product from 5.8% to 11% as shown in Table 15. Additionally, 22% of the dried product consisted of Ca. In order to further concentrate the REO product a series water and acid washing steps were implements.

TABLE 15

Assay of Precipitation Cleaning Process

| Analyte | Calcined Product Assay | Calcined Product Mass | Washed Product Assay | Washed Product Mass | Acid Wash Product Assay | Acid Wash Product Mass | Acid Wash Oxide Basis |
|---|---|---|---|---|---|---|---|
| Mass (g) | 94.36 | | 68.5 | | 13.8 | | |
| Major Ions | mg/lg | g | mg/kg | g | mg/kg | g | mg/kg |
| Al | 2720 | 0.26 | 2957 | 0.20 | 12,216 | 0.17 | 19,456 |
| Ca | 222,201 | 20.97 | 277,119 | 18.98 | 76,540 | 1.06 | 91,848 |
| Co | 1 | 0.00 | 2 | 0.00 | 3 | 0.00 | 3 |
| Fe | 116 | 0.01 | 74 | 0.01 | 748 | 0.01 | 961 |
| Mg | 232 | 0.02 | 74 | 0.01 | 85 | 0.00 | 113 |
| Mn | 2433 | 0.23 | 2734 | 0.19 | 13,947 | 0.19 | 15,975 |
| Si | 735 | 0.07 | 269 | 0.02 | 673 | 0.01 | 865 |

TABLE 15-continued

Assay of Precipitation Cleaning Process

| Analyte | Calcined Product Assay | Calcined Product Mass | Washed Product Assay | Washed Product Mass | Acid Wash Product Assay | Acid Wash Product Mass | Acid Wash Oxide Basis |
|---|---|---|---|---|---|---|---|
| $SO_4$ | 188 | 0.02 | 4 | 0.00 | 183 | 0.00 | 183 |
| TMM | 7521 | 0.71 | 4 | 0.00 | 20 | 0.00 | 20 |
| Rare Earth Elements | mg/kg | g | mg/kg | g | mg/kg | g | mg/kg |
| Sc | — | — | — | — | — | — | — |
| Y | 37,128 | 3.50 | 41,428 | 2.84 | 173,858 | 2.40 | 198,805 |
| La | 5712 | 0.54 | 6652 | 0.46 | 24,773 | 0.34 | 29,053 |
| Ce | 17,251 | 1.63 | 18,798 | 1.29 | 95,650 | 1.32 | 117,494 |
| Pr | 2916 | 0.28 | 3442 | 0.24 | 14,606 | 0.20 | 17,646 |
| Nd | 15,021 | 1.42 | 17,749 | 1.22 | 74,811 | 1.03 | 87,259 |
| Sm | 5041 | 0.48 | 5805 | 0.40 | 25,532 | 0.35 | 29,607 |
| Eu | 1293 | 0.12 | 1562 | 0.11 | 6595 | 0.09 | 7637 |
| Gd | 7416 | 0.70 | 9094 | 0.62 | 36,883 | 0.51 | 42,512 |
| Tb | 1149 | 0.11 | 1429 | 0.10 | 6019 | 0.08 | 7079 |
| Dy | 6546 | 0.62 | 8035 | 0.55 | 33,201 | 0.46 | 38,104 |
| Ho | 1218 | 0.11 | 1559 | 0.11 | 6099 | 0.08 | 6986 |
| Er | 3254 | 0.31 | 4064 | 0.28 | 16,236 | 0.22 | 18,566 |
| Tm | 412 | 0.04 | 539 | 0.04 | 2153 | 0.03 | 2458 |
| Yb | 2301 | 0.22 | 2890 | 0.20 | 11,867 | 0.16 | 13,512 |
| Lu | 317 | 0.03 | 410 | 0.03 | 1652 | 0.02 | 1879 |
| TREE | 106,975 | 10.09 | 123,455 | 8.46 | 529,933 | 7.31 | 618,598 |
| Grade | 11% | | 12% | | 53% | | 62% |
| Actinides | mg/kg | g | mg/kg | g | mg/kg | g | mg/kg |
| Th | 8 | 0.00 | 8 | 0.00 | 53 | 0.00 | 57 |
| U | 6 | 0.00 | 6 | 0.00 | 40 | 0.00 | 44 |

The washing procedure consisted of multiple washing cycles. After decanting and filtering, the REO product was agitated in 1 L of deionized water for thirty minutes. This procedure was repeated until the conductivity of the supernatant was below 50 μS/cm. In all, ten washing cycles were completed. Following washing, analysis of a sample of the REO product indicated that only small portions of the gangue material Ca (2 g) and Cl (0.7 g) were removed. As a result, a more intense washing procedure was implemented, where the pH of the wash water was lowered to a pH of 3.5 to remove the remaining Ca.

Next, the REO product was subjected to an acid wash. This was conducted by placing the REO product in 1 L of deionized water and the pH was lowered using 3M nitric acid until a pH value of 3.5 was obtained. During this procedure, a notable effervesces occurred as the pH lowered. After washing and drying of the residual solid material, a noticeable loss of mass was observed as the sample was reduced from 68.0 g to 13.8 g. ICP-MS analysis confirmed the majority of the Ca was removed.

Figure 21:
FIG. 21 shows a photographic image of a representative MREO product with 62% grade produced by an example process as disclosed herein.

FIG. 21 shows the resulting rare earth oxide product produced the ALSX plant. The material consisted of a fine powder that was slightly gray in color.

Example 4: Economic Analysis

The nominal AMD feed rate of the disclosed plant is 500 gpm with a maximum capacity of 1,000 gpm. Ideal REE production is projected to be 1,000 kg MREO/year or 110 g MREO/hr. The plant treats all of the approximately 456 tons of acid load in the AMD stream per year with an estimated lime consumption cost of $65,000/year. At a contained value of $237/kg MREO, the annual yield can generate annual revenue of about $237,000, which is more than enough to cover the cost of AMD treatment. The plant is configured so that its AMD treatment train can operate independently and without performance degradation regardless of whether the REE recovery process is operating on a given day. In one aspect, the disclosed processes allow the plant's operator to maintain its Clean Water Act compliance obligations independently of REE recovery.

In addition to treating AMD and generating a preconcentrate, the disclosed plant includes a continuous acid leaching/solvent extraction train at its downstream end that can produce a MREO grade exceeding 90%. Production capacity is estimated to equal 15.5 g MREO/hour (Table 16).

TABLE 16

Estimated MREO Production for Proposed Facility.

| Upstream Concentrator | |
|---|---|
| Product Grade | 1% MREO |
| Recovery | 90% |
| Upstream Concentrate | 803.6 kg MREO/year |
| | 82.6 g MREO/hour |
| ALSX | |
| Product Grade | 90% MREO |
| Recovery | 75% |
| Ideal Yield | 61.9 g MREO/hour |
| Availability | 25% |
| Estimated Yield | 15.5 g MREO/hour |

In some cases, the REE resource at individual AMD treatment sites and individual AMD sludge ponds may be limited. Results from a regional survey showed that the REE flux from an average AMD outfall is only 400 kg/year, while the average sludge pond contains less than 10,000 kg REE in total. In some aspects, neither of these values are large enough to justify a commercial-scale REE concentration and refining plant at a single AMD treatment site. However, in some cases, a dispersed network of on-site handling operations can be integrated to feed a centralized ALSX system. In a feasibility study, we showed that a 2,100 TPD ALSX facility processing raw AMD sludge has the potential to produce an IRR of 37% and a net present value of $80 million over a 20-year operating period. The total capital cost for this plant is $46 million and the operating cost is $141/kg.

Figure 7A:
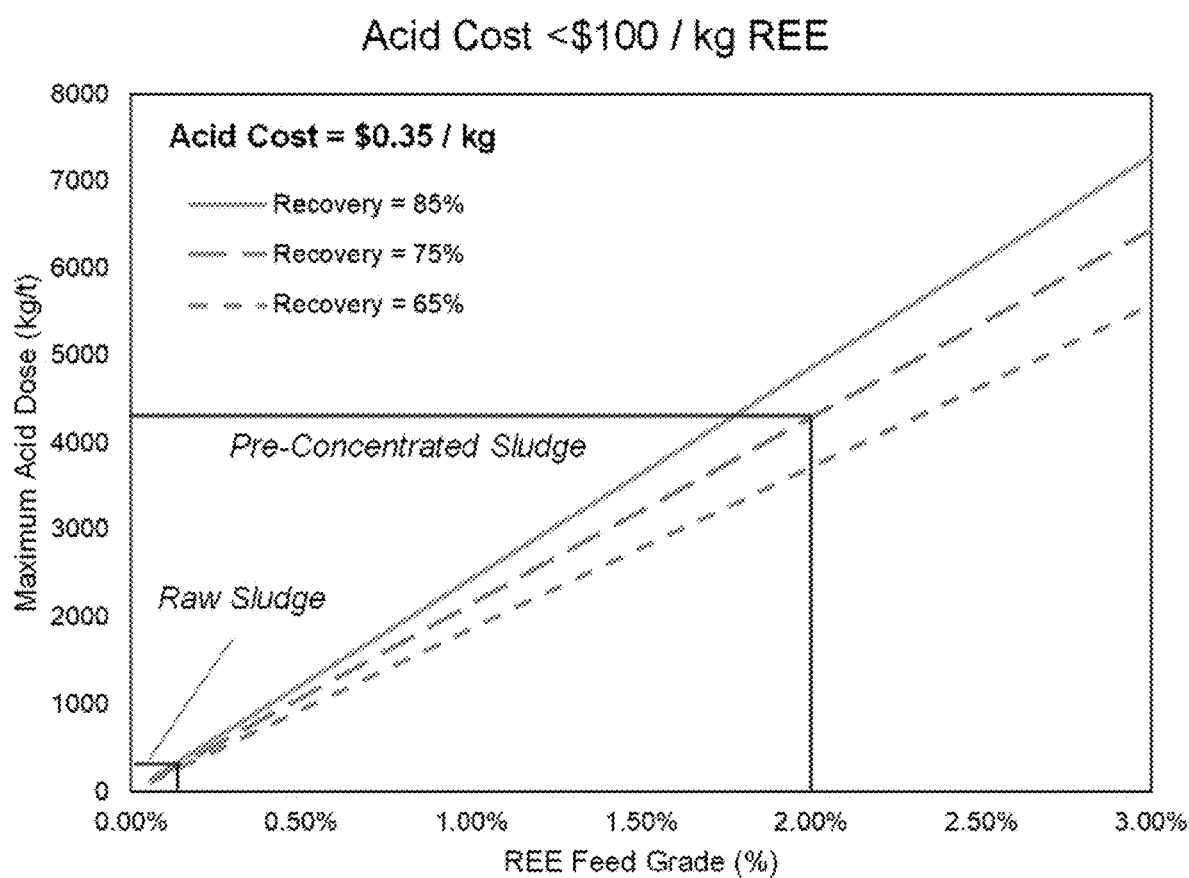
FIGS. 7A-7B show representative sensitivity analyses of disclosed processes.
Figure 7B:
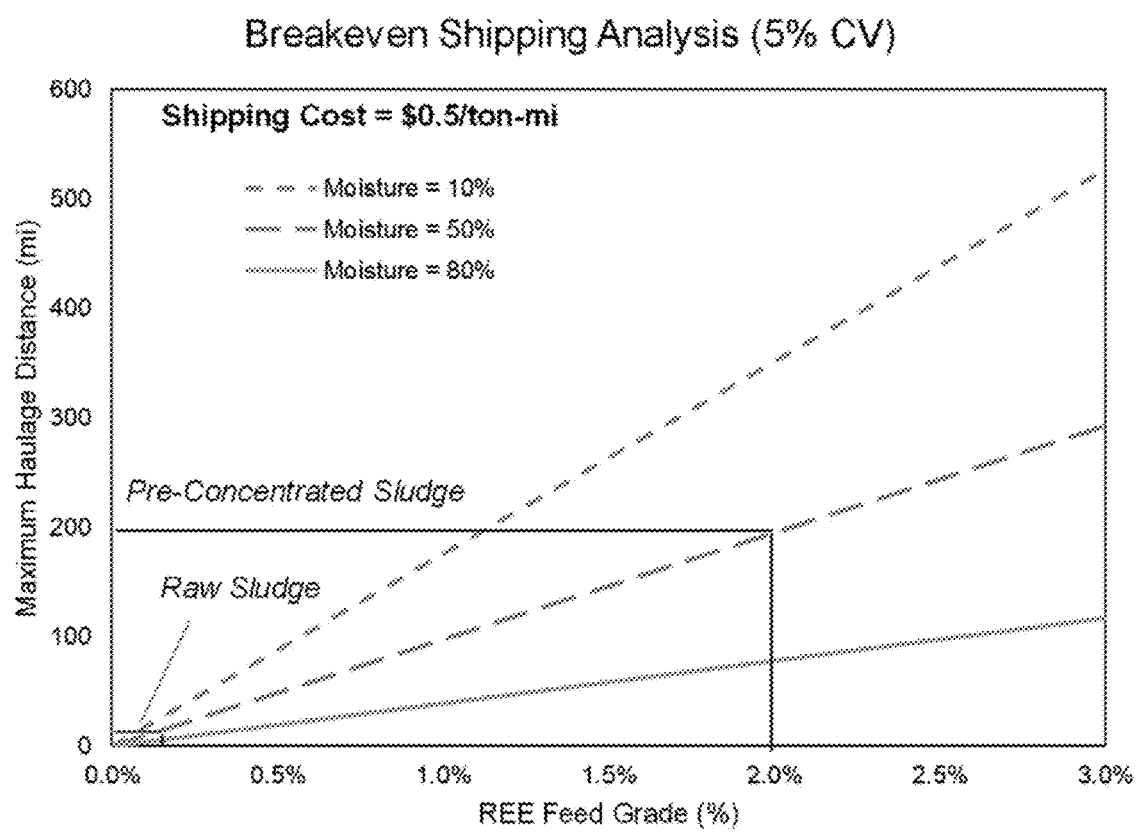

A detailed techno-economic analysis showed that these favorable results are sensitive to sludge acid consumption and sludge feed moisture. For example, FIG. 7 (top) shows the maximum possible acid dose required to keep the total acid cost below an economic threshold of $100/kg as a function of REE feed grade and leaching recovery. As shown, raw sludge (~0.6% REE, ~75% recovery) can only be processed in a cost-effective manner if the maximum acid dose is on the order of 100 to 150 kg/t. FIG. 7 (bottom) shows a similar analysis whereby the maximum haulage distance needed to keep the total shipping cost below 5% of the feedstock contained value (CV) has been determined as a function of feed grade and feed moisture. For raw sludge (0.6% REE, 50-80% moisture), the maximum haulage distance is nearly negligible—less than 10-15 miles.

Traditional compliance-based treatment of AMD tends to push both the sludge acid consumption and the sludge moisture to unfavorable values. Many AMD treatment operators tend to overdose lime addition to avoid non-compliant discharges. This practice leaves large quantities of unreacted lime in the final precipitate, and this base must be fully consumed during the acid leaching step of treatment processes at a significant cost to the REE producer. Moreover, traditional sludge drying cells are ineffective at reducing sludge moisture, and many of the sludge samples evaluated in our prior studies have values exceeding 80-90%. Both of these issues are problematic for commercialization as they reduce the number of viable sludge sites that meet thresholds for economic viability. Sludge samples that do not meet the economic thresholds are considered stranded resources and are not considered relevant to a regional production scenario. When taken together these results indicate that the hypothetical 2,100 tons per day (TPD) ALSX plant described herein may have difficulty identifying a sufficient quantity of raw sludge feedstock that meet these criteria. A reduction in total plant throughput will inevitably lead to a proportional reduction in economic outcomes.

However, the upstream concentration process described herein offers a comprehensive solution to these issues. Most significantly, the upstream concentrator will increase the grade of the ALSX feed by rejecting iron and aluminum during the standard water treatment process. FIG. 7 shows the drastic influence that the increased feedstock grade will have on maximum acid dose (>4,000 kg/t) and maximum haulage distance (increased to >200 miles). In addition to the simple grade increase, the upstream concentrator provides better pH control technology to mitigate the acid consumption issues associated with overdosed lime addition; moreover, the use of GEOTUBE® will assist in reducing product moisture. All of these factors substantially reduce ALSX processing costs, while simultaneously increasing the quantity of feedstock meeting the economic thresholds. If widely implemented across the Appalachian region, the AMD/REE pre-concentration plants will ensure a consistent and reliable supply of feedstock for ALSX operations.

This techno-economic analysis (TEA) has used standard economic guidelines provided by NETL and incorporates the most recent process knowledge regarding the disclosed ALSX process. Since the upstream concentrator can be easily integrated into existing AMD treatment technologies, the capital and operating costs for this process are assumed to be external to the REE producing entity and are not included in the analysis; however, an additional $50/t feedstock acquisition cost is included to account for any additional reagent addition, capitalization expenses, or handling needed to deliver the pre-concentrate to the ALSX plant. The results of this analysis are shown in Table 17 for a nominal 175 TPD plant.

TABLE 17

Economic Indicators for Commercial ALSX System.

| Economic Parameter | Value |
| --- | --- |
| Plant feed rate/grade | 175 TPD at 2% REE |
| Product rate/grade | 2 TPD at 90% MREO |
| Operating period | 20 years; 10% discount rate |
| REE basket price | $147/kg |
| REE recovery | 59% |
| Plant capital expenses | $20 million |
| Plant operating expenses | $54/kg |
| Net present value | $80 million |
| Internal rate of return | 61% |
| Payback period | 1.5 operating years |

Figure 8:
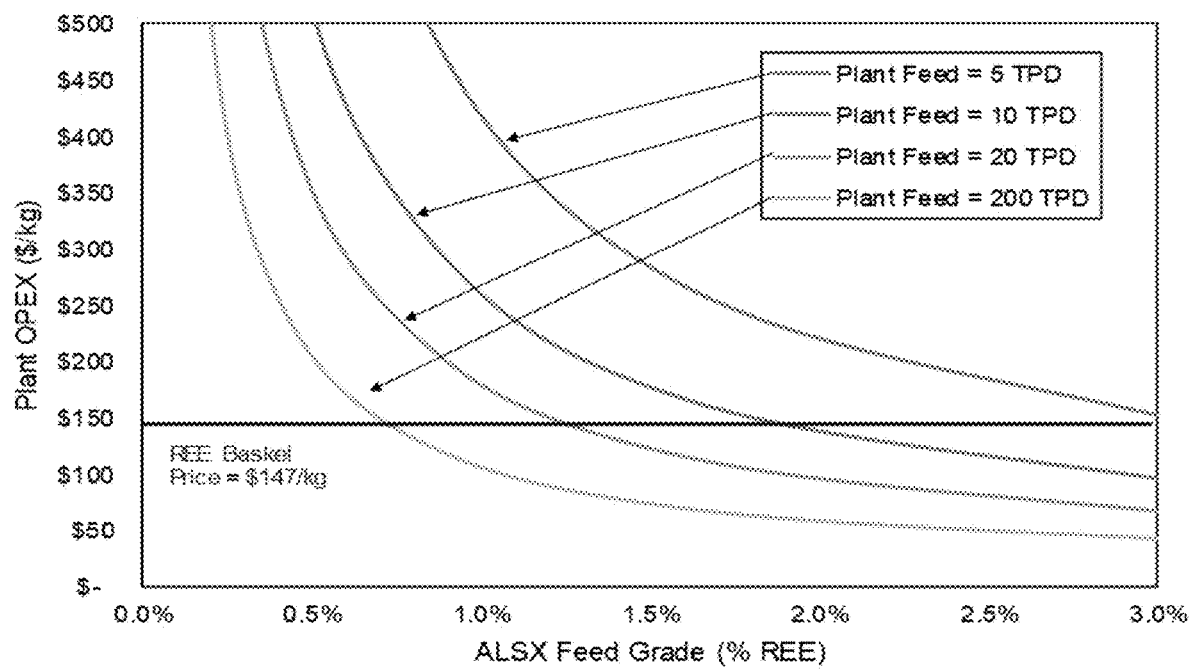
FIG. 8 shows sensitivity analyses of ALSX operating cost as a function of plant size and feed grade.

The results confirm the economic gains inherent to the upstream concentration prior to ALSX. Compared to the prior scenario, which treated raw sludge, the current model output shows that a similar NPV ($80 million) can be achieved at a much smaller overall plant size (175 TPD vs. 2,100 TPD). The smaller plant also entails a much lower capital cost and a lower operating cost, $20 million and $54/kg REE respectively. While both scenarios have been shown to be economically favorable, the pre-concentrated route is much more viable from a commercial perspective, owing to the smaller feedstock requirement and reduced capital cost. Both of these items reduce overall project risk and are thus more favorable for investment. In addition, FIG. 8 shows a sensitivity analysis of operating cost with respect to both feed grade and plant size. As shown, for most plant sizes, the largest incremental reduction in operating cost is achieved.

Other matters pertaining to commercialization include permitting and regulatory factors, downstream refining capacity, and REE pricing factors. Wastes from the disclosed processes can be easily integrated into the existing infrastructure without the need for new permits. This outcome is also desirable for commercialization, as it minimizes the startup time needed to initiate new projects. With regard to refining capacity, the US currently has no domestic facilities that can produce refined REE products from mixed REOs. In one aspect, disclosed herein is the generation of REO concentrates, which can be used in downstream refining studies. With regard to pricing, all of the economic results in Table 17 have been determined using a price discount of 50% relative to the standard oxide prices provided by NETL. This price discount accounts for charges from downstream refining and also indicates that the process can still be profitable despite price volatility.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A method for producing a pregnant leach solution (PLS), the method comprising the following steps:
   a. contacting a raw material containing rare earth elements (REEs) with a first base to form waste solids and an aqueous phase and discarding the waste solids;
   b. contacting the aqueous phase with a second base to form an REE-enriched preconcentrate and an effluent and discharging the effluent;
   c. contacting the REE-enriched preconcentrate with an acid to form an acidic preconcentrate;
   d. filtering the acidic preconcentrate to form an acidic filtrate; and
   e. contacting the acidic filtrate with a third base and filtering to form a pregnant leach solution;

wherein the pregnant leach solution is enriched in REEs and essentially free of solids.

2. The method of claim 1, wherein the raw material is raw acid mine drainage (AMD), an AMD precipitate (AMDp), or an enriched AMD precipitate (eAMDp).

3. The method of claim 1, wherein contacting the raw material with the first base changes the pH of the aqueous phase to from about 4.0 to about 4.5.

4. The method of claim 1, wherein the first base comprises NaOH, KOH, ammonia, ammonium hydroxide, calcium pellets, quicklime, lime slurry, or a combination thereof.

5. The method of claim 1, wherein contacting the aqueous phase with the second base changes the pH of the aqueous phase to from about 8.0 to about 8.5.

6. The method of claim 1, wherein the second base comprises NaOH, KOH, ammonia or an ammonium compound, calcium pellets, quicklime, lime slurry, or a combination thereof.

7. The method of claim 1, wherein the contacting the REE-enriched preconcentrate with the acid changes the pH of the REE-enriched preconcentrate to from about 0.7 to about 3.0.

8. The method of claim 1, wherein the acid comprises hydrochloric acid, nitric acid, sulfuric acid, or a combination thereof.

9. The method of claim 1, wherein step (c) further comprises contacting the REE-enriched preconcentrate and the acid with a reducing agent.

10. The method of claim 1, wherein contacting the acidic filtrate with the third base changes the pH of the acidic filtrate to from about 2.8 to about 3.0.

11. The method of claim 1, wherein the third base comprises MgO, NaOH, KOH, ammonia or ammonium hydroxide, calcium pellets, quicklime, lime slurry, or a combination thereof.

12. The method of claim 1, wherein step (e) further comprises oxidizing the acidic filtrate.

13. The method of claim 12, wherein the acidic filtrate is oxidized mechanically, electrochemically, with an oxidizing agent, or a combination thereof.

14. The method of claim 13, wherein the oxidizing agent is hydrogen peroxide.

15. The method of claim 1, further comprising a step for recovering scandium between steps (a) and (b), the step for recovering scandium comprising contacting the aqueous phase with a fourth base, thereby forming a scandium-enriched solid concentrate, and removing the scandium-enriched solid concentrate from the aqueous phase.

16. The method of claim 15, wherein contacting the aqueous phase with a fourth base changes the pH of the aqueous phase to from about 4.9 to about 5.1.

17. The method of claim 15, wherein the fourth base comprises NaOH, KOH, ammonia or an ammonium compound, calcium pellets, quicklime, lime slurry, or a combination thereof.

18. The method of claim 1, further comprising adding a flocculating agent, a coagulating agent, or both in any of steps (a), (b), or (c).

19. The method of claim 1, wherein following step (e), the method further comprises subjecting the pregnant leach solution to solvent extraction to produce a refined rare earth resource comprising at least 50% REEs.

* * * * *